(12) United States Patent
Kusano et al.

(10) Patent No.: US 10,316,130 B2
(45) Date of Patent: Jun. 11, 2019

(54) POLYCARBONATE DIOL AND POLYURETHANE USING SAME

(71) Applicant: MITSUBISHI CHEMICAL CORPORATION, Chiyoda-ku (JP)

(72) Inventors: Kazunao Kusano, Fukuoka (JP); Yoshikazu Kanamori, Kanagawa (JP); Yoko Nakagawa, Mie (JP); Kaori Yano, Kanagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 42 days.

(21) Appl. No.: 14/751,898

(22) Filed: Jun. 26, 2015

(65) Prior Publication Data
US 2015/0291724 A1 Oct. 15, 2015

Related U.S. Application Data

(63) Continuation of application No. PCT/JP2013/084753, filed on Dec. 25, 2013.

(30) Foreign Application Priority Data

| Dec. 26, 2012 | (JP) | 2012-283163 |
| Feb. 18, 2013 | (JP) | 2013-029212 |
| Feb. 18, 2013 | (JP) | 2013-029213 |
| Feb. 19, 2013 | (JP) | 2013-030250 |
| Feb. 19, 2013 | (JP) | 2013-030251 |
| Feb. 19, 2013 | (JP) | 2013-030252 |
| Apr. 22, 2013 | (JP) | 2013-089345 |
| Apr. 22, 2013 | (JP) | 2013-089346 |

(51) Int. Cl.

| C08G 18/32 | (2006.01) |
| C08G 18/44 | (2006.01) |
| C08G 64/02 | (2006.01) |
| C08G 64/30 | (2006.01) |
| C09D 175/04 | (2006.01) |
| C09D 175/06 | (2006.01) |
| C09J 175/04 | (2006.01) |
| C09J 175/06 | (2006.01) |
| D06N 3/14 | (2006.01) |

(52) U.S. Cl.
CPC ......... *C08G 18/44* (2013.01); *C08G 18/3206* (2013.01); *C08G 64/0208* (2013.01); *C08G 64/305* (2013.01); *C09D 175/06* (2013.01); *C09J 175/04* (2013.01); *C09J 175/06* (2013.01); *D06N 3/146* (2013.01); *C08G 2190/00* (2013.01)

(58) Field of Classification Search
CPC .................. C08G 18/44; C08G 2190/00; C08G 64/0208; C08G 18/3206; C08G 64/305; C09D 175/06; C09D 175/04; C09J 175/04; C09J 175/06; D06N 3/146
See application file for complete search history.

(56) References Cited

U.S. PATENT DOCUMENTS

| 4,855,377 | A |  | 8/1989 | Yokota et al. |
| 5,070,173 | A |  | 12/1991 | Yokota et al. |
| 5,288,839 | A |  | 2/1994 | Greco |
| 5,436,399 | A |  | 7/1995 | Koyama et al. |
| 2001/0047073 | A1 |  | 11/2001 | Mizia et al. |
| 2004/0092699 | A1 |  | 5/2004 | Ueno et al. |
| 2007/0197116 | A1 |  | 8/2007 | Yakake et al. |
| 2008/0146766 | A1 |  | 6/2008 | Masubuchi et al. |
| 2009/0018256 | A1 |  | 1/2009 | Nefzger et al. |
| 2010/0292497 | A1 | * | 11/2010 | Masubuchi ........ C08G 18/0895 558/266 |
| 2013/0109804 | A1 |  | 5/2013 | Kusaka et al. |
| 2015/0152221 | A1 | * | 6/2015 | Farmer .................. C08G 64/34 525/528 |

FOREIGN PATENT DOCUMENTS

| EP | 0 302 712 A2 | 2/1989 |
| EP | 0 533 275 A2 | 3/1993 |
| EP | 0 614 925 A1 | 9/1994 |
| EP | 1 688 447 A1 | 8/2006 |
| EP | 1 849 814 A1 | 10/2007 |
| EP | 2 014 693 A2 | 1/2009 |
| JP | 60-195117 A | 10/1985 |
| JP | 2-289616 A | 11/1990 |
| JP | 3-234813 | 10/1991 |
| JP | 4-7327 A | 1/1992 |

(Continued)

OTHER PUBLICATIONS

Machine English translation of JP 2931382, Akazawa et al., Aug. 1999.*

(Continued)

*Primary Examiner* — Patrick D Niland
(74) *Attorney, Agent, or Firm* — Oblon, McClelland, Maier & Neustadt, L.L.P.

(57) ABSTRACT

The present invention relates to a polycarbonate diol comprising a structural unit derived from a compound represented by the following formula (A) and a structural unit derived from a compound represented by the following formula (B), wherein the hydroxyl value is from 20 to 450 mg-KOH/g:

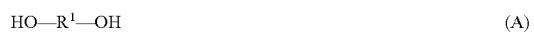

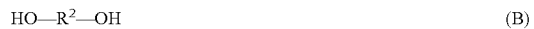

the glass transition temperature of said polycarbonate diol as measured by a differential operating calorimeter is −30° C. or less and the average carbon number of a dihydroxy compound obtained by hydrolyzing said polycarbonate diol is from 3 to 5.5.

13 Claims, No Drawings

(56) References Cited

FOREIGN PATENT DOCUMENTS

| | | | |
|---|---|---|---|
| JP | 4-93316 | A | 3/1992 |
| JP | 4-239024 | A | 8/1992 |
| JP | 5-25264 | A | 2/1993 |
| JP | 5-51428 | A | 3/1993 |
| JP | 2931382 | * | 8/1999 |
| JP | 2000-95852 | A | 4/2000 |
| JP | 2001-270938 | A | 10/2001 |
| JP | 2003-183376 | A | 7/2003 |
| JP | 2005-048141 | | 2/2005 |
| JP | 2007-314768 | A | 12/2007 |
| JP | 2008-106415 | A | 5/2008 |
| JP | 2009-051888 | * | 3/2009 |
| JP | 2009-51888 | A | 3/2009 |
| JP | 2009-292994 | | 12/2009 |
| JP | 2010-27258 | A | 2/2010 |
| JP | 2010-126591 | A | 6/2010 |
| JP | 2011-162464 | | 8/2011 |
| JP | 2011-162646 | A | 8/2011 |
| JP | 2011-225863 | A | 11/2011 |
| JP | 2011-226047 | A | 11/2011 |
| JP | 2012-67259 | | 4/2012 |
| JP | 2012-522098 | | 9/2012 |
| JP | 2013-18979 | A | 1/2013 |
| JP | 2013-43924 | A | 3/2013 |
| JP | 2014-1475 | A | 1/2014 |
| TW | 201204763 | A1 | 2/2012 |
| WO | WO 02/070584 | A1 | 9/2002 |
| WO | WO 2011/129377 | A1 | 10/2011 |

OTHER PUBLICATIONS

Machine English translation of JP 2009-051888, Masabuchi et al., Mar. 2009.*
Combined Office Action and Search Report dated Jun. 27, 2016 in Chinese Patent Application No. 201380068516.3 (with English language translation).
Extended European Search Report dated Nov. 16, 2015 in Patent Application No. 13867502.0.
Office Action dated May 23, 2017 in Japanese Patent Application No. 2014-087383 (with unedited computer generated English translation).
Office Action dated May 22, 2017 in Chinese Patent Application No. 201380068516.3 (with English language translation).
Observations by a third party dated Nov. 21, 2016 in European Patent Application No. 13867502.0.
Combined Office Action and Search Report dated Mar. 17, 2017 in Taiwanese Patent Application No. 102148355 (with English translation).
Office Action dated Mar. 28, 2017 in Japanese Patent Application No. 2013-267647 (with English translation).
Information Offer Form issued Mar. 6, 2017in Japanese Patent Application No. 2014-087383 (with English translation).
Hiroshi Hasegawa, "Flourishing Performance Chemicals of Sanyo Chemical Group 65, Urethane Resin Emulsion", Sanyo Chemical News, No. 440, 2007, 20 pages.
Office Action dated Oct. 19, 2016 in European Patent Application No. 13 867 502.0.
Extended European Search Report dated Oct. 11, 2017, in European Patent Application No. 17171296.1, filed Dec. 25, 2013.
Japanese Decision of Refusal dated Oct. 31, 2017 in connection with corresponding Japanese Patent Application No. 2013-267647, filed Dec. 25, 2013.
Submission of Information Statement issued Aug. 22, 2017, in Japanese Patent Application No. 2013-267647, filed Dec. 25, 2013 (with English Translation).
Office Action dated Apr. 6, 2018 in Japanese Patent Application No. 2014-087383 (with English translation), filed Apr. 21, 2014.
Submission of information noticed issued Mar. 26, 2018 in Japanese Patent Application No. 2014-087383 (with English translation).
Yuji Shibasaki, et al., "Cationic Ring-Opening Polymerization of Seven-Membered Cyclic Carbonate with Water-Hydrogen Chloride through Activated Monomer Process", Macromolecules, 2000, 33, pp. 3590-3593.
Ken Kojio, et al., "Structure-Mechanical Property Relationships for Poly(carbonate urethane) Elastomers with Novel Soft Segments", Macromolecules, 2009, 42, pp. 8322-8327.
Office Action dated Aug. 9, 2018 in corresponding European Patent Application No. 17 171 296.1, 4 pages.
Office Action dated Jul. 27, 2018 in corresponding Taiwanese Patent Application No. 106145095 (with English Translation), 9 pages.
Notification of Reason for Refusal dated Jan. 9, 2019 in the corresponding Korean patent application No. 10-2015-7016822 (with English Translation), 19 pages.
Office Action dated Jan. 22, 2019 in Japanese Patent Application No. 2018-010195 (with English translation), filed Jan. 25, 2018.
Office Action dated Feb. 5, 2019 in Japanese Patent Application No. 2012-003331 (with English translation), filed Jan. 12, 2018.

* cited by examiner

POLYCARBONATE DIOL AND POLYURETHANE USING SAME

TECHNICAL FIELD

The present invention relates to a polycarbonate diol useful as a raw material of a polycarbonate-based polyurethane, and a polyurethane using the same.

BACKGROUND ART

Conventionally, raw materials for the main soft segment of a polyurethane that is produced on an industrial scale are classified into an ether type typified by polytetramethylene glycol, a polyester polyol type typified by adipate-based ester, a polylactone type typified by polycaprolactone, and a polycarbonate type typified by polycarbonate diol (Non-Patent Document 1).

Of these, a polyurethane using an ether type is excellent in the hydrolysis resistance, flexibility and stretchability but is inferior in the heat resistance and weather resistance. A polyurethane using a polyester polyol type suffers from low hydrolysis resistance of the ester group and cannot be used depending on the usage, though the heat resistance and weather resistance are improved.

A polyurethane using a polylactone type is considered to be of the grade excellent in hydrolysis resistance, compared with a polyurethane using a polyester polyol type, but due to likewise having an ester group, the hydrolysis cannot be completely suppressed. In addition, it has been proposed to mix these polyester polyol type, ether type and polylactone type and use the mixture as a raw material of a polyurethane, but complete compensation for defects in respective types is not achieved.

On the other hand, a polyurethane using a polycarbonate type typified by polycarbonate diol is considered to be of the best durability grade in terms of heat resistance and hydrolysis resistance and is widely used as a durable film, an artificial leather for cars, an (aqueous) paint, and an adhesive.

The polycarbonate diol widely available on the market at present is mainly a polycarbonate diol synthesized from 1,6-hexanediol, but this material has high crystallinity, imposing a problem that when processed into a polyurethane, the cohesion of soft segment is high and among others, low-temperature characteristics such as flexibility, elongation, bending or elastic recovery performance at low temperatures are poor, and for this reason, the application is limited. Furthermore, it is also pointed out that an artificial leather produced using this polyurethane as a raw material has low chemical resistance, hard touch and, compared with natural leather, poor "texture".

In order to solve these problems, polycarbonate diols having various structures have been proposed.

For example, a method of making a copolymerized polycarbonate diol by using 1,6-hexane diol and another dihydroxy compound as raw materials is known, and specifically, there have been proposed a polycarbonate diol in which 1,6-hexanediol and 1,4-butanediol are used as raw materials and copolymerized (Patent Document 1), a polycarbonate diol in which 1,6-hexanediol and 1,5-pentanediol are used as raw materials and copolymerized (Patent Document 2), a polycarbonate diol in which 1,4-butanediol and 1,5-pentanediol are used as raw materials and copolymerized (Patent Document 3), and a polycarbonate diol in which 1,3-propanediol and another dihydroxy compound are used as raw materials and copolymerized (Patent Document 4).

A method using a dihydroxy compound having a substituent on the main chain has also been proposed as a powerful method to inhibit crystallinity of a dihydroxy compound-derived moiety, and, for example, there are a polycarbonate diol in which 2-methyl-1,3-propanediol and another alkylene glycol are used as raw materials and copolymerized (Patent Document 5), and a polycarbonate diol in which 3-methyl-1,5-pentanediol and another alkylene diol are used as raw materials and copolymerized (Patent Document 6).

In addition, a polyurethane using a polycarbonate diol in which a long-chain diol, such as 2-methyl-1,8-octanediol or 1,9-nonanediol, is used as a raw material, has been proposed (Patent Document 7).

Furthermore, a polycarbonate diol in which the average carbon number of a diol exceeds 6, has been proposed as a polycarbonate diol excellent in the chemical resistance, low-temperature characteristics and heat resistance (Patent Document 8).

A polyurethane using a polycarbonate diol, of which flexibility, chemical resistance, etc. are improved by the mixing and use of a polycarbonate diol using a diol having a carbon number of 3 to 6 as a raw material and a polycarbonate diol using a diol having a carbon number of 7 to 12 as a raw material, has also been proposed (Patent Documents 9 to 11).

A polycarbonate diol using only 1,4-butanediol as a raw material of a dihydroxy compound has also been proposed (Patent Documents 12 to 14).

On the other hand, as for the production method of a polycarbonate diol, a proposal has been made about a method for synthesizing a polycarbonate diol having a high molecular weight, and there are described a method of reacting a dihydroxy compound with an alkyl carbonate to make a polycarbonate diol having a molecular weight of 500 to 2,000 and further adding an aryl carbonate to produce a polycarbonate diol having a molecular weight of more than 2,000 (Patent Document 15), and a method of reacting a dimethyl carbonate and an aliphatic dihydroxy compound to produce a less colored and high-quality polycarbonate diol in which the molecular terminal is a hydroxyl group (Patent Document 16).

BACKGROUND ART DOCUMENT

Patent Document

Patent Document 1: JP-A-5-51428 (the term "JP-A" as used herein means an "unexamined published Japanese patent application")
Patent Document 2: JP-A-2-289616
Patent Document 3: JP-A-4-7327
Patent Document 4: International Publication No. 2002/070584
Patent Document 5: International Publication No. 2006/088152
Patent Document 6: JP-A-60-195117
Patent Document 7: JP-B-3-54967 (the term "JP-B" as used herein means an "examined Japanese patent publication")
Patent Document 8: JP-A-2000-95852
Patent Document 9: Japanese Patent No. 04177318
Patent Document 10: Japanese Patent No. 04506754
Patent Document 11: JP-A-2008-106415
Patent Document 12: JP-A-6-206965
Patent Document 13: JP-A-7-41539
Patent Document 14: JP-A-7-41540
Patent Document 15: JP-A-2001-261811
Patent Document 16: JP-A-2001-270938

Non-Patent Document

Non-Patent Document 1: Katsuji Matsunaga (supervisor), Polyurethane no Kiso to Oyo (Basic and Application of Polyurethane), pp. 96-106, CMC Publishing Co., Ltd., November 2006

SUMMARY OF INVENTION

Problem that Invention is to Solve

However, with these conventionally known techniques, for example, the polycarbonate diols described in Patent Documents 1 to 3, etc., the low-temperature characteristics when processed into a polyurethane are insufficient. With the polycarbonate diols described in Patent Documents 5 and 6, etc., the chemical resistance and heat resistance when processed into a polyurethane are inferior. Furthermore, with the polycarbonate diols described in Patent Document 7, etc., the chemical resistance and abrasion resistance when processed into a polyurethane are poor. In addition, the carbon number of a short-chain diol practically used in the polycarbonate diols of Patent Documents 8 to 11, etc. is 6, and the chemical resistance when processed into a polyurethane is low.

With the polycarbonate diols described in Patent Documents 12 to 14, the chemical resistance when processed into a polyurethane is excellent, but the low-temperature characteristics are inferior to a polyurethane using a polycarbonate diol synthesized from 1,6-hexanediol. In particular, Patent Document 12 describes a method for producing a polytetramethylene carbonate diol having a molecular weight of 500 to 10,000, but the molecular weight of the polycarbonate produced practically is low and therefore, the low-temperature characteristics are insufficient.

Patent Document 15 or 16 describes a production method of a polycarbonate diol having a high molecular weight, but these methods concern a polycarbonate diol using 1,6-hexanediol as a raw material, and, for example, in the case of a polycarbonate diol using at least one of 1,3-propanediol, 1,4-butanediol and 1,5-pentanediol as a raw material, a polycarbonate diol having a high molecular weight cannot be synthesized actually.

An object of the present invention is to provide a polycarbonate diol working out to a raw material of a polyurethane excellent in the physical property balance among chemical resistance, low-temperature characteristics, heat resistance, flexibility and elastic recovery performance, which cannot be achieved with the polycarbonate diols of the above-described conventional techniques.

Means for Solving Problem

As a result of many intensive studies to attain the object above, the present inventors have found that a polycarbonate diol containing a structural unit derived from a compound represented by the following formula (A) and a structural unit derived from a compound represented by the following formula (B), wherein the hydroxyl value is from 20 to 450 mg-KOH/g, is a polycarbonate dial working out to a raw material of a polyurethane well-balanced among chemical resistance, low-temperature characteristics and heat resistance.

It has also been found that a polycarbonate diol having a hydroxyl value of 20 to 45 mg-KOH/g, wherein the glass transition temperature of the polycarbonate dial as measured by a differential scanning calorimeter is −30° C. or less and the average carbon number of a dihydroxy compound obtained by hydrolyzing the polycarbonate diol is from 3 to 5.5, is a polycarbonate diol working out to a raw material of a polyurethane well-balanced among flexibility, chemical resistance, low-temperature characteristics, heat resistance and elastic recovery performance. The present invention has been accomplished based on these findings.

That is, the gist of the present invention resides in the followings.

<1> A polycarbonate diol comprising a structural unit derived from a compound represented by the following formula (A) and a structural unit derived from a compound represented by the following formula (B), wherein the hydroxyl value is from 20 to 450 mg-KOH/g:

[Chem. 1]

$$HO-R^1-OH \quad (A)$$

[Chem. 2]

$$HO-R^2-OH \quad (B)$$

(wherein in formula (A), $R^1$ represents a substituted or unsubstituted divalent alkylene group having a carbon number of 3 to 5, and in formula (B), $R^2$ represents a substituted or unsubstituted divalent alkylene group having a carbon number of 8 to 20).

<2> The polycarbonate diol as described in the above <1>, wherein the ratio of the total of a structural unit derived from said compound represented by formula (A) and a structural unit derived from said compound represented by formula (B) to all structural units in said polycarbonate diol is 50 mol % or more.

<3> The polycarbonate diol as described in the above <1> or <2>, wherein the ratio between a structural unit derived from said compound represented by formula (A) and a structural unit derived from said compound represented by formula (B) is from 50:50 to 99:1 in terms of molar ratio.

<4> The polycarbonate diol as described in any one of the above <1> to <3>, wherein the average carbon number of a dihydroxy compound obtained by hydrolyzing said polycarbonate diol is from 4 to 5.5.

<5> The polycarbonate diol as described in any one of the above <1> to <4>, wherein said hydroxyl value is from 20 to 60 mg-KOH/g.

<6> The polycarbonate diol as described in any one of the above <1> to <5>, wherein said compound represented by formula (A) is at least one compound selected from the group consisting of 1,3-propanediol and 1,4-butanediol.

<7> The polycarbonate diol as described in any one of the above <1> to <6>, wherein said compound represented by formula (B) is at least one compound selected from the group consisting of 2-methyl-1,8-octanediol, 1,9-nonanediol, 1,10-decanediol, 1,11-undecanediol and 1,12-dodecanediol.

<8> The polycarbonate diol as described in any one of the above <1> to <7>, wherein at least either of said compound represented by formula (A) and said compound represented by formula (B) is plant-derived.

<9> A polyurethane formed using the polycarbonate diol described in any one of the above <1> to <8>.

<10> An artificial leather or synthetic leather produced using the polyurethane described in the above <9>.

<11> A coating material or coating agent produced using the polyurethane described in the above <9>.

<12> An elastic fiber produced using the polyurethane described in the above <9>.

<13> An aqueous polyurethane coating material produced using the polyurethane described in the above <9>.
<14> A pressure-sensitive adhesive or adhesive produced using the polyurethane described in the above <9>.
<15> An active energy ray-curable polymer composition formed using the polycarbonate diol described in any one of the above <1> to <8>.
<16> A method for producing the polycarbonate diol described in any one of the above <1> to <7>, comprising performing polycondensation through a transesterification reaction using a compound represented by the following formula (A), a compound represented by the following formula (B), and a carbonate compound to produce a polycarbonate diol:

[Chem. 3]

(A)

[Chem. 4]

(B)

(wherein in formula (A), $R^1$ represents a substituted or unsubstituted divalent alkylene group having a carbon number of 3 to 5, and in formula (B), $R^2$ represents a substituted or unsubstituted divalent alkylene group having a carbon number of 8 to 20).
<17> A polycarbonate diol having a hydroxyl value of 20 to 45 mg-KOH/g, wherein the glass transition temperature of said polycarbonate diol as measured by a differential scanning calorimeter is −30° C. or less and the average carbon number of a dihydroxy compound obtained by hydrolyzing said polycarbonate diol is from 3 to 5.5.
<18> The polycarbonate diol as described in the above <17>, wherein said dihydroxy compound is only an aliphatic dihydroxy compound having no substituent.
<19> The polycarbonate diol as described in the above <17> or <18>, wherein said dihydroxy compound contains at least one member selected from the group consisting of 1,3-propanediol, 1,4-butanediol and 1,5-pentanediol.
<20> The polycarbonate diol as described in any one of the above <17> to <19>, wherein the melting heat quantity at a melting peak measured by a differential scanning calorimeter is from 5.0 to 80 J/g.
<21> The polycarbonate diol as described in any one of the above <17> to <20>, wherein said dihydroxy compound contains a plant-derived compound.
<22> A method for producing the polycarbonate diol described in any one of the above <17> to <21>, comprising performing a transesterification of one kind or multiple kinds of dihydroxy compounds having an average carbon number of 3 to 5.5 with a diaryl carbonate in the presence of a transesterification catalyst to produce a polycarbonate diol.
<23> The production method of a polycarbonate diol as described in the above <22>, wherein said one kind or multiple kinds of dihydroxy compounds contain a plant-derived compound.
<24> The production method of a polycarbonate diol as described in the above <22> or <23>, wherein said transesterification catalyst is a compound of at least one element selected from the group consisting of Group 1 elements in the long-period periodic table (excluding hydrogen) and Group 2 elements in the long-period periodic table.
<25> A polyurethane comprising the polycarbonate diol described in any one of the above <17> to <21>.

Advantageous Effects of Invention

A polyurethane produced using the polycarbonate diol of the present invention is characterized by excellent balance among chemical resistance, low-temperature characteristics, heat resistance, flexibility and elastic recovery performance and suited for application to an elastic fiber, a synthetic or artificial leather, a coating material and a high-performance elastomer and thus, is very useful in industry.

MODE FOR CARRYING OUT INVENTION

The embodiments of the present invention are described in detail below, but the present invention is not limited to the following embodiments and can be implemented by making various modifications within the gist of the invention.
In the description of the present invention, "mass %", "ppm by mass" and "parts by mass" have the same meanings as "wt %", "ppm by weight" and "parts by weight", respectively. In addition, when simply referred to as "ppm", this indicates "ppm by weight".
The polycarbonate diol (I) of the present invention is described below.
[I-1. Polycarbonate Diol]
The polycarbonate diol (I) of the present invention is a polycarbonate diol containing a structural unit derived from a compound represented by the following formula (A) and a structural unit derived from a compound represented by the following formula (B), wherein the hydroxyl value is from 20 to 450 mg-KOH/g:

[Chem. 5]

(A)

[Chem. 6]

(B)

(wherein in formula (A), $R^1$ represents a substituted or unsubstituted divalent alkylene group having a carbon number of 3 to 5 or a polymethylene group, and in formula (B), $R^2$ represents a substituted or unsubstituted divalent alkylene group having a carbon number of 8 to 20 or a polymethylene group).
<I-1-1. Structural Feature>
The structural unit derived from the compound represented by formula (A) according to the present invention is represented, for example, by the following formula (C). The structural unit derived from a compound represented by formula (B) is represented, for example, by the following formula (D).

[Chem. 7]

(C)

(wherein in formula (C), $R^1$ represents a substituted or unsubstituted divalent alkylene group having a carbon number of 3 to 5 or a polymethylene group.)

[Chem. 8]

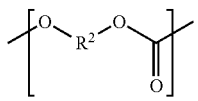

(wherein in formula (D), $R^2$ represents a substituted or unsubstituted divalent alkylene group having a carbon number of 8 to 20 or a polymethylene group.)

In formula (C), $R^1$ may be one kind or multiple kinds of groups. In formula (D), $R^2$ may be one kind or multiple kinds of groups.

In formula (C), $R^1$ is a substituted or unsubstituted divalent alkylene group having a carbon number of 3 to 5 or a polymethylene group, but for the reason that each of chemical resistance, low-temperature characteristics and heat resistance is good, the number of substituents in $R^1$ is preferably 1 or less, and an unsubstituted group is more preferred. In the case of having a substituent, for the reason that each of chemical resistance, low-temperature characteristics and heat resistance is good when the number of carbons in the substituent is preferably smaller, the carbon number is preferably 2 or less, more preferably 1 or less.

In formula (D), $R^2$ is a substituted or unsubstituted divalent alkylene group having a carbon number of 8 to 20 or a polymethylene group, but for the reason that each of chemical resistance, low-temperature characteristics and heat resistance is good, the number of substituents in $R^2$ is preferably 1 or less, and an unsubstituted group is more preferred. In the case of having a substituent, for the reason that each of chemical resistance, low-temperature characteristics and heat resistance is good when the carbon number of the substituent is preferably smaller, the carbon number is preferably 2 or less, more preferably 1 or less.

Furthermore, in formulae (C) and (D), the ratio of the carbon number of the substituent in $R^1$ and $R^2$ to the total carbon number of $R^1$ and $R^2$ is preferably 10% or less, more preferably 5% or less, still more preferably 3% or less, yet still more preferably 2% or less, and most preferably 0%.

[Math. 1]

$$\frac{\begin{array}{c}(\text{Carbon number of substituent in } R^1) \times \\ (\text{ratio of formula }(C) \text{ to the total of formulae }(C) \text{ and }(D)) + \\ (\text{carbon number of substituent in } R^2) \times \\ (\text{ratio of formula }(D) \text{ to the total of formulae }(C) \text{ and }(D))\end{array}}{\begin{array}{c}(\text{Total carbon number of } R^1) \times \\ (\text{ratio of formula }(C) \text{ to the total of formulae }(C) \text{ and }(D)) + \\ (\text{total carbon number of } R^2) \times \\ (\text{ratio of formula }(D) \text{ to the total of formulae }(C) \text{ and }(D))\end{array}}$$

The polycarbonate diol of the present invention contains a structural unit derived from the compound represented by formula (A) and a structural unit derived from the compound represented by formula (B). By containing a structural unit derived from the compound represented by formula (A) and a structural unit derived from the compound represented by formula (B), good chemical resistance and low-temperature characteristics can be obtained when processed into a polyurethane. The ratio (hereinafter, sometimes referred to as "(A):(B)") between a structural unit derived from the compound represented by formula (A) and a structural unit derived from the compound represented by formula (B) is, in terms of molar ratio, preferably (A):(B)=from 50:50 to 99:1, more preferably from 60:40 to 97:3, still more preferably from 70:30 to 95:5, and most preferably from 80:20 to 90:10. If the content ratio of the structural unit derived from the compound represented by formula (A) is excessively large, the low-temperature characteristics when processed into a polyurethane may be insufficient. If the content ratio of the structural unit derived from the compound represented by formula (A) is too small, the chemical resistance when processed into a polyurethane may be insufficient.

Furthermore, by virtue of the configuration where the average carbon number of a dihydroxy compound obtained by hydrolyzing the polycarbonate diol is from 4 to 5.5, good chemical resistance, heat resistance and abrasion resistance can be obtained when processed into a polyurethane. The upper limit of the average carbon number is preferably 5.3, more preferably 5.2, still more preferably 5.1. The lower limit of the average carbon number is preferably 4.3, more preferably 4.5, still more preferably 4.7. If the average carbon number is less than the lower limit above, the low-temperature characteristics may be inadequate, and if the average carbon number exceeds the upper limit above, the chemical resistance, heat resistance and abrasion resistance may be poor.

The average carbon number of a dihydroxy compound obtained by hydrolyzing the polycarbonate diol of the present invention can be determined from the results of analysis by gas chromatography of a dihydroxy compound obtained by hydrolyzing the polycarbonate diol through heating in the presence of an alkali. Specifically, the average carbon number is calculated from the carbon number of a dihydroxy compound obtained by hydrolyzing the polycarbonate diol and the molar ratio of the dihydroxy compound to all dihydroxy compounds.

The ratio of the total of the structural unit derived from the compound represented by formula (A) and the structural unit derived from the compound represented by formula (B) to all structural units in the polycarbonate diol is, in view of physical property balance between chemical resistance and low-temperature characteristics, preferably 50 mol % or more, more preferably 70 mol % or more, still more preferably 80 mol % or more, yet still more preferably 90 mol % or more, and most preferably 95 mol % or more.

The polycarbonate diol of the present invention may be either a copolymer or a mixture of different polycarbonate diols as long as it contains a structural unit derived from the compound represented by formula (A) and a structural unit derived from the compound represented by formula (B), but a copolymer is preferred, because the low-temperature characteristics and flexibility are good. In the case of a copolymer, the copolymer may be a block copolymer or a random copolymer, but the polycarbonate diol as a random copolymer is preferred, because good low-temperature characteristics and flexibility are obtained.

The ratio of the structural unit derived from each dihydroxy compound to all structural units in the polycarbonate diol of the present invention can be determined by subjecting each dihydroxy compound obtained by hydrolyzing the polycarbonate diol with an alkali to analysis by gas chromatography.

<I-1-2. Dihydroxy Compound>

The compound represented by formula (A), which is a dihydroxy compound working out to a raw material of the polycarbonate diol of the present invention, includes 1,3- propanediol, 2-methyl-1,3-propanediol, 1,3-butanediol, 1,4-butanediol, 2-methyl-1,4-butanediol, 1,5-pentanediol, etc. Among these, in view of excellent balance between chemical resistance and low-temperature characteristics when processed into a polyurethane, 1,3-propanediol, 1,4-butanediol and 1,5-propanediol are preferred, 1,3-propanediol and 1,4-butanediol are more preferred, and 1,4-butanediol is still more preferred. The compound represented by formula (A) may be one kind or multiple kinds of compounds.

The compound represented by formula (B) includes 1,8-octanediol, 2-methyl-1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,12-octadecanediol, 1,20-eicosanediol, etc. Among these, in view of excellent balance between chemical resistance and low-temperature characteristics when processed into a polyurethane, 1,8-octanediol, 2-methyl-1,8-octanediol, 1,9-nonanediol, 1,10-decanediol, 1,11-undecanediol and 1,12-dodecanediol are preferred, 2-methyl-1,8-octanediol, 1,9-nonanediol, 1,10-decanediol and 1,12-dodecanediol are more preferred, 1,9-nonanediol, 1,10-decanediol and 1,12-dodecanediol are still more preferred, 1,10-decanediol and 1,12-dodecanediol are yet still more preferred, and 1,10-decanediol is most preferred. The compound represented by formula (B) may be one kind or multiple kinds of compounds.

In the production of the polycarbonate diol of the present invention, a dihydroxy compound (sometimes referred to another dihydroxy compound) other than the compound represented by formula (A) and the compound represented by formula (B) may be used as long as the effects of the present invention are not impaired. Specifically, the another dihydroxy compound includes linear dihydroxy compounds, ether group-containing dihydroxy compounds, branched chain-containing dihydroxy compounds, cyclic group-containing dihydroxy compounds, etc. However, in the case of using another dihydroxy compound, in order to effectively obtain the effects of the present invention, the ratio of the structural unit derived from the another dihydroxy compound to all structural units in the polycarbonate diol is preferably 50 mol % or less, more preferably 30 mol % or less, still more preferably 20 mol % or less, and most preferably 10 mol % or less. If the ratio of the structural unit derived from another dihydroxy compound is large, the balance between chemical resistance and low-temperature characteristics may be impaired.

From the standpoint of reducing the environmental impact, the compound represented by formula (A) is preferably plant-derived. The compound represented by formula (A), which is applicable as a plant-derived compound, includes 1,3-propanediol, 1,4-butanediol, 1,5-propanediol, etc.

From the standpoint of reducing the environmental impact, the compound represented by formula (B) is preferably plant-derived. The compound represented by formula (B), which is applicable as a plant-derived compound, includes 1,9-nonanediol, 1,10-decanediol, 1,11-undecanediol, 1,12-dodecanediol, 1,13-tridecanediol, 1,12-octadecanediol, 1,20-eicosanediol, etc.

As to the plant-derived dihydroxy compound, for example, in the case of 1,4-butanediol, the 1,4-butanediol may be produced by chemical synthesis from succinic acid obtained by a fermentation process, succinic anhydride, succinic acid ester, maleic acid, maleic anhydride, maleic acid ester, tetrahydrofuran, γ-butyrolactone, etc.; the 1,4-butanediol may be produced directly by a fermentation process; or the 1,4-butanediol may be produced from 1,3-butadiene obtained by a fermentation process. Among others, a method of directly producing 1,4-butanediol by a fermentation process, and a method of hydrogenating succinic acid by a reduction catalyst to obtain 1,4-butanediol are efficient and preferred.

In the case of 1,3-propanediol, the compound is obtained by producing 3-hydroxypropionaldehyde from glycerol, glucose or other sugars by a fermentation process and converting the product into 1,3-propanediol or by directly producing 1,3-propanediol from glucose or other sugars by a fermentation process.

In addition, 1,10-decanediol can be synthesized by synthesizing sebacic acid from castor oil according to alkali melting and hydrogenating the sebacic acid directly or after an esterification reaction.

<I-1-3. Carbonate Compound>

The carbonate compound (sometimes referred to as "carbonic acid diester") that can be used for the production of the polycarbonate diol of the present invention is not limited as long as the effects of the present invention are not impaired, but the carbonate compound includes a dialkyl carbonate, a diaryl carbonate, and an alkylene carbonate. Among these, a diaryl carbonate is preferred in view of reactivity.

Specific examples of the carbonate compound include dimethyl carbonate, diethyl carbonate, dibutyl carbonate, diphenyl carbonate, and ethylene carbonate, with diphenyl carbonate being preferred.

<I-1-4. Transesterification Catalyst>

The polycarbonate diol of the present invention can be produced by subjecting the compound represented by formula (A), the compound represented by formula (B), and a carbonate compound to polycondensation through a transesterification reaction.

In the case of producing the polycarbonate diol of the present invention, a transesterification catalyst (hereinafter, sometimes referred to as the catalyst) may be used, if desired, so as to accelerate the polymerization. In this case, if a too large amount of catalyst remains in the polycarbonate diol obtained, at the time of producing a polyurethane by using the polycarbonate diol, the catalyst may inhibit the reaction or excessively accelerate the reaction.

Therefore, although the amount of the catalyst remaining in the polycarbonate diol is not particularly limited, the remaining amount is, as the content in terms of catalyst metal, preferably 100 ppm or less, more preferably 50 ppm or less, still more preferably 10 ppm or less.

As for the transesterification catalyst, any compound generally recognized as capable of esterification may be used without limitation.

Examples of the transesterification catalyst include a compound of a periodic table Group 1 metal such as lithium, sodium, potassium, rubidium and cesium; a compound of a periodic table Group 2 metal such as magnesium, calcium, strontium and barium; a compound of a periodic table Group 4 metal such as titanium and zirconium; a compound of a periodic table Group 5 metal such as hafnium; a compound of a periodic table Group 9 metal such as cobalt; a compound of a periodic table Group 12 metal such as zinc; a compound of a periodic table Group 13 metal such as aluminum; a compound of a periodic table Group 14 metal such as germanium, tin and lead; a compound of a periodic table Group 15 metal such as antimony and bismuth; and a compound of a lanthanide metal such as lanthanum, cerium, europium and ytterbium. Among these, from the standpoint of increasing the transesterification reaction speed, a compound of a periodic table Group 1 metal, a compound of a periodic table Group 2 metal, a compound of a periodic table Group 4 metal, a compound of a periodic table Group 5 metal, a compound of a periodic table Group 9 metal, a compound of a periodic table Group 12 metal, a compound of a periodic table Group 13 metal, and a compound of a periodic table Group 14 metal are preferred; a compound of a periodic table Group 1 metal and a compound of a periodic table Group 2 metal are more preferred; and a compound of a periodic table Group 2 metal is still more preferred. Among the compounds of a periodic table Group 1 metal, compounds of lithium, potassium and sodium are preferred, compounds of lithium and sodium are more preferred, and a sodium compound is still more preferred. Among the compounds of a periodic table Group 2 metal, compounds of magnesium, calcium and barium are preferred, compounds of calcium and magnesium are more preferred, and a magnesium compound is still more preferred. These metal compounds are mainly used as a hydroxide, a salt, etc. In the case of use as a salt, examples of the salt include a halide salt such as chloride, bromide and iodide; a carboxylate salt such as acetate, formate and benzoate; a sulfonate salt such as methanesulfonate, toluenesulfonate and trifluoromethanesulfonate; a phosphorus-containing salt such as phosphate, hydrogenphosphate and dihydrogenphosphate; and an acetylacetonate salt. The catalyst metal may also be used as an alkoxide such as methoxide and ethoxide.

Among these, an acetate, a nitrate, a sulfate, a carbonate, a phosphate, a hydroxide, a halide and an alkoxide of at least one metal selected from periodic table Group 2 metals is preferably used; an acetate, a carbonate and a hydroxide of a periodic table Group 2 metal are more preferably used; an acetate, a carbonate and a hydroxide of magnesium or calcium are still more preferably used; an acetate of magnesium or calcium is yet still more preferably used; and magnesium acetate is most preferably used.

<I-1-5. Molecular Chain Terminal>

The molecular chain terminal of the polycarbonate diol of the present invention is mainly a hydroxyl group. However, in the case of a polycarbonate diol obtained by the reaction of a dihydroxy compound with a carbonate compound, a polycarbonate diol in which the molecular chain terminal is partially not a hydroxyl group may be present as an impurity. Specific examples thereof include a structure where the molecular chain terminal is an alkyloxy group or an aryloxy group and many of these terminals are derived from the carbonate compound.

For example, in the case where diphenyl carbonate, dimethyl carbonate, diethyl carbonate or ethylene carbonate is used as the carbonate compound, a phenoxy group (PhO—) as an aryloxy group, a methoxy group (MeO—) as an alkyloxy group, an ethoxy group (EtO—) or a hydroxyethoxy group (HOCH$_2$CH$_2$O—) may remain, respectively, as a molecular chain terminal (here, Ph represents a phenyl group, Me represents a methyl group, and Et represents an ethyl group).

As for the molecular chain terminal of the polycarbonate diol of the present invention, the ratio of the total of the number of terminals derived from the compound represented by formula (A) and the number of terminals derived from the compound represented by formula (B) to the total number of terminals is preferably 80 mol % or more, more preferably 90 mol % or more, still more preferably 95 mol % or more, yet still more preferably 97 mol % or more, and most preferably 99 mol % or more. Within this range, a desired molecular weight can be easily obtained when processed into a polyurethane, and the polycarbonate diol can be a raw material of a polyurethane excellent in the balance between chemical resistance and low-temperature characteristics.

In the molecular chain terminal of the polycarbonate diol, the ratio of the number of carbonate compound-derived terminal groups to the total number of terminals is preferably 10 mol % or less, more preferably 5 mol % or less, still more preferably 3 mol % or less, yet still more preferably 1 mol % or less.

The lower limit of the hydroxyl value of the polycarbonate diol of the present invention is 20 mg-KOH/g, preferably 25 mg-KOH/g, more preferably 30 mg-KOH/g, still more preferably 35 mg-KOH/g, and the upper limit is 450 mg-KOH/g, preferably 230 mg-KOH/g, more preferably 150 mg-KOH/g, still more preferably 120 mg-KOH/g, yet still more preferably 75 mg-KOH/g, even yet still more preferably 60 mg-KOH/g, and most preferably 45 mg-KOH/g. If the hydroxyl value is less than the lower limit above, the viscosity is excessively high, making the handling difficult at the time of polyurethane formation, and if the hydroxyl value exceeds the upper limit above, physical properties when processed into a polyurethane, such as flexibility and low-temperature characteristics, may be inadequate.

<I-1-6. Molecular Weight·Molecular Weight Distribution>

The lower limit of the number average molecular weight (Mn) determined from the hydroxyl value of the polycarbonate diol of the present invention is preferably 250, more preferably 300, still more preferably 400, and the upper limit is preferably 5,000, more preferably 4,000, still more preferably 3,000. If Mn of the polycarbonate diol is less than the lower limit above, flexibility may not be sufficiently obtained when a urethane is formed, whereas if it exceeds the upper limit above, the viscosity may be increased, impairing the handling at the time of polyurethane formation.

The weight average molecular weight/number average molecular weight (Mw/Mn) that is the molecular weight distribution of the polycarbonate diol of the present invention is not particularly limited, but the lower limit is preferably 1.5, more preferably 1.8, and the upper limit is preferably 3.5, more preferably 3.0. If the molecular weight distribution exceeds the range above, the physical properties of a polyurethane produced using the polycarbonate diol have a tendency, for example, to become hard at low temperatures or decrease in the elongation, and when it is intended to produce a polycarbonate diol having a molecular weight distribution less than the range above, a high-level purification operation such as removal of an oligomer may be required.

The weight average molecular weight and the number average molecular weight are a polystyrene-reduced weight average molecular weight and a polystyrene-reduced number average molecular weight, respectively, and can be determined usually by gel permeation chromatography (sometimes simply referred to as GPC).

<I-1-7. Ratio of Raw Materials, Etc. Used>

The amount of the carbonate compound used in the production of the polycarbonate diol of the present invention is not particularly limited, but usually, in terms of the molar ratio per mol of the total of dihydroxy compounds, the lower limit is preferably 0.35, more preferably 0.50, still more preferably 0.60, and the upper limit is preferably 1.00, more preferably 0.98, still more preferably 0.97. If the amount of the carbonate compound used exceeds the upper limit above, the ratio of a polycarbonate diol in which the terminal group is not a hydroxyl group may be increased in the polycarbonate diols obtained or the molecular weight may not fall in a predetermined range, and if the amount used is less than the lower limit above, the polymerization may not proceed until reaching a predetermined molecular weight.

<I-1-8. Catalyst Deactivator>

As described above, in the case of using a catalyst at the time of polymerization reaction, the catalyst usually remains in the polycarbonate diol obtained, and due to the remaining catalyst, a rise in the molecular weight, a change in the composition, deterioration of color tone, etc. may occur when the polycarbonate diol is heated, or the polyurethane forming reaction may not be controlled. In order to suppress the effect of the remaining catalyst, the transesterification catalyst is preferably deactivated by adding, for example, a phosphorus-based compound in a substantially equimolar amount to the transesterification catalyst used. Furthermore, after the addition, by applying a heating treatment, etc. as described later, the transesterification reaction can be efficiently deactivated. As the phosphorous-based compound, phosphoric acid and phosphorous acid are preferred because of their high effect with a small amount, and phosphoric acid is more preferred.

The phosphorus-based compound used for deactivation of the transesterification catalyst includes, for example, an inorganic phosphoric acid such as phosphoric acid and phosphorous acid, and an organic phosphoric acid ester such as dibutyl phosphate, tributyl phosphate, trioctyl phosphate, triphenyl phosphate and triphenyl phosphite.

One of these compounds may be used alone, or two or more kinds thereof may be used in combination.

The amount of the phosphorus-based compound used is not particularly limited and, as described above, may be sufficient if it is substantially equimolar to the amount of the transesterification catalyst used. Specifically, relative to 1 mol of the transesterification catalyst used, the upper limit is preferably 5 mol, more preferably 2 mol, and the lower limit is preferably 0.6 mol, more preferably 0.8 mol, still more preferably 1.0 mol. If a phosphorous-based compound in an amount less than the range above is used, the polycarbonate diol may be subject to, e.g., a rise in the molecular weight, a change in the composition, or deterioration of the color tone, or deactivation of the transesterification catalyst may be inadequate, making it impossible to sufficiently reduce the reactivity of the polycarbonate diol with an isocyanate group when using the obtained polycarbonate diol, for example, as a raw material for the production of a polyurethane. If a phosphorus-based compound in an amount exceeding the range above is used, the polycarbonate diol obtained may be colored or when a polyurethane is formed using the polycarbonate diol as a raw material, the polyurethane is readily hydrolyzed and furthermore, the phosphorus-based compound may bleed out.

Deactivation of the transesterification catalyst by the addition of a phosphorus-based compound may be performed at room temperature, but when a heating treatment is applied, more efficient deactivation is achieved. The temperature of the heating treatment is not particularly limited, but the upper limit is preferably 180° C., more preferably 150° C., still more preferably 120° C., yet still more preferably 100° C., and the lower limit is preferably 50° C., more preferably 60° C., still more preferably 70° C. If the temperature is less than the range above, deactivation of the transesterification catalyst takes much time and is not efficient, or the degree of deactivation may be inadequate. On the other hand, if the temperature exceeds 180° C., the polycarbonate diol obtained may be colored.

The time for which the reaction with a phosphorus-based compound is performed is not particularly limited but is usually from 0.1 to 5 hours.

<I-1-9. Remaining Monomers, Etc.>

In the case where, for example, an aromatic carbonic acid diester such as diphenyl carbonate is used as a raw material, phenols are generated as a byproduct during the production of the polycarbonate diol. Phenols are a monofunctional compound and therefore, have a possibility of working out to an inhibitory factor at the time of production of a polyurethane, and moreover, a urethane bond formed by phenols is weak in its bonding force and may dissociate due to heat in the later step, etc., allowing for regeneration of an isocyanate or phenols to cause a problem. In addition, since phenols are an irritating substance as well, the amount of phenols remaining in the polycarbonate diol is preferably smaller. Specifically, the amount is, in terms of weight ratio to the polycarbonate diol, preferably 1,000 ppm or less, more preferably 500 ppm or less, still more preferably 300 ppm or less, yet still more preferably 100 ppm or less. For reducing the amount of phenols in the polycarbonate diol, it is effective, as described later, to make the pressure of polymerization reaction of the polycarbonate diol be a high vacuum of 1 kPa or less in terms of absolute pressure or perform thin-film distillation, etc. after the polymerization of polycarbonate diol.

A carbonic acid diester used as a raw material at the time of production sometimes remains in the polycarbonate diol. The amount of the carbonic acid diester remaining in the polycarbonate diol is not limited but is preferably smaller, and, in terms of weight ratio to the polycarbonate diol, the upper limit is preferably 5 wt %, more preferably 3 wt %, still more preferably 1 wt %. If the carbonic acid diester content in the polycarbonate diol is too large, the reaction at the time of polyurethane formation may be inhibited. On the other hand, the lower limit is not particularly limited but is preferably 0.1 wt %, more preferably 0.01 wt %, still more preferably 0 wt %.

A dihydroxy compound used at the time of production sometimes remains in the polycarbonate diol. The amount of the dihydroxy compound remaining in the polycarbonate diol is not limited but is preferably smaller, and the remaining amount is, in terms of weight ratio to the polycarbonate diol, preferably 1 wt % or less, more preferably 0.1 wt % or less, still more preferably 0.05 wt % or less. If the amount of the dihydroxy compound remaining in the polycarbonate diol is large, the molecular length of the soft segment moiety when processed into a polyurethane may be not enough, failing in obtaining desired physical properties.

The polycarbonate diol sometimes contains a cyclic carbonate (cyclic oligomer) generated as a byproduct at the time of production. For example, in the case of using 1,3-propanediol as the compound represented by formula (A), 1,3-dioxan-2-one, a cyclic carbonate formed from two or more molecules thereof, etc. may be generated and contained in the polycarbonate diol. These compounds have a possibility of bringing about a side reaction during the polyurethane forming reaction or give rise to turbidity and therefore, are preferably removed as much as possible by making the pressure of polymerization reaction of the polycarbonate diol be a high vacuum of 1 kPa or less in terms of absolute pressure or performing thin-film distillation, etc. after the synthesis of polycarbonate diol. The content of such a cyclic carbonate in the polycarbonate diol is not limited but is, in terms of weight ratio to the polycarbonate diol, preferably 3 wt % or less, more preferably 1 wt % or less, still more preferably 0.5 wt % or less.

[I-2. Polyurethane]

A polyurethane can be produced using the above-described polycarbonate diol of the present invention.

As to the method for producing the polyurethane of the present invention by using the polycarbonate diol of the present invention, known polyurethane forming reaction conditions usually employed to produce a polyurethane are used.

For example, the polycarbonate diol of the present invention is reacted with a polyisocyanate and a chain extender at a temperature ranging from ordinary temperature to 200° C., whereby the polyurethane of the present invention can be produced.

Alternatively, the polycarbonate diol of the present invention is first reacted with an excess of polyisocyanate to produce a prepolymer having an isocyanate group at the terminal, and the polymerization degree is further increased using a chain extender, whereby the polyurethane of the present invention can be produced.

<I-2-1. Polyisocyanate>

The polyisocyanate used for producing a polyurethane by using the polycarbonate diol of the present invention includes various known aliphatic, alicyclic or aromatic polyisocyanate compounds.

Examples thereof include an aliphatic diisocyanate such as tetramethylene diisocyanate, hexamethylene diisocyanate, 2,2,4-trimethylhexamethylene diisocyanate, 2,4,4-trimethylhexamethylene diisocyanate, lysine diisocyanate and dimer diisocyanate obtained by converting a carboxyl group of a dimer acid into an isocyanate group; an alicyclic diisocyanate such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate and 1,3-bis(isocyanatomethyl)cyclohexane; and an aromatic diisocyanate such as xylylene diisocyanate, 4,4'-diphenyl diisocyanate, 2,4-tolylene diisocyanate, 2,6-tolylene diisocyanate, m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylene polyphenylisocyanate, phenylene diisocyanate and m-tetramethylxylylene diisocyanate. One of these compounds may be used alone, or two or more thereof may be used in combination.

Among these, in view of preferable balance of physical properties of the polyurethane obtained and mass availability at low cost in industry, 4,4'-diphenylmethane diisocyanate (hereinafter, sometimes referred to as MDI), hexamethylene diisocyanate, 4,4'-dicyclohexylmethane diisocyanate and isophorone diisocyanate are preferred.

<I-2-2. Chain Extender>

The chain extender used at the time of producing the polyurethane of the present invention in the case of producing the later-described prepolymer having an isocyanate group is a low-molecular-weight compound having at least two active hydrogens reacting with an isocyanate group and usually includes a polyol, a polyamine, etc.

Specific examples thereof include linear diols such as ethylene glycol, 1,3-propanediol, 1,4-butanediol, 1,5-pentanediol, 1,6-hexanediol, 1,8-octanediol, 1,9-nonanediol, 1,10-decanediol and 1,12-dodecanediol; branched chain-containing diols such as 2-methyl-1,3-propanediol, 2,2-dimethyl-1,3-propanediol, 2,2-diethyl-1,3-propanediol, 2-methyl-2-propyl-1,3-propanediol, 2,4-heptanediol, 1,4-dimethylolhexane, 2-ethyl-1,3-hexanediol, 2,2,4-trimethyl-1,3-pentanediol, 2-methyl-1,8-octanediol, 2-butyl-2-ethyl-1,3-propanediol and dimer diol; ether group-containing diols such as diethylene glycol and propylene glycol; alicyclic structure-containing diols such as 1,4-cyclohexanediol, 1,4-cyclohexanedimethanol and 1,4-dihydroxyethylcyclohexane; aromatic group-containing diols such as xylylene glycol, 1,4-dihydroxyethylbenzene and 4,4'-methylenebis(hydroxyethylbenzene); polyols such as glycerin, trimethylolpropane and pentaerythritol; hydroxyamines such as N-methylethanolamine and N-ethylethanolamine; polyamines such as ethylenediamine, 1,3-diaminopropane, hexamethylenediamine, triethylenetetramine, diethylenetriamine, isophoronediamine, 4,4'-diaminodicyclohexylmethane, 2-hydroxyethylpropylenediamine, di-2-hydroxyethylethylenediamine, di-2-hydroxyethylpropylenediamine, 2-hydroxypropylethylenediamine, di-2-hydroxypropylethylenediamine, 4,4'-diphenylmethanediamine, methylenebis(o-chloroaniline), xylylenediamine, diphenyldiamine, tolylenediamine, hydrazine, piperazine and N,N'-diaminopiperazine; and water.

One of these chain extenders may be used alone, or two or more thereof may be used in combination.

Among these, in view of preferable balance of physical properties of the polyurethane obtained and mass availability at low cost in industry, 1,4-butanediol (hereinafter, sometimes referred to as 1,4BD), 1,5-pentanediol, 1,6-hexanediol, 1,8-octanediol, 1,9-nonanediol, 1,10-decanediol, 1,4-cyclohexanedimethanol, 1,4-dihydroxyethylcyclohexane, ethylenediamine, 1,3-diaminopropane, isophoronediamine, and 4,4'-diaminodicyclohexylmethane are preferred.

The chain extender in the case of producing the later-described prepolymer having a hydroxyl group is a low-molecular-weight compound having at least two isocyanate groups and specifically includes compounds recited in <I-2-1. Polyisocyanate>.

<I-2-3. Chain Terminator>

At the time of producing the polyurethane of the present invention, a chain terminator having one active hydrogen group may be used, if desired, for the purpose of controlling the molecular weight of the polyurethane obtained.

Examples of the chain terminator include aliphatic monools having one hydroxyl group, such as methanol, ethanol, propanol, butanol and hexanol, and aliphatic monoamines having one amino group, such as diethylamine, dibutylamine, n-butylamine, monoethanolamine, diethanolamine and morpholine.

One of these chain terminators may be used alone, or two or more thereof may be used in combination.

<I-2-4. Catalyst>

In the polyurethane forming reaction at the time of producing the polyurethane of the present invention, a known urethane polymerization catalyst typified, for example, by an amine-based catalyst such as triethylamine, N-ethylmorpholine and triethylenediamine, and an organic metal salt of a tin-based compound, such as trimethyltin laurate, dibutyltin dilaurate, dioctyltin dilaurate and dioctyltin dineodecanoate, or a titanium-based compound, etc. may also be used. As for the urethane polymerization catalyst, one catalyst may be used alone, or two or more catalysts may be used in combination.

<I-2-5. Polyol Other Than Polycarbonate Diol of the Present Invention>

In the polyurethane forming reaction at the time of producing the polyurethane of the present invention, the polycarbonate diol of the present invention may be used, if desired, in combination with another polyol. The polyol other than the polycarbonate diol of the present invention is not particularly limited as long as it is a polyol usually employed for the production of a polyurethane, and examples thereof include a polyether polyol, a polyester polyol, a polycaprolactone polyol, and a polycarbonate polyol other than that of the present invention. For example, when used in combination with a polyether-based polyol, a polyurethane further improved in the low-temperature characteristics characterizing the polycarbonate diol of the present invention can be obtained. The weight ratio of the polycarbonate diol of the present invention to the total weight of the polycarbonate diol of the present invention and another polyol is preferably 70% or more, more preferably 90% or more. If the weight ratio of the polycarbonate diol of the present invention is small, the balance among chemical resistance, low-temperature characteristics and heat resistance, characterizing the present invention, may be lost.

In the present invention, the polycarbonate diol of the present invention may also be modified and used for the production of polyurethane. The method for modifying the polycarbonate diol includes a method of introducing an ether group by adding an epoxy compound, such as ethylene oxide, propylene oxide and butylene oxide, to the polycarbonate diol, and a method of introducing an ester group by reacting the polycarbonate diol with a cyclic lactone such as ε-caprolactone, a dicarboxylic acid compound such as adipic acid, succinic acid, sebacic acid and terephthalic acid, or an ester compound thereof. In the ether modification, modification with ethylene oxide, propylene oxide, etc. brings about reduction in the viscosity of the polycarbonate diol and is preferred in view of handling property, etc. Among others, when the polycarbonate diol of the present invention is modified with ethylene oxide or propylene oxide, the crystallinity of the polycarbonate diol decreases, thereby improving the flexibility at low temperatures, and in the case of ethylene oxide modification, the water absorptivity or moisture permeability of a polyurethane produced using the ethylene oxide-modified polycarbonate diol increases, as a result, the performance as an artificial leather/synthetic leather, etc. may be enhanced. However, if the amount of ethylene oxide or propylene oxide added is large, various physical properties, such as mechanical strength, heat resistance and chemical resistance, of a polyurethane produced using the modified polycarbonate diol are reduced. For this reason, the amount added to the polycarbonate diol is suitably from 5 to 50 wt %, preferably from 5 to 40 wt %, more preferably from 5 to 30 wt %. In the method of introducing an ester group, modification with ε-caprolactone brings about reduction in the viscosity of the polycarbonate diol and is preferred in view of handling property, etc. The amount of ε-caprolactone added to the polycarbonate diol is suitably from 5 to 50 wt %, preferably from 5 to 40 wt %, more preferably from 5 to 30 wt %. If the amount of ε-caprolactone added exceeds 50 wt %, the hydrolysis resistance, chemical resistance, etc. of a polyurethane produced using the modified polycarbonate diol are reduced.

<I-2-6. Solvent>

In the polyurethane forming reaction at the time of producing the polyurethane of the present invention, a solvent may be used.

Preferable solvents include, for example, an amide-based solvent such as dimethylformamide, diethylformamide, dimethylacetamide and N-methylpyrrolidone; a sulfoxide-based solvent such as dimethyl sulfoxide; a ketone-based solvent such as methyl ethyl ketone, cyclohexanone and methyl isobutyl ketone; an ether-based solvent such as tetrahydrofuran and dioxane; an ester-based solvent such as methyl acetate, ethyl acetate and butyl acetate; and an aromatic hydrocarbon-based solvent such as toluene and xylene. One of these solvents may be used alone, or two or more thereof may be used as a mixed solvent.

Among these organic solvents, preferred are methyl ethyl ketone, ethyl acetate, toluene, dimethylformamide, dimethylacetamide, N-methylpyrrolidone, dimethyl sulfoxide, etc.

In addition, a polyurethane in the form of an aqueous dispersion liquid may also be produced from a polyurethane composition in which the polycarbonate diol of the present invention, a polydiisocyanate, and the above-described chain extender are blended.

<I-2-7. Production Method of Polyurethane>

As the method for producing the polyurethane of the present invention by using the above-described reaction reagents, a production method employed experimentally or industrially in general may be used.

Examples thereof include a method where the polycarbonate diol of the present invention, another polyol, a polyisocyanate and a chain extender are mixed en bloc and reacted (hereinafter, sometimes referred to as "one-step method"), and a method where the polycarbonate diol of the present invention, another polyol and a polyisocyanate are first reacted to prepare a prepolymer having an isocyanate group at both ends and the prepolymer is reacted with a chain extender (hereinafter, sometimes referred to as "two-step method").

The two-step method involves a process of previously reacting the polycarbonate diol of the present invention and another polyol with one equivalent or more of polyisocyanate to prepare an intermediate terminated by an isocyanate at both ends, which is a moiety corresponding to the soft segment of a polyurethane. In this way, when a prepolymer is once prepared and then reacted with a chain extender, the molecular weight of the soft segment moiety may be easily adjusted, and this method is useful in the case where phase separation of a soft segment and a hard segment needs to be unfailingly achieved.

<I-2-8. One-Step Method>

The one-step method is also called a one-shot method and is a method of performing the reaction by charging the polycarbonate diol of the present invention, another polyol, a polyisocyanate and a chain extender en bloc.

The amount of the polyisocyanate used in the one-step method is not particularly limited, but when the sum of the total number of hydroxyl groups in the polycarbonate diol of the present invention and another polyol, the number of hydroxyl groups of the chain extender and the number of amino groups is assumed to be 1 equivalent, the lower limit is preferably 0.7 equivalents, more preferably 0.8 equivalents, still more preferably 0.9 equivalents, yet still more preferably 0.95 equivalents, and the upper limit is preferably 3.0 equivalents, more preferably 2.0 equivalents, still more preferably 1.5 equivalents, yet still more preferably 1.1 equivalents.

If the amount of the polyisocyanate used is too large, there is a tendency that an unreacted isocyanate causes a side reaction and the viscosity of the polyurethane obtained is too much increased, making the handling difficult or resulting in impaired flexibility, whereas if the amount used is too small, the polyurethane is unlikely to have a sufficiently large molecular weight, failing in obtaining an adequate polyurethane strength.

The amount of the chain extender used is not particularly limited, but when the number obtained by subtracting the number of isocyanate groups in the polyisocyanate from the total number of hydroxyl groups in the polycarbonate diol of the present invention and another polyol is assumed to be 1 equivalent, the lower limit is preferably 0.7 equivalents, more preferably 0.8 equivalents, still more preferably 0.9 equivalents, yet still more preferably 0.95 equivalents, and the upper limit is preferably 3.0 equivalents, more preferably 2.0 equivalents, still more preferably 1.5 equivalents, yet still more preferably 1.1 equivalents. If the amount of the chain extender used is too large, the polyurethane obtained tends to be hardly dissolved in a solvent, making the processing difficult, whereas if the amount used is too small, the polyurethane obtained may be too soft, failing in obtaining sufficient strength/hardness, elastic recovery performance or resilient retention performance or causing reduction in the heat resistance.

<I-2-9. Two-Step Method>

The two-step method is also called a prepolymer method and mainly includes the following methods:

(a) a method where the polycarbonate diol of the present invention, another polyol and an excess of polyisocyanate are reacted in a reaction equivalent ratio of polyisocyanate/(polycarbonate diol of the present invention and another polyol) of more than 1 to 10.0 to produce a prepolymer having an isocyanate group at both molecular chain terminals and a chain extender is added thereto to produce a polyurethane, and (b) a method where a polyisocyanate, an excess of the polycarbonate diol and another polyol are previously reacted in a reaction equivalent ratio of polyisocyanate/(polycarbonate diol of the present invention and another polyol) of 0.1 to less than 1.0 to produce a prepolymer having a hydroxyl group at both molecular chain terminals and an isocyanate group-terminated polyisocyanate as a chain extender is reacted therewith to produce a polyurethane.

The two-step method can be performed without a solvent or under the coexistence of a solvent.

The polyurethane production by the two-step method can be performed by any one method of the following (1) to (3):

(1) a polyisocyanate, the polycarbonate diol and another polyol are first reacted directly without using a solvent to synthesize a prepolymer and the prepolymer is used as it is for a chain extension reaction, (2) a prepolymer is synthesized by the method of (1), then dissolved in a solvent and used for the subsequent chain extension reaction, and (3) a polyisocyanate, the polycarbonate diol and another polyol are reacted by using a solvent from the beginning and thereafter, a chain extension reaction is performed.

In the case of the method of (1), it is important that at the time of chain extension reaction, a polyurethane is obtained in the form of coexisting with a solvent, for example, by a method of dissolving a chain extender in a solvent or simultaneously dissolving the prepolymer and a chain extender in a solvent.

The amount of the polyisocyanate used in the method (a) of the two-step method is not particularly limited, but when the total number of hydroxyl groups in the polycarbonate diol and another polyol is assumed to be 1 equivalent, in terms of the number of isocyanate groups, the lower limit is preferably more than 1.0 equivalent, more preferably 1.2 equivalents, still more preferably 1.5 equivalents, and the upper limit is preferably 10.0 equivalents, more preferably 5.0 equivalents, still more preferably 3.0 equivalents.

If the amount of the isocyanate used is too large, an excess of isocyanate group is likely to cause a side reaction, failing in achieving the desired physical properties of the polyurethane, whereas if the amount used is too small, the molecular weight of the polyurethane obtained is not sufficiently increased, leading to reduction in the strength or thermal stability.

The amount of the chain extender used is not particularly limited, but when the number of isocyanates contained in the prepolymer is assumed to be 1 equivalent, the lower limit is preferably 0.1 equivalents, more preferably 0.5 equivalents, still more preferably 0.8 equivalents, and the upper limit is preferably 5.0 equivalents, more preferably 3.0 equivalents, still more preferably 2.0 equivalents.

At the time of the above-described chain extension reaction, monofunctional organic amines or alcohols may be allowed to coexist for the purpose of adjusting the molecular weight.

The amount of the polyisocyanate used when preparing a hydroxyl group-terminated prepolymer in the method (b) of the two-step method is not particularly limited, but when the total number of hydroxyl groups in the polycarbonate diol and another polyol is assumed to be 1 equivalent, in terms of the number of isocyanate groups, the lower limit is preferably 0.1 equivalents, more preferably 0.5 equivalents, still more preferably 0.7 equivalents, and the upper limit is preferably 0.99 equivalents, more preferably 0.98 equivalents, still more preferably 0.97 equivalents.

If the amount of the isocyanate used is too small, the process until obtaining the desired molecular weight by the subsequent chain extension reaction tends to require a longer time, giving rise to reduction in the production efficiency, whereas if the amount used is too large, the viscosity may be excessively increased to reduce the flexibility of the polyurethane obtained or result in poor handling property, decreasing the productivity.

The amount of the chain extender used is not particularly limited, but when the total number of hydroxyl groups in the polycarbonate diol and another polyol used for the prepolymer is assumed to be 1 equivalent, in terms of the total equivalent including the equivalent of the isocyanate group used for the prepolymer, the lower limit is preferably 0.7 equivalents, more preferably 0.8 equivalents, still more preferably 0.9 equivalents, and the upper limit is preferably less than 1.0 equivalent, more preferably 0.99 equivalents, still more preferably 0.98 equivalents.

At the time of the above-described chain extension reaction, monofunctional organic amines or alcohols may be allowed to coexist for the purpose of adjusting the molecular weight.

The chain extension reaction is usually performed at 0 to 250° C., but the temperature varies depending on the amount of solvent, the reactivity of raw material used, the reaction equipment, etc. and is not particularly limited. If the temperature is excessively low, the reaction may proceed too slowly or due to low solubility of the raw material or polymerization product, the production time may be prolonged, whereas if the temperature is too high, a side reaction or decomposition of the polyurethane obtained may occur. The chain extension reaction may be performed with defoaming under reduced pressure.

In the chain extension reaction, a catalyst, a stabilizer, etc. may also be added, if desired.

The catalyst includes, for example, compounds such as triethylamine, tributylamine, dibutyltin dilaurate, stannous octoate, acetic acid, phosphoric acid, sulfuric acid, hydrochloric acid and sulfonic acid, and one compound may be used alone, or two or more compounds may be used in combination. The stabilizer includes, for example, compounds such as 2,6-dibutyl-4-methylphenol, distearyl thiodipropionate, N,N'-di-2-naphthyl-1,4-phenylenediamine and tris(dinonylphenyl)phosphite, and one compound may be used alone, or two or more compounds may be used in combination. Here, in the case where the chain extender is a compound having high reactivity, such as short-chain aliphatic amine, the reaction may be performed without addition of a catalyst.

<I-2-10. Aqueous Polyurethane Emulsion>

An aqueous polyurethane emulsion can also be produced using the polycarbonate diol of the present invention.

In this case, at the time of producing a prepolymer by reacting polyols containing the polycarbonate diol with an excess of polyisocyanate, the prepolymer is formed by mixing a compound having at least one hydrophilic functional group and at least two isocyanate-reactive groups and subjected to a neutralization/salt formation step of the hydrophilic functional group, an emulsification step by the addition of water, and a chain extension reaction step, whereby an aqueous polyurethane emulsion is obtained.

The hydrophilic functional group in the compound having at least one hydrophilic functional group and at least two isocyanate-reactive groups used here is, for example, a carboxyl group or a sulfonic acid group and is a group neutralizable with an alkaline group. In addition, the isocyanate-reactive group is a group generally forming a urethane bond or a urea bond by the reaction with an isocyanate, such as hydroxyl group, primary amino group and secondary amino group, and these groups may be mixed in the same molecule.

The compound having at least one hydrophilic functional group and at least two isocyanate-reactive groups specifically includes 2,2'-dimethylolpropionic acid, 2,2-methylolbutyric acid, 2,2'-dimethylolvaleric acid, etc. In addition, the compound also includes diaminocarboxylic acids such as lysine, cystine, and 3,5-diaminocarboxylic acid. One of these compounds may be used alone, or two or more thereof may be used in combination. At the time of using such a compound in practice, the compound may be used by neutralizing it with an alkaline compound, for example, an amine such as trimethylamine, triethylamine, tri-n-propylamine, tributylamine and triethanolamine, sodium hydroxide, potassium hydroxide and ammonia.

As for the amount of the compound having at least one hydrophilic functional group and at least two isocyanate-reactive groups used when producing an aqueous polyurethane emulsion, in order to raise the dispersion performance in water, the lower limit is preferably 1 wt %, more preferably 5 wt %, still more preferably 10 wt %, relative to the total weight of the polycarbonate diol of the present invention and another polyol. On the other hand, if the compound is added in an excessively large amount, the characteristic features of the polycarbonate diol of the present invention may not be maintained, and for this reason, the upper limit is preferably 50 wt %, more preferably 40 wt %, still more preferably 30 wt %.

In the case of producing an aqueous polyurethane emulsion, the reaction in the prepolymer process may be performed under the coexistence of a solvent such as methyl ethyl ketone, acetone, N-methyl-2-pyrrolidone, etc. or may be performed without a solvent. In the case of using a solvent, the solvent is preferably removed by distillation after the production of an aqueous emulsion.

At the time of producing an aqueous polyurethane emulsion without a solvent by using the polycarbonate diol of the present invention as a raw material, the upper limit of the number average molecular weight determined from the hydroxyl value of the polycarbonate diol is preferably 5,000, more preferably 4,500, still more preferably 4,000, and the lower limit is preferably 300, more preferably 500, still more preferably 800. If the number average molecular weight determined from the hydroxyl value exceeds 5,000 or falls below 300, the emulsion formation may be difficult.

At the time of synthesizing or storing the aqueous polyurethane emulsion, the emulsion stability may be maintained by using in combination, for example, an anionic surfactant typified by higher fatty acid, resin acid, acidic fatty alcohol, sulfuric acid ester, higher alkyl sulfonate, alkylaryl sulfonate, sulfonated castor oil and sulfosuccinic acid ester, a cationic surfactant such as primary amine salt, secondary amine salt, tertiary amine salt, quaternary amine salt and pyridinium salt, or a nonionic surfactant typified by a known reaction product of ethylene oxide with a long-chain fatty alcohol or phenols.

In the case of forming an aqueous polyurethane emulsion, the emulsion may also be produced by mixing water with an organic solvent solution of the prepolymer under mechanical high shear in the presence of an emulsifier, if desired, without applying a neutralization/salt formation step.

The thus-produced aqueous polyurethane emulsion can be used for various applications. In particular, a chemical raw material having a small environmental impact is recently demanded, and the emulsion can substitute for conventional products with an aim to use no organic solvent.

As to the specific use of the aqueous polyurethane emulsion, for example, utilization for a coating agent, an aqueous coating material, an adhesive, a synthetic leather and an artificial leather is suitable. In particular, the aqueous polyurethane emulsion produced using the polycarbonate diol of the present invention has flexibility by virtue of containing a structural unit derived from the compound represented by formula (B) in the polycarbonate diol and therefore, can be utilized effectively as a coating agent, etc., compared with an aqueous polyurethane emulsion using the conventional polycarbonate diol.

<I-2-11. Additives>

In the polyurethane of the present invention produced using the polycarbonate diol of the present invention, various additives such as thermal stabilizer, light stabilizer, coloring agent, bulking agent, stabilizer, ultraviolet absorber, antioxidant, anti-adhesive agent, flame retardant, age resistor and inorganic filler can be added and mixed as long as the characteristic features of the polyurethane of the present invention are not impaired.

The compound usable as the thermal stabilizer includes a phosphorus compound such as aliphatic, aromatic or alkyl-substituted aromatic ester of phosphoric acid or phosphorous acid, hypophosphorous acid derivative, phenylphosphonic acid, phenylphosphinic acid, diphenylphosphonic acid, polyphosphonate, dialkyl pentaerythritol diphosphite and dialkyl bisphenol A diphosphite; a phenolic derivative, among others, a hindered phenol compound; a sulfur-containing compound such as thioether-based, dithioate-based, mercaptobenzimidazole-based, thiocarbanilide-based and thiodipropionic acid ester-based compounds; and a tin-based compound such as tin malate and dibutyltin monoxide.

Specific examples of the hindered phenol compound include Irganox 1010 (trade name, produced by BASF Japan Ltd.), Irganox 1520 (trade name, produced by BASF Japan, Ltd.), and Irganox 245 (trade name, produced by BASF Japan, Ltd.).

The phosphorus compound includes PEP-36, PEP-24G, HP-10 (trade names, all produced by ADEKA Corporation), Irgafos 168 (trade name, produced by BASF Japan, Ltd.), etc.

Specific examples of the sulfur-containing compound include a thioether compound such as dilauryl thiopropionate (DLTP) and distearyl thiopropionate (DSTP).

Examples of the light stabilizer include benzotriazole-based and benzophenone-based compounds, and specifically, "TINUVIN 622LD", "TINUVIN 765" (both produced by Ciba Specialty Chemicals), "SANOL LS-2626", "SANOL LS-765" (both produced by Sankyo Co., Ltd.), etc. can be used.

Examples of the ultraviolet absorber include "TINUVIN 328" and "TINUVIN 234" (both produced by Ciba Specialty Chemicals).

Examples of the coloring agent include a dye such as direct dye, acid dye, basic dye and metal complex dye; an inorganic pigment such as carbon black, titanium oxide, zinc oxide, iron oxide and mica; and an organic pigment such as coupling azo-based, condensed azo-based, anthraquinone-based, thioindigo-based, dioxazone-based and phthalocyanine-based pigments.

Examples of the inorganic filler include short glass fiber, carbon fiber, alumina, talc, graphite, melamine, and white clay.

Examples of the flame retardant include an organic compound containing phosphorus and halogen, an organic compound containing bromine or chlorine, and additive and reactive flame retardants such as ammonium polyphosphate, aluminum hydroxide and antimony oxide.

One of these additives may be used alone, or two or more thereof may be used in any combination in an arbitrary ratio.

The lower limit of the amount of such an additive added is, in terms of weight ratio to polyurethane, preferably 0.01 wt %, more preferably 0.05 wt %, still more preferably 0.1 wt %, and the upper limit is preferably 10 wt %, more preferably 5 wt %, still more preferably 1 wt %. If the amount of the additive added is too small, the addition effect cannot be sufficiently obtained, and if the amount added is too large, the additive may precipitate in the polyurethane or cause turbidity.

<I-2-12. Polyurethane Film·Polyurethane Sheet>

In the case of producing a film by using the polyurethane of the present invention, the lower limit of the film thickness is preferably 10 μm, more preferably 20 μm, still more preferably 30 μm, and the upper limit is preferably 1,000 μm, more preferably 500 μm, still more preferably 100 μm.

If the film thickness is too large, adequate moisture permeability may not be obtained, and if the film thickness is too small, there is a tendency that a pinhole is formed or film blocking is readily caused, making the handling difficult.

<I-2-13. Molecular Weight>

The molecular weight of the polyurethane of the present invention is appropriately adjusted according to usage and is not particularly limited, but the polystyrene-reduced weight average molecular weight (Mw) as measured by GPC is preferably from 50,000 to 500,000, more preferably from 100,000 to 300,000. If Mw is less than the lower limit above, sufficient strength or hardness may not be obtained, and if it exceeds the upper limit above, the handling property such as processability tends to be impaired.

<I-2-14. Chemical Resistance>

In the polyurethane of the present invention, when evaluated, for example, by the method described later in the paragraph of Examples, the change ratio (%) of the weight of a polyurethane specimen after immersion in a chemical solution to the weight of the polyurethane specimen before immersion in the chemical solution is preferably 40% or less, more preferably 30% or less, still more preferably 20% or less.

If this weight change ratio exceeds the upper limit above, desired chemical resistance may not be obtained.

<I-2-15. Oleic Acid Resistance>

In the polyurethane of the present invention, when evaluated, for example, by the method described later in the paragraph of Examples, the change ratio (%) of the weight of a polyurethane specimen after immersion in oleic acid to the weight of the polyurethane specimen before immersion in the oleic acid is preferably 80% or less, more preferably 60% or less, still more preferably 50% or less, yet still more preferably 45% or less, and most preferably 40% or less.

If this weight change ratio exceeds the upper limit above, adequate oleic acid resistance may not be obtained.

<I-2-16. Ethanol Resistance>

In the polyurethane of the present invention, when evaluated, for example, by the method described in the paragraph of Examples later, the change ratio (%) of the weight of a polyurethane specimen after immersion in ethanol to the weight of the polyurethane specimen before immersion in the ethanol is preferably 25% or less, more preferably 23% or less, still more preferably 21% or less, yet still more preferably 20% or less, and most preferably 19% or less.

If this weight change ratio exceeds the upper limit above, adequate ethanol resistance may not be obtained.

<I-2-17. Tensile Elongation at Break>

In the polyurethane of the present invention, the lower limit of the tensile elongation at break as measured on a strip sample having a width of 10 mm, a length of 100 mm and a thickness of approximately from 50 to 100 Lm under the conditions of a chuck-to-chuck distance of 50 mm, a tensile speed of 500 mm/min, a temperature of 23° C. and a relative humidity of 50% is preferably 50%, more preferably 100%, still more preferably 150%, and the upper limit is preferably 900%, more preferably 850%, sill more preferably 800%. If the tensile elongation at break is less than the lower limit above, the handling property such as processability tends to be impaired, and if it exceeds the upper limit above, sufficient chemical resistance may not be obtained.

<I-2-18. Young's Modulus>

In a polyurethane having a polystyrene-reduced weight average molecular weight (Mw) of 140,000 to 210,000 as measured by GPC (hereinafter, sometimes referred to as "specific polyurethane"), which is produced by the one-step method by using the polycarbonate diol of the present invention, MDI and 1,4BD and setting the HS content % to a range of 12 to 13%, the Young's modulus at 23° C. as measured by the same method as in the above-described measurement of tensile elongation at break is preferably 0.02 or more, more preferably 0.04 or more, still more preferably 0.06 or more, and is preferably 2 or less, more preferably 1 or less, still more preferably 0.5 or less. If the Young's modulus is too low, the chemical resistance may be insufficient, and if the Young's modulus is too high, the flexibility may be inadequate or the handling property such as processability may be impaired. Furthermore, the Young's modulus of the specific polyurethane measured by the same method as in the above-described measurement of tensile elongation at break except for changing the temperature to −10° C. is preferably 0.01 or more, more preferably 0.02 or more, still more preferably 0.03 or more, yet still more preferably 0.05 or more, and is preferably 2 or less, more preferably 1 or less, still more preferably 0.5 or less, yet still more preferably 0.3 or less. If the Young's modulus at −10° C. is less than the lower limit above, the chemical resistance may be insufficient, and if the Young's modulus at −10° C. exceeds the upper limit above, the flexibility at low temperatures may be inadequate or the handling property such as processability may be impaired.

Here, the Young's modulus is a stress value at an elongation of 1% appearing as a gradient from the stress value at the initial elongation and is specifically measured by the method described later in the paragraph of Examples.

Incidentally, the HS (hard segment) content % can be calculated according to the following formula:

HS Content (wt %)=[weight of polyisocyanate charged (g)+weight of chain extender charged (g)+hardness adjusting agent (g)]+[weight of polyisocyanate charged (g)+weight of polycarbonate diol charged (g)+weight of another polyol charged (g)+weight of chain extender charged (g)+hardness adjusting agent (g)]

In the formula above, each member is the numerical value of the raw material used at the time of polyurethane production.

<I-2-19. 100% Modulus>

In the polyurethane of the present invention, when the polyurethane is obtained by the two-step method of reacting 2 equivalents of 4,4'-dicyclohexylmethane diisocyanate with the polycarbonate diol of the present invention and furthermore, performing a chain extension reaction with isophoronediamine, the lower limit of the 100% modulus as measured on a strip sample having a width of 10 mm, a length of 100 mm and a thickness of approximately from 50 to 100 μm under the conditions of a chuck-to-chuck distance of 50 mm, a tensile speed of 500 mm/min, a temperature of 23° C. and a relative humidity of 50% is preferably 0.1 MPa or more, more preferably 0.5 MPa or more, still more preferably 1 MPa or more, and the upper limit is preferably 20 MPa or less, more preferably 10 MPa or less, still more preferably 6 MPa or less. If the 100% modulus is less than the lower limit above, the chemical resistance may be inadequate, and if it exceeds the upper limit above, the flexibility may be insufficient or the handling property such as processability tends to be impaired. Furthermore, the 100% modulus of the specific polyurethane at −10° C. is preferably 0.5 or more, more preferably 1.0 or more, still more preferably 1.5 or more, yet still more preferably 2.0 or more, and is preferably 13.0 or less, more preferably 12.5 or less, still more preferably 12.0 or less, yet still more preferably 11.5 or less, and most preferably 10.0 or less. If the 100% modulus at −10° C. is less than the lower limit above, the chemical resistance may be inadequate, and if the 100% modulus at −10° C. exceeds the upper limit above, the flexibility at low temperatures may be insufficient, or the handling property such as processability may be impaired.

<I-2-20. Low-Temperature Characteristics>

The polyurethane of the present invention has good low-temperature characteristics, and the low-temperature characteristics as used in this application can be evaluated by the tensile elongation at break, the Young's modulus, and the 100% modulus, in a tensile test at a low temperature, e.g., −10° C. Specifically, the low-temperature characteristics are flexibility, impact resistance, flex resistance and durability, at low temperatures.

<I-2-21. Heat Resistance>

In the polyurethane of the present invention, when a urethane film having a width of 100 mm, a length of 100 mm and a thickness of approximately from 50 to 100 μm is heated in a gear oven at a temperature of 120° C. for 400 hours, the lower limit of the weight average molecular weight (Mw) of the sample after heating, relative to the weight average molecular weight (Mw) before heating, is preferably 15% or more, more preferably 20% or more, still more preferably 30% or more, yet still more preferably 45% or more, and the upper limit is preferably 120% or less, more preferably 110% or less, still more preferably 105% or less.

<I-2-22. Glass Transition Temperature>

In the case where the polyurethane is obtained by the two-step method of reacting 2 equivalents of 4,4'-dicyclohexylmethane diisocyanate with the polycarbonate diol of the present invention and furthermore, performing a chain extension reaction with isophoronediamine, the lower limit of the glass transition temperature (Tg) of the specific polyurethane having a polystyrene-reduced weight average molecular weight (Mw) of 130,000 to 210,000 as measured by GPC is preferably −50° C., more preferably −45° C., still more preferably −40° C., and the upper limit is preferably −20° C., more preferably −25° C., still more preferably −30° C. If Tg is less than the lower limit above, the chemical resistance may be inadequate, and if it exceeds the upper limit above, the low-temperature characteristics may be insufficient.

<I-2-23. Usage>

The polyurethane of the present invention has excellent chemical resistance and good low-temperature characteristics and therefore, can be widely used for a foam, an elastomer, an elastic fiber, a coating material, a fiber, a pressure-sensitive adhesive, an adhesive, a floor material, a sealant, a medical material, an artificial leather, a synthetic leather, a coating agent, an aqueous polyurethane coating material, an active energy ray-curable resin composition, etc.

Among others, when the polyurethane of the present invention is used for the application such as artificial leather, synthetic leather, aqueous polyurethane, adhesive, elastic fiber, medical material, floor material, coating material and coating agent, because of having a good balance between chemical resistance and low-temperature characteristics, good characteristic features of high durability, sufficient low-temperature flexibility and resistance to physical impact, etc. can be imparted to a portion which is put into contact with human skin or in which a cosmetic preparation or a rubbing alcohol is used. In addition, the polyurethane is also suitable for an intermediate coating material of an automotive exterior paint, requiring flexibility at a lower temperature.

The polyurethane of the present invention can be used for a cast polyurethane elastomer. Specific applications thereof include rolls such as pressure roll, papermaking roll, office machine and pretension roll; a solid tire, caster, etc. of a fork lift, a motor vehicle new tram, a carriage, a truck, etc.; and an industrial product such as conveyor belt idler, guide roll, pulley, steel pipe lining, rubber screen for ore, gears, connection ring, liner, pump impeller, cyclone cone and cyclone liner. In addition, the polyurethane can also be used for a belt of OA device, a paper feed roll, a cleaning blade for copier, a snow plow, a toothed belt, a surf roller, etc.

The polyurethane of the present invention is also applied to usage as a thermoplastic elastomer. For example, the polyurethane can be used for tubes or hoses in a pneumatic instrument employed in the food and medical fields, a coating apparatus, an analytical instrument, a physicochemical instrument, a metering pump, a water treatment apparatus, an industrial robot, etc., and for a spiral tube, a fire hose, etc. The polyurethane is also used as a belt such as round belt, V-belt and flat belt, in various transmission mechanisms, spinning machines, packaging machines, printing machines, etc. In addition, the polyurethane can also be used for a footwear heel top, a shoe sole, machine parts such as coupling, packing, ball joint, bush, gear and roll, sporting goods, leisure goods, a watchband, etc. The automobile parts include an oil stopper, a gearbox, a spacer, a chassis part, an interior trim, a tire chain substitute, etc. Furthermore, the polyurethane can be used for a film such as keyboard film and automotive film, a curl code, a cable sheath, a bellows, a conveying belt, a flexible container, a binder, a synthetic leather, a dipping product, an adhesive, etc.

The polyurethane of the present invention can also be applied to usage as a solvent-based two-component paint and can be applied to a wood product such as musical instrument, family altar, furniture, decorative plywood and sport gear. The polyurethane can also be used as a tar epoxy urethane for automobile repair.

The polyurethane of the present invention can be used as a component of a moisture-curable one-component paint, a blocked isocyanate-based solvent paint, an alkyd resin paint, a urethane-modified synthetic resin paint, an ultraviolet-curable paint, an aqueous urethane paint, etc. and can be applied, for example, to a coating material for plastic bumper, a strippable paint, a coating agent for magnetic tape, an overprint varnish of floor tile, floor material, paper, wood-grain printing film, etc., a wood varnish, a coil coating for high processing, an optical fiber protective coating, a solder resist, a topcoat for metal printing, a basecoat for vapor deposition, and a whitecoat for food cans.

The polyurethane of the present invention can be applied, as a pressure-sensitive adhesive or an adhesive, to food packaging, shoes, footwear, a magnetic tape binder, decorative paper, wood, a structural member, etc. and can also be used as a component of a low-temperature adhesive or a hot-melt.

The polyurethane of the present invention can be used, as a binder, for a magnetic recording medium, an ink, a casting, a fired brick, a grout, a microcapsule, a granular fertilizer, a granular agrichemical, a polymer cement mortar, a resin mortar, a rubber chip binder, a recycled foam, a glass fiber sizing, etc.

The polyurethane of the present invention can be used, as a component of a fiber-processing agent, for shrink proofing, crease proofing, water repellent finishing, etc.

In the case of using the polyurethane of the present invention as an elastic fiber, the method for fiberization thereof can be performed without any particular limitation as long as it is a method capable of spinning. For example, a melt spinning method where the polyurethane is once pelletized, then melt, and spun by directly passing the melt through a spinneret may be employed. In the case of obtaining an elastic fiber by melt spinning from the polyurethane of the present invention, the spinning temperature is preferably 250° C. or less, more preferably from 200 to 235° C.

The polyurethane elastic fiber of the present invention may be used directly as a bare fiber or can be coated with another fiber and used as a coated fiber. The another fiber includes conventionally known fibers such as polyamide fiber, wool, cotton and polyester fiber, and among others, a polyester fiber is preferably used in the present invention. In addition, the polyurethane elastic fiber of the present invention may contain a disperse dye of dyeing type.

The polyurethane of the present invention can be used, as a sealant/caulking, for a concrete wall, a control joint, a sash periphery, a wall-type PC joint, an ALC joint, a joint of boards, a composite glass sealant, a heat-insulating sash sealant, an automotive sealant, etc.

The polyurethane of the present invention can be used as a medical material and can be used, as a blood compatible material, for a tube, a catheter, an artificial heart, an artificial blood vessel, an artificial valve, etc. or, as a disposable material, for a catheter, a tube, a bag, a surgical glove, an artificial kidney potting material, etc.

The polyurethane of the present invention can be used, by modifying the terminal, as a raw material for an UV curable paint, an electron beam curable paint, a photosensitive resin composition for flexographic printing plate, a photocurable coating material composition for optical fiber, etc.

<I-2-24. Urethane (Meth)acrylate-Based Oligomer>

A urethane (meth)acrylate-based oligomer can also be produced by a reaction of adding a polyisocyanate to a hydroxyalkyl (meth)acrylate by using the polycarbonate diol of the present invention. In the case where a polyol as another raw material compound, a chain extender, etc. are used in combination, the urethane (meth)acrylate-based oligomer can be produced by a reaction of further adding such another raw material compound to a polyisocyanate.

At this time, the ratio of respective raw material compounds charged is substantially equal to or the same as that in the composition of the objective urethane (meth)acrylate-based oligomer.

Usually, the amount of all isocyanate groups in the urethane (meth)acrylate-based oligomer and the amount of all functional groups reacting with the isocyanate group, such as hydroxyl group and amino group, are theoretically equimolar.

At the time of producing the urethane (meth)acrylate-based oligomer, the amount of the hydroxyalkyl (meth) acrylate used is usually 10 mol % or more, preferably 15 mol % or more, more preferably 25 mol % or more, and is usually 70 mol % or less, preferably 50 mol % or less, relative to the total amount used of the hydroxyalkyl (meth) acrylate, the polycarbonate diol, the polyol as another raw material, and the compound containing a functional group reacting with isocyanate, such as chain extender. The molecular weight of the obtained urethane (meth)acrylate-based oligomer can be controlled according to the ratio above. When the ratio of the hydroxyalkyl (meth)acrylate is large, the molecular weight of the urethane (meth)acrylate-based oligomer tends to be small, and when the ratio is small, the molecular weight tends to be large.

The amount of the polycarbonate diol used is preferably 25 mol % or more, more preferably 50 mol % or more, still more preferably 70 mol % or more, relative to the total amount used of the polycarbonate diol and the polyol. When the amount of the polycarbonate diol used is not less than the lower limit above, the hardness and contamination resistance of the cured product obtained tend to be improved advantageously.

In addition, the amount of the polycarbonate diol used is preferably 10 mass % or more, more preferably 30 mass % or more, still more preferably 50 mass % or more, yet still more preferably 70 mass % or more, relative to the total amount used of the polycarbonate diol and the polyol. When the amount of the polycarbonate diol used is not less than the lower limit above, the viscosity of the obtained composition is likely to be reduced, improving the workability, or the mechanical strength, hardness and abrasion resistance of the cured product obtained tend to be enhanced advantageously.

Furthermore, the amount of the polycarbonate diol used is preferably 25 mol % or more, more preferably 50 mol % or more, still more preferably 70 mol % or more, relative to the total amount used of the polycarbonate diol and the polyol. When the amount of the polycarbonate diol used is not less than the lower limit above, the elongation and weather resistance of the cured product obtained tend to be improved advantageously.

In the case of using a chain extender, the amount of the polyol used is preferably 70 mol % or more, more preferably 80 mol % or more, still more preferably 90 mol % or more, yet still more preferably 95 mol % or more, relative to the total amount used of the polycarbonate diol, the polyol and the chain extender. When the amount of the polyol is not less than the lower limit above, the solution stability tends to be enhanced advantageously.

At the time of production of the urethane (meth)acrylate-based oligomer, a solvent can be used for the purpose of adjusting the viscosity. One solvent may be used alone, or two or more solvents may be mixed and used. As the solvent, any known solvent may be used. Preferable solvents include toluene, xylene, ethyl acetate, butyl acetate, cyclohexanone, methyl ethyl ketone, and methyl isobutyl ketone. The solvent can be used usually in an amount of less than 300 parts by mass per 100 parts by mass of the solid content in the reaction system.

At the time of production of the urethane (meth)acrylate-based oligomer, the total content of the urethane (meth)acrylate-based oligomer produced and raw material compounds therefor is preferably 20 mass % or more, more preferably 40 mass % or more, relative to the total amount of the reaction system. The upper limit of the total content is 100 mass %. When the total content of the urethane (meth)acrylate-based oligomer and raw material compounds therefor is 20 mass % or more, the reaction speed tends to be increased to advantageously enhance the production efficiency.

At the time of production of the urethane (meth)acrylate-based oligomer, an addition reaction catalyst can be used. The addition reaction catalyst includes, for example, dibutyltin laurate, dibutyltin dioctoate, dioctyltin dilaurate, and dioctyltin dioctoate. One addition reaction catalyst may be used alone, or two or more addition reaction catalysts may be mixed and used. Among these, the addition reaction catalyst is preferably dioctyltin dilaurate in view of environmental adaptability, catalytic activity and storage stability.

Relative to the total content of the urethane (meth)acrylate-based oligomer produced and raw material compounds therefor, the upper limit of the amount of the addition reaction catalyst used is usually 1,000 ppm or less, preferably 500 ppm or less, and the lower limit is usually 10 ppm or more, preferably 30 ppm or more.

At the time of production of the urethane (meth)acrylate-based oligomer, in the case of containing a (meth)acryloyl group in the reaction system, a polymerization inhibitor may be used in combination. The polymerization inhibitor includes, for example, phenols such as hydroquinone, methylhydroquinone, hydroquinone monoethyl ether and dibutylhydroxytoluene, amines such as phenothiazine and diphenylamine, a copper salt such as copper dibutyldithiocarbamate, a manganese salt such as manganese acetate, a nitro compound, and a nitroso compound. One polymerization inhibitor may be used alone, or two or more polymerization inhibitors may be mixed and used. Among these polymerization inhibitors, phenols are preferred.

Relative to the total content of the urethane (meth)acrylate-based oligomer produced and raw material compounds therefor, the upper limit of the amount of the polymerization inhibitor used is usually 3,000 ppm or less, preferably 1,000 ppm or less, more preferably 500 ppm or less, and the lower limit is usually 50 ppm or more, preferably 100 ppm or more.

At the time of production of the urethane (meth)acrylate-based oligomer, the reaction temperature is usually 20° C. or more, preferably 40° C. or more, more preferably 60° C. or more. When the reaction temperature is 20° C. or more, the reaction speed tends to be increased to advantageously enhance the production efficiency. In addition, the reaction temperature is usually 120° C. or less, preferably 100° C. or less. When the reaction temperature is 120° C. or less, a side reaction such as allophanation reaction is less likely to occur, and this is preferred. In the case of containing a solvent in the reaction system, the reaction temperature is preferably not more than the boiling point of the solvent, and in the case of containing (meth)acrylate, from the standpoint of preventing reaction of a (meth)acryloyl group, the reaction temperature is preferably 70° C. or less. The reaction time is usually on the order of 5 to 20 hours.

The number average molecular weight of the thus-obtained urethane (meth)acrylate-based oligomer is preferably 500 or more, more preferably 1,000 or more, and is preferably 10,000 or less, more preferably 5,000 or less, still more preferably 3,000 or less. When the number average molecular weight of the urethane (meth)acrylate-based oligomer is not less than the lower limit above, the cured film obtained has good three-dimensional processing suitability, and the balance between the three-dimensional processing suitability and the contamination resistance tends to be advantageously excellent. When the number average molecular weight of the urethane (meth)acrylate-based oligomer is not more than the upper limit above, the contamination resistance of the cured film obtained from the composition is improved, and the balance between the three-dimensional processing suitability and the contamination resistance tends to be advantageously excellent. This is presumed to result because the three-dimensional processing suitability and the contamination resistance are dependent on the distance between crosslinking points in a network structure and when the distance is long, the structure is a soft and stretchy structure to afford excellent three-dimensional processing suitability, whereas when the distance is short, the network structure is a rigid structure to afford excellent contamination resistance.

<I-2-25. Polyester-Based Elastomer>

Furthermore, the polycarbonate diol of the present invention can be used as a polyester-based elastomer. The polyester-based elastomer is a copolymer consisting of a hard segment mainly composed of an aromatic polyester and a soft segment mainly composed of an aliphatic polyether, an aliphatic polyester or an aliphatic polycarbonate. When the polycarbonate diol of the present invention is used as a constituent component of the soft segment, physical properties such as heat resistance and water resistance are excellent, compared with the case using an aliphatic polyether or an aliphatic polyester. Even when compared with a conventional polycarbonate diol, the polycarbonate ester elastomer obtained has fluidity during melting, that is, a melt flow rate suitable for blow molding and extrusion molding, and is excellent in the balance with the mechanical strength and other physical properties is obtained, and this elastomer can be suitably used as a various molding materials including a fibber, a film and a sheet, for example, as a molding material for an elastic fiber, a boot, a gear, a tube, a packing, etc. Specifically, the elastomer can be effectively applied to usage requiring heat resistance and durability, such as joint boot of automobiles, home electric appliance parts, etc., and wire coating material.

<I-2-26. Active Energy Ray-Curable Polymer Composition>

The active energy ray-curable polymer composition of the present invention containing the above-described urethane (meth)acrylate-based oligomer is described below.

In the active energy ray-curable polymer composition of the present invention, the calculated network molecular weight between crosslinking points of the composition is preferably from 500 to 10,000.

In the description of the present invention, the calculated network molecular weight between crosslinking points of the composition indicates an average value of the molecular weight between active energy ray reactive groups (hereinafter, sometimes referred as "crosslinking point") forming a network structure in the entire composition. The calculated network molecular weight between crosslinking points is correlated with the network area at the formation of a network structure and as the calculated network molecular weight between crosslinking points is larger, the crosslinking density decreases. In the reaction by active energy ray curing, a linear polymer is formed when a compound having only one active energy ray reactive group (hereinafter, sometimes referred as "monofunctional compound") is reacted, and on the other hand, a network structure is formed when a compound having two or more active energy ray reactive groups (hereinafter, sometimes referred to "polyfunctional compound") is reacted.

Therefore, an active energy ray reactive group contained in a polyfunctional compound is a crosslinking point, calculation of the calculated network molecular weight between crosslinking points is centered on a polyfunctional compound having a crosslinking point, and the calculated network molecular weight between crosslinking points is calculated by dealing with a monofunctional compound as effective in extending the molecular weight between crosslinking points contained in a polyfunctional compound. In addition, calculation of the calculated network molecular weight between crosslinking points is performed on the assumption that all active energy ray reactive groups have the same reactivity and all active energy ray reactive groups undergo a reaction by the irradiation with an active energy ray.

In a polyfunctional compound composition of a single system where only one polyfunctional compound undergoes a reaction, the calculated network molecular weight between crosslinking points is two times the average molecular weight per one active energy ray reactive group contained in a polyfunctional compound. For example, the calculated network molecular weight between crosslinking points is $(1,000/2) \times 2 = 1,000$ in the case of a bifunctional compound having a molecular weight of 1,000 and is $(300/3) \times 2 = 200$ in the case of a trifunctional compound having a molecular weight of 300.

In a polyfunctional compound composition of a mixed system where a plurality of polyfunctional compounds undergo a reaction, the calculated network molecular weight between crosslinking points of the composition is an average value of calculated network molecular weights between crosslinking points, of respective single systems for the number of all active energy ray reactive groups contained in the composition. For example, in a composition composed of a mixture containing 4 mol of a bifunctional compound having a molecular weight of 1,000 and 4 mol of a trifunctional compound having a molecular weight of 300, the number of all active energy ray reactive groups in the composition is $2 \times 4 + 3 \times 4 = 20$, and the calculated network molecular weight between crosslinking points of the composition is $\{(1,000/2) \times 8 + (300/3) \times 12\} \times 2/20 = 520$.

In the case of containing a monofunctional compound in the composition, assuming that the reaction is performed to add an equimolar amount of a polyfunctional compound to each active energy ray reactive group (i.e., crosslinking point) and locate a monofunctional compound at the center of a molecular chain formed by linking the monofunctional compound to a crosslinking point, computationally, the extended length of molecular chain by a monofunctional compound at one crosslinking point is half of a value obtained by dividing the total molecular weight of monofunctional compounds by the number of all active energy ray reactive groups of polyfunctional compounds in the composition. Here, since the calculated network molecular weight between crosslinking points is considered to be two times the average molecular weight per one crosslinking point, the extended length by a monofunctional compound, relative to the calculated network molecular weight between crosslinking points calculated in a polyfunctional compound, is a value obtained by dividing the total molecular weight of monofunctional compounds by the number of all active energy ray reactive groups of polyfunctional compounds in the composition.

For example, in a composition composed of a mixture containing 40 mol of a monofunctional compound having a molecular weight 100 and 4 mol of a bifunctional compound having a molecular weight 1,000, the number of active energy ray reactive groups of the polyfunctional compound is $2 \times 4 = 8$, and in the calculated network molecular weight between crosslinking points, the extended length by the monofunctional compound is $100 \times 40/8 = 500$. That is, the calculated network molecular weight between crosslinking points of the composition is $1,000 + 500 = 1,500$.

Based on the above, in a mixture containing $M_A$ mol of a monofunctional compound having a molecular weight of $W_A$, $M_B$ mol of an $f_B$-functional compound having a molecular weight of $W_B$, and $M_C$ mol of an $f_C$-functional compound having a molecular weight of $W_C$, the calculated network molecular weight between crosslinking points of the composition can be expressed by the following formula:

[Math. 2]

$$\frac{\left(\frac{W_A M_A}{f_B M_B + f_C M_C} + \frac{2W_B}{f_B}\right) \times f_B M_B + \left(\frac{W_A M_A}{f_B M_B + f_C M_C} + \frac{2W_C}{f_C}\right) \times f_C M_C}{f_B M_B + f_C M_C} = \frac{W_A M_A + 2W_B M_B + 2W_C M_C}{f_B M_B + f_C M_C}$$

The calculated network molecular weight between crosslinking points of the active energy ray-curable polymer composition of the present invention, which is calculated as above, is preferably 500 or more, more preferably 800 or more, still more preferably 1,000 or more, and is preferably 10,000 or less, more preferably 8,000 or less, still more preferably 6,000 or less, yet still more preferably 4,000 or less, even yet still more preferably 3,000 or less.

When the calculated network molecular weight between crosslinking points is 10,000 or less, the contamination resistance of cured film obtained from the composition tends to be improved, advantageously affording an excellent balance between three-dimensional processing suitability and contamination resistance. When the calculated network molecular weight between crosslinking points is 500 or more, the three-dimensional processing suitability of the cured film obtained tends to be improved, advantageously affording an excellent balance between three-dimensional processing suitability and contamination resistance. This is presumed to result because the three-dimensional processing suitability and the contamination resistance are dependent on the distance between crosslinking points in a network structure and when the distance is long, the structure is a soft and stretchy structure to afford excellent three-dimensional processing suitability, whereas when the distance is short, the network structure is a rigid structure to afford excellent contamination resistance.

The active energy ray-curable polymer composition of the present invention may contain components other than the urethane (meth)acrylate-based oligomer. Other components include an active energy ray reactive monomer, an active energy ray-curable oligomer, a polymerization initiator, a photosensitizer, an additive, and a solvent.

In the active energy ray-curable polymer composition of the present invention, the content of the urethane (meth) acrylate-based oligomer is preferably 40 mass % or more, more preferably 60 mass % or more, relative to the total amount of active energy ray reactive components including the urethane (meth)acrylate-based oligomer. The upper limit of this content is 100 mass %. When the content of the urethane (meth)acrylate oligomer is 40 mass % or more, good curability is obtained and when formed into a cured product, the three-dimensional processing suitability tends to be advantageously enhanced without an excessive increase in the mechanical strength.

In the active energy ray-curable polymer composition of the present invention, the content of the urethane (meth) acrylate-based oligomer is preferably larger in view of elongation and film forming property and, on the other hand, is preferably smaller in terms of reducing the viscosity. From these viewpoints, the content of the urethane (meth)acrylate-based oligomer is preferably 50 mass % or more, more preferably 70 mass % or more, relative to the total amount of all components including other components, in addition to the above-described active energy ray reactive components. The upper limit of the content of the urethane (meth) acrylate-based oligomer is 100 mass %, and the content is preferably not more than that.

In the active energy ray-curable polymer composition of the present invention, the total content of the active energy ray reactive components including the urethane (meth)acrylate-based oligomer is preferably 60 mass % or more, more preferably 80 mass % or more, still more preferably 90 mass % or more, yet still more preferably 95 mass % or more, relative to the total amount of the composition, because, for example, the curing rate and surface curability as a composition is excellent and tack does not remain. The upper limit of the content is 100 mass %.

As the active energy ray reactive monomer, any known active energy ray reactive monomer can also be used. Such an active energy ray reactive monomer is used with an aim to, for example, adjust the hydrophilicity/hydrophobicity of the urethane (meth)acrylate-based oligomer and the physical properties such as hardness and elongation of a cured product when the obtained composition is formed into a cured product. As the active energy ray reactive monomer, one monomer may be used alone, or two or more monomers may be mixed and used.

Such an active energy ray reactive monomer includes, for example, vinyl ethers, (meth)acrylamides, and (meth)acrylates, and specifically includes, for example, aromatic vinyl-based monomers such as styrene, α-methylstyrene, α-chlorostyrene, vinyltoluene and divinylbenzene; vinyl ester monomers such as vinyl acetate, vinyl butyrate, N-vinylformamide, N-vinylacetamide, N-vinyl-2-pyrrolidone, N-vinylcaprolactam and divinyl adipate; vinyl ethers such as ethyl vinyl ether and phenyl vinyl ether; allyl compounds such as diallyl phthalate, trimethylolpropane diallyl ether and allyl glycidyl ether; (meth)acrylamides such as (meth) acrylamide, N,N-dimethylacrylamide, N,N-dimethylmethacrylamide, N-methylol(meth)acrylamide, N-methoxymethyl(meth)acrylamide, N-butoxymethyl(meth)acrylamide, N-tert-butyl(meth)acrylamide, (meth)acryloylmorpholine and methylenebis(meth)acrylamide; a monofunctional (meth)acrylate such as (meth)acrylic acid, methyl (meth) acrylate, ethyl (meth)acrylate, propyl (meth)acrylate, n-butyl (meth)acrylate, i-butyl (meth)acrylate, tert-butyl (meth) acrylate, hexyl (meth)acrylate, 2-ethylhexyl (meth)acrylate, lauryl (meth)acrylate, stearyl (meth)acrylate, tetrahydrofurfuryl (meth)acrylate, morpholyl (meth)acrylate, 2-hydroxyethyl (meth)acrylate, 2-hydroxypropyl (meth)acrylate, 4-hydroxybutyl (meth)acrylate, glycidyl (meth)acrylate, dimethylaminoethyl (meth)acrylate, diethylaminoethyl (meth)acrylate, benzyl (meth)acrylate, cyclohexyl (meth) acrylate, phenoxyethyl (meth)acrylate, tricyclodecane (meth)acrylate, dicyclopentenyl (meth)acrylate, dicyclopentenyloxyethyl (meth)acrylate, dicyclopentanyl (meth)acrylate, allyl (meth)acrylate, 2-ethoxyethyl (meth)acrylate, isobornyl (meth)acrylate and phenyl (meth)acrylate; and a polyfunctional (meth)acrylate such as ethylene glycol di(meth)acrylate, diethylene glycol di(meth)acrylate, triethylene glycol di(meth)acrylate, tetraethylene glycol di(meth) acrylate, polyethylene glycol di(meth)acrylate (n=from 5 to 14), propylene glycol di(meth)acrylate, dipropylene glycol di(meth)acrylate, tripropylene glycol di(meth)acrylate, tetrapropylene glycol di(meth)acrylate, polypropylene glycol di(meth)acrylate (n=from 5 to 14), 1,3-butylene glycol di(meth)acrylate, 1,4-butanediol di(meth)acrylate, polybutylene glycol di(meth)acrylate (n=from 3 to 16), poly(1-methyl butylene glycol) di(meth)acrylate (n=from 5 to 20), 1,6-hexanediol di(meth)acrylate, 1,9-nonanediol di(meth) acrylate, neopentyl glycol di(meth)acrylate, hydroxypivalic acid neopentyl glycol di(meth)acrylic acid ester, dicyclopentanediol di(meth)acrylate, tricyclodecane di(meth)acrylate, trimethylolpropane tri(meth)acrylate, pentaerythritol tri(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, trimethylolpropane trioxyethyl (meth)acrylate, trimethylolpropane trioxypropyl (meth)acrylate, trimethylolpropane polyoxyethyl (meth) acrylate, trimethylolpropane polyoxypropyl (meth)acrylate, tris(2-hydroxyethyl) isocyanurate tri(meth)acrylate, tris(2-hydroxyethyl) isocyanurate di(meth)acrylate, ethylene oxide-added bisphenol A di(meth)acrylate, ethylene oxide-added bisphenol F di(meth)acrylate, propylene oxide-added bisphenol A di(meth)acrylate, propylene oxide-added bisphenol F di(meth)acrylate, tricyclodecanedimethanol di(meth)acrylate, bisphenol A epoxy di(meth)acrylate, and bisphenol F epoxy di(meth)acrylate.

Among these, a monofunctional (meth)acrylate having a ring structure in the molecule, such as (meth)acryloylmorpholine, tetrahydrofurfuryl (meth)acrylate, benzyl (meth) acrylate, cyclohexyl (meth)acrylate, trimethylcyclohexyl (meth)acrylate, phenoxyethyl (meth)acrylate, tricyclodecane (meth)acrylate, dicyclopentenyl (meth)acrylate, isobornyl (meth)acrylate and (meth)acrylamide, is preferred in the application requiring coatability, and a polyfunctional (meth)acrylate, such as 1,4-butanediol di(meth)acrylate, 1,6- hexanediol di(meth)acrylate, 1,9-nonanediol di(meth)acrylate, neopentyl glycol di(meth)acrylate, tricyclodecane di(meth)acrylate, trimethylolpropane tri(meth)acrylate, pentaerythritol tri(meth)acrylate, pentaerythritol tetra(meth)acrylate, dipentaerythritol tetra(meth)acrylate, dipentaerythritol penta(meth)acrylate and dipentaerythritol hexa(meth)acrylate, is preferred in the application requiring mechanical strength of the cured product obtained.

In the active energy ray-curable polymer composition of the present invention, from the standpoint of adjusting the viscosity of the composition and adjusting the physical properties such as hardness and elongation of the cured product obtained, the content of the active energy ray reactive monomer is preferred to be 50 mass % or less, more preferably 30 mass % or less, still more preferably 20 mass % or less, yet still more preferably 10 mass % or less, relative to the total amount of the composition.

As for the active energy ray curable oligomer, one oligomer may be used alone, or two or more oligomers may be mixed and used. The active energy ray curable oligomer includes an epoxy (meth)acrylate-based oligomer and an acrylic (meth)acrylate oligomer.

In the active energy ray-curable polymer composition of the present invention, from the standpoint of adjusting the physical properties such as hardness and elongation of the cured product obtained, the content of the active energy ray reactive oligomer is preferably 50 mass % or less, more preferably 30 mass % or less, still more preferably 20 mass % or less, yet still more preferably 10 mass % or less, relative to the total amount of the composition.

The above-described polymerization initiator is used mainly for the purpose of improving the initiation efficiency of polymerization reaction that proceeds by the irradiation with an active energy ray such as ultraviolet ray and electron beam. The polymerization initiator is generally a radical photopolymerization initiator that is a compound having a property of generating a radical by light, and any known radical photopolymerization initiator can be used. One polymerization initiator may be used alone, or two or more polymerization initiators may be mixed and used. In addition, a radical photopolymerization initiator and a photosensitizer may be used in combination.

The radical photopolymerization initiator includes, for example, benzophenone, 2,4,6-trimethylbenzophenone, 4,4-bis(diethylamino)benzophenone, 4-phenylbenzophenone, methylorthobenzoyl benzoate, thioxanthone, diethylthioxanthone, isopropylthioxanthone, chlorothioxanthone, 2-ethylanthraquinone, tert-butylanthraquinone, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether, methylbenzoyl formate, 2-methyl-1-{4-(methylthio)phenyl}-2-morpholinopropan-1-one, 2,6-dimethylbenzoyldiphenylphosphine oxide, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)phenylphosphine oxide, and 2-hydroxy-1-[4-[4-(2-hydroxy-2-methyl-propionyl)-benzyl]-phenyl]-2-methyl-propan-1-one.

Among these, from the standpoint that the curing rate is high and the crosslinking density can be sufficiently increased, benzophenone, 2-hydroxy-2-methyl-1-phenylpropan-1-one, 1-hydroxycyclohexyl phenyl ketone, 2,4,6-trimethylbenzoyldiphenylphosphine oxide and 2-hydroxy-1-[4-[4-(2-hydroxy-2-methyl-propionyl)-benzyl]-phenyl]-2-methyl-propan-1-one are preferred, and 1-hydroxycyclohexyl phenyl ketone, 2,4,6-trimethylbenzoyldiphenylphosphine oxide and 2-hydroxy-1-[4-[4-(2-hydroxy-2-methyl-propionyl)-benzyl]-phenyl]-2-methyl-propan-1-one are more preferred.

In the case where the active energy ray-curable polymer composition contains a compound having a cationic polymerizable group such as epoxy group together with a radical polymerizable group, as the polymerization initiator, a cationic photopolymerization initiator may be contained together with the above-described radical photopolymerization initiator. Also for this initiator, any known cationic photopolymerization initiator may be used.

In the active energy ray-curable polymer composition of the present invention, the content of the polymerization initiator is preferably 10 parts by mass or less, more preferably 5 parts by mass or less, per 100 parts by mass of the total of the active energy ray reactive components. When the content of the photopolymerization initiator is 10 parts by mass or less, reduction in the mechanical strength due to decomposed initiator is less likely to occur, and this is preferred.

The photosensitizer may be used for the same purpose as the polymerization initiator. One photosensitizer may be used alone, or two or more photosensitizers may be mixed and used. As the photosensitizer, any of known photosensitizers can be used as long as the effects of the present invention are obtained. Such a photosensitizer includes, for example, ethanolamine, diethanolamine, triethanolamine, N-methyldiethanolamine, methyl 4-dimethylaminobenzoate, ethyl 4-dimethylaminobenzoate, amyl 4-dimethylaminobenzoate, and 4-dimethylaminoacetophenone.

In the active energy ray-curable polymer composition of the present invention, the content of the photosensitizer is preferably 10 parts by mass or less, more preferably 5 parts by mass or less, per 100 parts by mass of the total of the active energy ray reactive components. When the content of the photosensitizer is 10 parts by mass or less, reduction in the mechanical strength due to decreased crosslinking density is less likely to occur, and this is preferred.

The additive is arbitrary, and various materials added to a composition used for the same application can be used as the additive. One additive may be used alone, or two or more additives may be mixed and used. Such an additive includes, for example, fillers such as glass fiber, glass bead, silica, alumina, calcium carbonate, isinglass, zinc oxide, titanium oxide, mica, talc, kaolin, metal oxide, metal fiber, iron, lead and metal powder; carbon materials such as carbon fiber, carbon black, graphite, carbon nanotube and fullerenes, e.g., C60 (fillers and carbon materials are sometimes collectively called "inorganic component"); modifying agents such as antioxidant, thermal stabilizer, ultraviolet absorber, HALS (hindered amine light stabilizer), fingerprint-resisting agent, surface hydrophilizing agent, antistatic agent, slippage imparting agent, plasticizer, release agent, antifoaming agent, leveling agent, antisettling agent, surfactant, thixotropy imparting agent, lubricant, flame retardant, flame retardant aid, polymerization inhibitor, bulking agent and silane coupling agent; coloring agents such as pigment, dye and hue adjuster; and monomers and/or oligomers thereof, or curing agents, catalysts and curing accelerators which are necessary for the synthesis of an inorganic component.

In the active energy ray-curable polymer composition of the present invention, the content of the additive above is preferably 10 parts by mass or less, more preferably 5 parts by mass or less, per 100 parts by mass of the total of the active energy ray reactive components. When the content of the additive is 10 parts by mass or less, reduction in the mechanical strength due to decreased crosslinking density is less likely to occur, and this is preferred.

The solvent can be used, for example, according to the coating method for forming a coating film of an active energy ray-curable polymer composition of the present invention, so as to adjust the viscosity of the active energy ray-curable polymer composition of the present invention. One solvent may be used alone, or two or more solvents may be mixed and used. As the solvent, any known solvent can be used as long as the effects of the present invention are obtained. Preferable solvents include toluene, xylene, ethyl acetate, butyl acetate, isopropanol, isobutanol, cyclohexane, methyl ethyl ketone, and methyl isobutyl ketone. The solvent can be used usually in an amount of less than 200 parts by mass per 100 parts by mass of the solid content of the active energy ray-curable polymer composition.

The method for incorporating an optional component, e.g., the above-described additive, into the active energy ray-curable polymer composition of the present invention is not particularly limited and includes conventionally known mixing and dispersion methods, etc. In order to more unfailingly disperse the optional component, a dispersion treatment is preferably performed using a disperser. Specifically, the method therefor includes a method using, for example, a twin roll, a triple roll, a bead mill, a ball mill, a sand mill, a pebble mill, a trommel mill, a sand grinder, a Szegvari attritor, a planetary agitator, a high-speed impeller disperser, a high-speed stone mill, a high-speed impact mill, a kneader, a homogenizer, an ultrasonic disperser, etc.

The viscosity of the active energy ray-curable polymer composition of the present invention can be appropriately adjusted according to usage, use mode, etc. of the composition, but in view of handling property, coatability, moldability, three-dimensional formability, etc., the viscosity with an E-type viscometer (rotor 1° 34'×R24) at 25° C. is preferably 10 mPa·s or more, more preferably 100 mPa·s or more, and is preferably 100,000 mPa·s or less, more preferably 50,000 mPa·s or less. The viscosity of the active energy ray-curable polymer composition can be adjusted, for example, by the content of the urethane (meth)acrylate-based oligomer of the present invention or the type or blending ratio of the optional component.

As the method for coating the active energy ray-curable polymer composition of the present invention, a known method such as bar coater method, applicator method, curtain flow coater method, roll coater method, spray method, gravure coater method, comma coater method, reverse roll coater method, lip coater method, die coater method, slot die coater method, air knife coater method and dip coater method may be applied, and among these, a bar coater method and a gravure coater method are preferred.

<I-2-27. Cured Film and Laminate>

The active energy ray-curable polymer composition of the present invention can be formed into a cured film by irradiating the composition with an active energy ray.

The active energy ray that can be used when curing the composition includes infrared ray, visible ray, ultraviolet ray, X-ray, electron beam, α-ray, β-ray, γ-ray, etc. In view of equipment cost and productivity, an electron beam or an ultraviolet ray is preferably utilized. As the light source, an electron beam irradiation apparatus, an ultrahigh pressure mercury lamp, a high pressure mercury lamp, a middle pressure mercury lamp, a low pressure mercury lamp, a metal halide lamp, an Ar laser, a He—Cd laser, a solid-state laser, a xenon lamp, a high-frequency induction mercury lamp, sun light, etc. are suited.

The irradiation dose of the active energy ray may be appropriately selected according to the kind of the active energy ray, and, for example, in the case of curing the composition by electron beam irradiation, the irradiation dose is preferably from 1 to 10 Mrad. In the case of ultraviolet ray irradiation, the irradiation dose is preferably from 50 to 1,000 mJ/cm$^2$. The atmosphere during curing may be air or an inert gas such as nitrogen and argon. In addition, the irradiation may also be applied in a closed space between a film or glass and a metal mold.

The film thickness of the cured film may be appropriately determined according to the intended use, but the lower limit is preferably 1 μm, more preferably 3 μm, still more preferably 5 μm, and the upper limit is preferably 200 μm, more preferably 100 μm, still more preferably 50 μm. When the film thickness is 1 μm or more, the design property and functionality after three-dimensional processing are successfully developed, and on the other hand, when the film thickness is 200 μm or less, advantageously, the internal curability and three-dimensional processing suitability are good. At the time of use in industry, the lower limit is preferably 1 μm, and the upper limit is preferably 100 μm, more preferably 50 μm, still more preferably 20 μm, and most preferably 10 μm.

A laminate having, on a base material, a layer composed of the cured film above can be obtained.

The laminate is not particularly limited as long as it has a layer composed of the cured film, and the laminate may have a layer other than the base material and the cured film, between the base material and the cured film or on the outside thereof. In addition, the laminate may have a plurality of base material or cured film layers.

As the method for obtaining a laminate having a plurality of cured film layers, there may be applied a known method, for example, a method where all layers are stacked in the uncured state and then cured with an active energy ray, a method where after a lower layer is cured or semi-cured with an active energy ray, an upper layer is coated thereon and the stack is again cured with an active energy ray, or a method where each layer is coated on a release film or a base film and the layers are laminated together in the uncured or semi-cured state. From the standpoint of increasing the adherence between layers, a method of stacking layers in the uncured state and then curing the stack with an active energy ray is preferred. As the method for stacking layers in the uncured state, a known method, such as sequential coating of applying a lower layer and then overlaying it by applying an upper layer, and simultaneous multilayer coating of simultaneously applying two or more layers from a multi-slit to overlay one with another, can be applied, but the present invention is not limited thereto.

The base material includes articles having various shapes such as plate, formed of a metal or various plastics, for example, a polyester such as polyethylene terephthalate and polybutylene terephthalate, a polyolefin such as polypropylene and polyethylene, a nylon, a polycarbonate, and a (meth)acrylic resin.

The cured film can be a film excellent in the contamination resistance to general home contamination, such as ink and ethanol, and hardness, and the laminate using the cured film as a coat on various base materials can be a laminate excellent in the design property and surface protective property.

The active energy ray-curable polymer composition of the present invention, when the calculated network molecular weight between crosslinking points is taken into consideration, can provide a cured film satisfying the flexibility for following deformation during three-dimensional processing, the elongation at break, the mechanical strength, the contamination resistance, and the hardness, all at the same time.

The active energy ray-curable polymer composition of the present invention is expected to enable a thin-film resin sheet to be simply and easily produced by one-layer coating.

As for the elongation at break of the cured film, the value measured by cutting the cured film into a width of 10 mm and performing a tensile test by the use of a Tensilon tensile tester (manufactured by Orientec, Co. Ltd., Tensilon UTM-III-100) under the conditions of a temperature of 23° C., a tensile speed of 50 mm/min and a chuck-to-chuck distance of 50 mm, is preferably 50% or more, more preferably 75% or more, still more preferably 100% or more, yet still more preferably 120% or more.

The cured film and the laminate can be used as a film substituting for paint application and can be effectively applied to, for example, a construction decorative material for interior and exterior decoration, and various members of automobiles, home appliances, etc.

The polycarbonate diol (II) of the present invention is described below.

[II-1. Polycarbonate Diol]

The polycarbonate diol (II) of the present invention is a polycarbonate diol having a hydroxyl value of 20 to 45 mg-KOH/g, wherein the glass transition temperature of the polycarbonate diol as measured by a differential scanning calorimeter is −30° C. or less and the average carbon number of a dihydroxy compound obtained by hydrolyzing the polycarbonate diol is from 3 to 5.5.

<II-1-1. Hydroxyl Value>

The hydroxyl value of the polycarbonate diol of the present invention is from 20 to 45 mg-KOH/g. The lower limit is preferably 25 mg-KOH/g, more preferably 30 mg-KOH/g, still more preferably 35 mg-KOH/g, and the upper limit is preferably 42 mg-KOH/g, more preferably 40 mg-KOH/g, still more preferably 38 mg-KOH/g. If the hydroxyl value is less than the lower limit above, the viscosity of the polycarbonate diol is excessively high, making the handling difficult at the time of polyurethane formation, and if the hydroxyl value exceeds the upper limit above, physical properties such as flexibility, low-temperature characteristics and elastic recovery performance may be inadequate when a polyurethane is formed using the polycarbonate diol.

Within the range above, the flexibility, low-temperature characteristics and elastic recovery performance when processed into a polyurethane are excellent, and good physical properties in terms of chemical resistance and heat resistance are also obtained.

<II-1-2. Structural Feature>

In the polycarbonate diol of the present invention, the average carbon number of a dihydroxy compound obtained by hydrolyzing the polycarbonate diol is from 3 to 5.5, whereby good chemical resistance and heat resistance can be obtained when processed into a polyurethane. The upper limit of the average carbon number is 5.5, preferably 5.3, more preferably 5.0, still more preferably 4.7, and most preferably 4.5. The lower limit of the average carbon number is 3, preferably 3.2, more preferably 3.4, still more preferably 3.5. If the average carbon number is less than the lower limit above, the flexibility and low-temperature characteristics may be inadequate, and if the average carbon number exceeds the upper limit above, the chemical resistance and heat resistance may be poor.

The dihydroxy compound obtained by hydrolyzing the polycarbonate diol may be one kind or multiple kinds of compounds. In the case of multiple kinds of compounds, the dihydroxy compound may be a copolymer or a mixture of different polycarbonate diols, but a copolymer is preferred, because the low-temperature characteristics and flexibility are good. In the case of a copolymer, the copolymer may be a block copolymer or a random copolymer, but a random copolymer is preferred, because the polycarbonate diol has good low-temperature characteristics and flexibility.

The dihydroxy compound obtained by hydrolyzing the polycarbonate diol is preferably an aliphatic dihydroxy compound, and the aliphatic dihydroxy compound includes 1,3-propanediol, 2-methyl-1,3-propanediol, 1,3-butanediol, 1,4-butanediol, 2-methyl-1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,20-eicosanediol, etc. Among others, an aliphatic dihydroxy compound having no substituent is preferred, because the polyurethane has good physical properties such as chemical resistance and heat resistance. Furthermore, the hydroxy compound preferably contains, as a dihydroxy compound having a small carbon number affording good physical properties in terms of chemical resistance and heat resistance, at least one member selected from the group consisting of 1,3-propanediol, 1,4-butanediol and 1,5-pentanediol, more preferably either one of 1,3-propanediol and 1,4-butanediol. In addition, the crystallinity of the polycarbonate diol is preferably higher, because the physical properties in terms of chemical resistance and heat resistance are good, and for this reason, the dihydroxy compound obtained by hydrolyzing the polycarbonate diol preferably contains 1,4-butanediol.

The dihydroxy compound obtained by hydrolyzing the polycarbonate diol is preferably a plant-derived compound. The compound applicable as a plant-derived compound includes 1,3-propanediol, 1,4-butanediol, 1,5-propanediol, 1,6-hexanediol, 1,9-nonanediol, 1,10-decanediol, 1,11-undecanediol, 1,12-dodecanediol, 1,13-tridecanediol, 1,20-eicosanediol, etc.

As the plant-derived dihydroxy compound, for example, in the case of 1,4-butanediol, the 1,4-butanediol may be produced by chemical synthesis from succinic acid obtained by a fermentation process, succinic anhydride, succinic acid ester, maleic acid, maleic anhydride, maleic acid ester, tetrahydrofuran, γ-butyrolactone, etc.; the 1,4-butanediol may be produced directly by a fermentation process; or the 1,4-butanediol may be produced from 1,3-butadiene obtained by a fermentation process. Among others, a method of directly producing 1,4-butanediol by a fermentation process, and a method of hydrogenating succinic acid by a reduction catalyst to obtain 1,4-butanediol are efficient and preferred.

In the case of 1,3-propanediol, the compound is obtained by producing 3-hydroxypropionaldehyde from glycerol, glucose or other sugars by a fermentation process and converting the product into 1,3-propanediol or by directly producing 1,3-propanediol from glucose or other sugars by a fermentation process.

In addition, 1,10-decanediol can be synthesized by synthesizing sebacic acid from castor oil by alkali melting and hydrogenating the sebacic acid directly or after an esterification reaction.

<II-1-3. Glass Transition Temperature>

The glass transition temperature (Tg) of the polycarbonate diol of the present invention as measured by a differential scanning calorimeter (hereinafter, sometimes referred to as "DSC") is −30° C. or less, preferably −35° C. or less. If Tg is too high, the Tg when processed into a polyurethane is also elevated, and the low-temperature characteristics may be deteriorated.

The polycarbonate diol of the present invention is derived from the discovery that a polycarbonate diol satisfying the conditions that the hydroxyl value falls in a specific range, the glass transition temperature falls in a specific range, and the average carbon number of a dihydroxy compound obtained by hydrolyzing the polycarbonate diol falls in a specific range, is a polycarbonate diol working out to a raw material of a polyurethane excellent in the physical property balance among flexibility, chemical resistance, low-temperature characteristics, heat resistance and elastic recovery performance.

<II-1-4. Molecular Chain Terminal>

The molecular chain terminal of the polycarbonate diol of the present invention is mainly a hydroxyl group. However, in the case of a polycarbonate diol obtained by the reaction of a dihydroxy compound with a carbonate compound, a polycarbonate diol in which the molecular chain terminal is partially not a hydroxyl group may be present as an impurity. Specific examples thereof include a structure where the molecular chain terminal is an alkyloxy group or an aryloxy group and many of these terminals are derived from the carbonate compound.

For example, in the case where diphenyl carbonate, dimethyl carbonate, diethyl carbonate and ethylene carbonate are used as the carbonate compound, there may remain, as a molecular chain terminal, a phenoxy group (PhO—) as an aryloxy group, a methoxy group (MeO—) as an alkyloxy group, an ethoxy group (EtO—) and a hydroxyethoxy group (HOCH$_2$CH$_2$O—), respectively (wherein Ph represents a phenyl group, Me represents a methyl group, and Et represents an ethyl group).

The ratio of the molecular chain terminal other than a hydroxyl group of the polycarbonate diol of the present invention is preferably 10 mol % or less, more preferably 5 mol % or less, still more preferably 3 mol % or less, yet still more preferably 1 mol % or less, relative to the total number of terminals.

<II-1-5. Molecular Weight·Molecular Weight Distribution>

The ratio of the polystyrene-reduced weight average molecular weight of the polycarbonate diol of the present invention as measured by gel permeation chromatography (hereinafter, sometimes simply referred to as "GPC") to the polystyrene-reduced number average molecular weight is preferably from 1.5 to 3.0. The lower limit is more preferably 1.7, still more preferably 1.8. The upper limit is more preferably 2.5, still more preferably 2.3. If the ratio above exceeds this range, the physical properties of a polyurethane produced using the polycarbonate diol have a tendency, for example, to become hard at low temperatures or decrease in the elongation, and when it is intended to produce a polycarbonate diol having a molecular weight distribution less than the range above, a high-level purification operation such as removal of an oligomer may be required.

The number average molecular weight of the polycarbonate diol can be determined from the hydroxyl value, and the lower limit of the number average molecular weight (Mn) is preferably 2,500, more preferably 2,700, still more preferably 2,800, yet still more preferably 2,900. On the other hand, the upper limit is preferably 5,500, more preferably 4,500, still more preferably 3,500. If Mn of the polycarbonate diol is less than the lower limit above, flexibility, low-temperature characteristics and elastic recovery performance may not be sufficiently obtained when a urethane is formed, whereas if it exceeds the upper limit above, the viscosity may be increased, impairing the handling at the time of polyurethane formation. In particular, within the above-described preferable range, the flexibility, low-temperature characteristics and elastic recovery performance when processed into a polyurethane are excellent, and good physical properties in terms of chemical resistance and heat resistance are also obtained.

<II-1-6. APHA Value>

The color of the polycarbonate diol of the present invention is, in terms of the value as expressed by the Hazen color number (in conformity with JIS K0071-1:1998) (hereinafter, referred to as "APHA value"), 60 or less, preferably 50 or less, more preferably 30 or less, still more preferably 20 or less. If the APHA value exceeds 60, the color tone of a polyurethane obtained using the polycarbonate diol as a raw material is deteriorated to reduce the commercial value or impair the thermal stability. In order to make the APHA value be 60 or less, it is necessary to select the kind or amount of the catalyst or additive at the time of production of a polycarbonate diol and comprehensively control the heat history, the concentration of a monohydroxy compound during polymerization and after the completion of polymerization, or the concentration of an unreacted monomer. Shielding light during polymerization and after the completion of polymerization is also effective. In addition, setting of the molecular weight of the polycarbonate diol and the selection of the dihydroxy compound species as a monomer are also important. Among others, a polycarbonate diol using, as a raw material, an aliphatic dihydroxy compound having an alcoholic hydroxyl group, when processed into a polyurethane, exhibits various excellent performances such as flexibility, water resistance and light resistance but is likely to be conspicuously colored due to heat history or catalyst, compared with the case using an aromatic dihydroxy compound as a raw material, and therefore, it is not easy to make the APHA value be 60 or less.

<II-1-7. Melting Peak Temperature, Melting Heat Quantity>

The melting peak temperature (Tm) of the polycarbonate diol of the present invention as measured by a differential scanning calorimeter is 50° C. or more, preferably 55° C. or more, more preferably 60° C. or more. The lower limit of the melting heat quantity is 5.0 J/g or more, preferably 7.0 J/g or more, more preferably 9.0 J/g or more, and the upper limit is 80 J/g or less, preferably 40 J/g or less, more preferably 35 J/g or less, still more preferably 30 J/g or less, yet still more preferably 25 J/g or less, and most preferably 20 J/g or less. If the melting heat quantity is less than the lower limit above, the crystallinity of the polycarbonate diol is low, and the physical properties in terms of chemical resistance and heat resistance when processed into a polyurethane may be poor, whereas if it exceeds the upper limit above, a large quantity of heat may be required at the time of heat-melting the polycarbonate diol, resulting in poor handling property.

[II-2. Production Method of Polycarbonate Diol]

<II-2-1. Dihydroxy Compound>

The dihydroxy compound working out to a raw material in the production method of the polycarbonate diol of the present invention includes 1,3-propanediol, 2-methyl-1,3-propanediol, 1,3-butanediol, 1,4-butanediol, 2-methyl-1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,20-eicosanediol, etc.

In the polycarbonate diol of the present invention, the average carbon number of a dihydroxy compound obtained by hydrolyzing the polycarbonate diol is from 3 to 5.5 and therefore, the dihydroxy compound working out to a raw material preferably contains at least one member selected from the group consisting of 1,3-propanediol, 1,4-butanediol and 1,5-propanediol, and in view of chemical resistance when processed into a polyurethane, more preferably contains 1,3-propanediol and/or 1,4-butanediol. In addition, the crystallinity of the polycarbonate diol is preferably higher, because the physical properties in terms of chemical resistance and heat resistance are good, and it is preferable to contain 1,4-butanediol.

From the standpoint of reducing the environmental impact, the dihydroxy compound working out to a raw material in the production method of the polycarbonate diol of the present invention is preferably plant-derived. The compound applicable as a plant-derived compound includes 1,3-propanediol, 1,4-butanediol, 1,5-propanediol, 1,6-hexanediol, 1,9-nonanediol, 1,10-decanediol, 1,11-undecanediol, 1,12-dodecanediol, 1,13-tridecanediol, 1,20-eicosanediol, etc.

<II-2-2. Carbonate Compound>

The carbonate compound that can be used is preferably a diaryl carbonate in view of reactivity. Among others, in the synthesis of the later-described polycarbonate diol having a molecular weight of 2,500 or more in terms of the number average molecular weight (Mn) determined from the hydroxyl value, a diaryl carbonate is preferably used.

Specific examples of the carbonate compound that can be used for the production of the polycarbonate diol of the present invention include diphenyl carbonate.

<II-2-3. Use Ratio of Raw Material, Etc.>

In the production of the polycarbonate diol of the present invention, the amount of the carbonate compound used is not particularly limited, but usually, in terms of the molar ratio relative to 1 mol of the total of dihydroxy compounds, the lower limit is preferably 0.90, more preferably 0.92, still more preferably 0.94, and the upper limit is preferably 1.00, more preferably 0.98, still more preferably 0.97. If the amount of the carbonate compound used exceeds the upper limit above, the proportion of a polycarbonate diol in which the terminal group is not a hydroxyl group may be increased, or the molecular weight may not fall in the predetermined range, and if it is less than the lower limit above, the polymerization may not proceed until the predetermined molecular weight.

<II-2-4. Transesterification Catalyst>

The polycarbonate diol of the present invention can be produced by subjecting the above-described dihydroxy compound and carbonate compound to polycondensation through a transesterification reaction.

In the case of producing the polycarbonate diol of the present invention, a transesterification catalyst (hereinafter, sometimes referred to as "catalyst") may be used so as to accelerate the transesterification reaction. At this time, when a too large amount of the catalyst remains in the polycarbonate diol obtained, the catalyst may inhibit the reaction or excessively accelerate the reaction at the time of producing a polyurethane by using the polycarbonate diol.

Therefore, although the amount of the catalyst remaining in the polycarbonate diol is not particularly limited, the content in terms of catalyst metal is preferably 100 ppm or less, more preferably 50 ppm or less, still more preferably 10 ppm or less.

As the transesterification catalyst, a compound generally recognized to have a transesterification ability may be used without limitation.

Examples and preferred embodiments of the transesterification catalyst are the same as examples and preferred embodiments described in the paragraph of <I-1-4. Transesterification Catalyst>.

<II-2-5. Catalyst Deactivator>

As described above, in the case of using a catalyst at the time of transesterification reaction, the catalyst usually remains in the polycarbonate diol obtained, and due to the remaining catalyst, the polyurethane forming reaction may not be controlled. In order to suppress the effect of the remaining catalyst, the transesterification catalyst is preferably deactivated by adding, for example, a phosphorus-based compound in a substantially equimolar amount to the transesterification catalyst used. Furthermore, after the addition, by applying a heating treatment, etc. as described later, the transesterification reaction can be efficiently deactivated.

The phosphorous-based compound used for deactivation of the transesterification catalyst includes, for example, an inorganic phosphoric acid such as phosphoric acid and phosphorous acid, and an organic phosphoric acid ester such as dibutyl phosphate, tributyl phosphate, trioctyl phosphate, triphenyl phosphate and triphenyl phosphite.

One of these may be used alone, or two or more kinds thereof may be used in combination.

The amount of the phosphorus-based compound used is not particularly limited and, as described above, may be sufficient if it is substantially equimolar to the amount of the transesterification catalyst used. Specifically, relative to 1 mol of the transesterification catalyst used, the upper limit is preferably 5 mol, more preferably 2 mol, and the lower limit is preferably 0.8 mol, more preferably 1.0 mol. If a phosphorous-based compound in an amount less than the range above is used, deactivation of the transesterification catalyst in the reaction product may be inadequate, making it impossible to sufficiently reduce the reactivity of the polycarbonate diol with an isocyanate group when using the obtained polycarbonate diol, for example, as a raw material for the production of a polyurethane. If a phosphorus-based compound in an amount exceeding the range above is used, the polycarbonate diol obtained may be colored.

Deactivation of the transesterification catalyst by the addition of a phosphorus-based compound may be performed at room temperature, but when a heating treatment is applied, more efficient deactivation is achieved. The temperature of the heating treatment is not particularly limited, but the upper limit is preferably 150° C., more preferably 120° C., still more preferably 100° C., and the lower limit is preferably 50° C., more preferably 60° C., still more preferably 70° C. If the temperature is less than the range above, deactivation of the transesterification catalyst takes much time and is inefficient, or the degree of deactivation may be insufficient. On the other hand, if the temperature exceeds 150° C., the polycarbonate diol obtained may be colored.

The time for which the reaction with a phosphorus-based compound is performed is not particularly limited but is usually from 1 to 5 hours.

<II-2-6. Remaining Monomers, Etc.>

In the case where, for example, a diaryl carbonate such as diphenyl carbonate is used as a raw material, phenols are generated as a byproduct during the production of the polycarbonate diol. Phenols are a monofunctional compound and therefore, have a possibility of working out to an inhibitory factor at the time of production of a polyurethane, and moreover, a urethane bond formed by phenols is weak in its bonding force and may dissociate due to heat in the later step, etc., allowing for regeneration of an isocyanate or phenols to cause a problem. In addition, since phenols are an irritating substance as well, the amount of phenols remaining in the polycarbonate diol is preferably smaller. Specifically, the amount is, in terms of weight ratio to the polycarbonate diol, preferably 1,000 ppm or less, more preferably 500 ppm or less, still more preferably 300 ppm or less, yet still more preferably 100 ppm or less. For reducing the amount of phenols in the polycarbonate diol, it is effective, as described later, to make the pressure of polymerization reaction of the polycarbonate diol be a high vacuum of 1 kPa or less in terms of absolute pressure or perform thin-film distillation, etc. after the polymerization of polycarbonate diol.

The carbonate compound used as a raw material at the time of production sometimes remains in the polycarbonate diol. The amount of the carbonate compound remaining in the polycarbonate diol is not limited but is preferably smaller, and, in terms of weight ratio to the polycarbonate diol, the upper limit is preferably 5 wt %, more preferably 3 wt %, still more preferably 1 wt %. If the carbonate compound content in the polycarbonate diol is too large, the reaction at the time of polyurethane formation may be inhibited. On the other hand, the lower limit is not particularly limited but is preferably 0.1 wt %, more preferably 0.01 wt %, still more preferably 0 wt %.

The dihydroxy compound used at the time of production sometimes remains in the polycarbonate diol. The amount of the dihydroxy compound remaining in the polycarbonate diol is not limited but is preferably smaller, and the remaining amount is, in terms of weight ratio to the polycarbonate diol, preferably 1 wt % or less, more preferably 0.5 wt % or less, still more preferably 0.1 wt % or less. If the amount of the dihydroxy compound remaining in the polycarbonate diol is large, the molecular length of the soft segment moiety when processed into a polyurethane may be not enough, failing in obtaining desired physical properties.

The polycarbonate diol sometimes contains a cyclic carbonate (cyclic oligomer) generated as a byproduct at the time of production. For example, in the case where 1,3-propanediol is used, 1,3-dioxan-2-one, a cyclic carbonate formed from two or more molecules thereof, etc. may be generated and contained in the polycarbonate diol. These compounds have a possibility of bringing about a side reaction during the polyurethane forming reaction or give rise to turbidity and therefore, are preferably removed as much as possible by making the pressure of polymerization reaction of the polycarbonate diol be a high vacuum of 1 kPa or less in terms of absolute pressure or performing thin-film distillation, etc. after the synthesis of polycarbonate diol. The content of such a cyclic carbonate in the polycarbonate diol is not limited but is, in terms of weight ratio to the polycarbonate diol, preferably 3 wt % or less, more preferably 1 wt % or less, still more preferably 0.5 wt % or less, yet still more preferably 0.1 wt % or less.

[II-3. Polyurethane]

A polyurethane can be produced using the above-described polycarbonate diol of the present invention.

As to the method for producing the polyurethane of the present invention by using the polycarbonate diol of the present invention, known polyurethane forming reaction conditions usually employed to produce a polyurethane are used.

For example, the polycarbonate diol of the present invention is reacted with a polyisocyanate and a chain extender at a temperature ranging from ordinary temperature to 200° C., whereby the polyurethane of the present invention can be produced.

Alternatively, the polycarbonate diol of the present invention is first reacted with an excess of polyisocyanate to produce a prepolymer having an isocyanate group at the terminal, and the polymerization degree is further increased using a chain extender, whereby the polyurethane of the present invention can be produced.

<II-3-1. Polyisocyanate>

The polyisocyanate used for producing a polyurethane by using the polycarbonate diol of the present invention includes various known aliphatic, alicyclic or aromatic polyisocyanate compounds.

Specific examples and preferred embodiments of the polyisocyanate compound are the same as specific examples and preferred embodiments described above in the paragraph of <I-2-1. Polyisocyanate>.

<II-3-2. Chain Extender>

The chain extender used at the time of producing the polyurethane of the present invention is a low-molecular-weight compound having at least two active hydrogens reacting with an isocyanate group in the case of producing the later-described prepolymer having an isocyanate group and usually includes a polyol, a polyamine, etc.

Specific examples and preferred embodiments of the polyol and polyamine are the same as specific examples and preferred embodiments described above in the paragraph of <I-2-2. Chain Extender>.

The chain extender in the case of producing the later-described prepolymer having a hydroxyl group is a low-molecular-weight compound having at least two isocyanate groups and specifically includes compounds recited in <II-2-1. Polyisocyanate>.

<II-3-3. Hardness Adjusting Agent>

A hardness adjusting agent may be used at the time of producing a polyurethane. As for the hardness adjusting agent, a dihydroxy compound, etc. which are a raw material of the polycarbonate diol may be used. The reason for using a hardness adjusting agent is described below. For example, in the case of producing a polyurethane by using a polycarbonate diol having a large molecular weight, when the raw material molar composition of polyisocyanate or chain extender is the same as that of a polycarbonate diol having a low molecular weight, due to a large weight ratio of the polycarbonate diol in the entire polyurethane molecule, the elastic modulus or hardness is reduced. The weight ratio of the polycarbonate diol in the entire polyurethane can be adjusted to be equal by adding, as a hardness adjusting agent, a dihydroxy compound, etc. which are a raw material of the polycarbonate diol, and then, even when polycarbonate diols differing in the molecular weight are used, the elastic modulus or hardness of the polyurethane obtained can be prevented from decreasing. This method is widely known in general.

As for the hardness adjusting agent, a dihydroxy compound as a raw material of the polycarbonate diol is preferably used, and examples thereof include 1,3-propanediol, 2-methyl-1,3-propanediol, 1,3-butanediol, 1,4-butanediol, 2-methyl-1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, and 1,20-eicosanediol.

<II-3-4. Chain Terminator>

At the time of producing the polyurethane of the present invention, a chain terminator having one active hydrogen group may be used, if desired, for the purpose of controlling the molecular weight of the polyurethane obtained.

Examples of the chain terminator include aliphatic monools having one hydroxyl group, such as methanol, ethanol, propanol, butanol and hexanol, and aliphatic monoamines having one amino group, such as diethylamine, dibutylamine, n-butylamine, monoethanolamine, diethanolamine and morpholine.

One of these may be used alone, or two or more thereof may be used in combination.

<II-3-5. Catalyst>

Examples of the catalyst that can be used in the polyurethane forming reaction at the time of producing the polyurethane of the present invention are the same as those of the catalyst described above in the paragraph of <I-2.4. Catalyst>.

<II-3-6. Polyol Other than Polycarbonate Diol of the Present Invention>

In the polyurethane forming reaction at the time of producing the polyurethane of the present invention, the polycarbonate diol of the present invention may be used in combination with another polyol, if desired. The polyol other than the polycarbonate diol of the present invention is not particularly limited as long as it is a polyol usually employed for the production of a polyurethane, and examples thereof include a polyether polyol, a polyester polyol, and a polycarbonate polyol other than that of the present invention. The weight ratio of the polycarbonate diol of the present invention to the total weight of the polycarbonate diol of the present invention and another polyol is preferably 70% or more, more preferably 90% or more. If the weight ratio of the polycarbonate diol of the present invention is small, the balance among chemical resistance, low-temperature characteristics and heat resistance, characterizing the present invention, may be lost.

In the present invention, the polycarbonate diol of the present invention may also be modified and used for the production of a polyurethane. The method for modifying the polycarbonate diol includes a method of introducing an ether group by adding an epoxy compound, such as ethylene oxide, propylene oxide and butylene oxide, to the polycarbonate diol, and a method of introducing an ester group by reacting the polycarbonate diol with a cyclic lactone such as ε-caprolactone, a dicarboxylic acid compound such as adipic acid, succinic acid, sebacic acid and terephthalic acid, or an ester compound thereof. In the ether modification, modification with ethylene oxide, propylene oxide, etc. brings about reduction in the viscosity of the polycarbonate diol and is preferred in view of handling property, etc. Among others, when the polycarbonate diol of the present invention is modified with ethylene oxide or propylene oxide, the crystallinity of the polycarbonate diol decreases, thereby improving the flexibility at low temperatures, and in the case of ethylene oxide modification, the water absorptivity or moisture permeability of a polyurethane produced using the ethylene oxide-modified polycarbonate diol increases, as a result, the performance as an artificial leather/synthetic leather, etc. may be enhanced. However, if the amount of ethylene oxide or propylene oxide added is large, various physical properties, such as mechanical strength, heat resistance and chemical resistance, of a polyurethane produced using the modified polycarbonate diol are reduced. For this reason, the amount added to the polycarbonate diol is suitably from 5 to 50 wt %, preferably from 5 to 40 wt %, more preferably from 5 to 30 wt %. In the method of introducing an ester group, modification with ε-caprolactone brings about reduction in the viscosity of the polycarbonate diol and is preferred in view of handling property, etc. The amount of ε-caprolactone added to the polycarbonate diol is suitably from 5 to 50 wt %, preferably from 5 to 40 wt %, more preferably from 5 to 30 wt %. If the amount of ε-caprolactone added exceeds 50 wt %, the hydrolysis resistance, chemical resistance, etc. of a polyurethane produced using the modified polycarbonate diol are reduced.

<II-3-7. Solvent>

In the polyurethane forming reaction at the time of producing the polyurethane of the present invention, a solvent may be used.

Preferable solvents include, for example, an amide-based solvent such as dimethylformamide, diethylformamide, dimethylacetamide and N-methylpyrrolidone; a sulfoxide-based solvent such as dimethyl sulfoxide; a ketone-based solvent such as methyl ethyl ketone, cyclohexanone and methyl isobutyl ketone; an ether-based solvent such as tetrahydrofuran and dioxane; an ester-based solvent such as methyl acetate, ethyl acetate and butyl acetate; and an aromatic hydrocarbon-based solvent such as toluene and xylene. One of these solvents may be used alone, or two or more thereof may be used as a mixed solvent.

Among these organic solvents, preferred are methyl ethyl ketone, ethyl acetate, toluene, dimethylformamide, dimethylacetamide, N-methylpyrrolidone, dimethyl sulfoxide, etc.

In addition, a polyurethane in the form of an aqueous dispersion liquid may also be produced from a polyurethane composition having blended therein the polycarbonate diol of the present invention, a polydiisocyanate, and the above-described chain extender.

<II-3-8. Production Method of Polyurethane> <II-3-9. One-Step Method> <II-3-10. Two-Step Method>

As the method for producing the polyurethane of the present invention by using the above-described reaction reagents, a production method employed experimentally or industrially in general may be used.

Specifically, the method is the same as the production method described above in the paragraphs <I-2-7. Production Method of Polyurethane>, <I-2-8. One-Step Method> and <I-2-9. Two-Step Method>.

<II-3-11. Additives>

In the polyurethane of the present invention produced using the polycarbonate diol of the present invention, various additives such as thermal stabilizer, light stabilizer, coloring agent, bulking agent, stabilizer, ultraviolet absorber, antioxidant, anti-adhesive agent, flame retardant, age resistor and inorganic filler can be added and mixed as long as the characteristic features of the polyurethane of the present invention are not impaired.

The compound usable as the thermal stabilizer includes a phosphorus compound such as aliphatic, aromatic or alkyl-substituted aromatic ester of phosphoric acid or phosphorous acid, hypophosphorous acid derivative, phenylphosphonic acid, phenylphosphinic acid, diphenylphosphonic acid, polyphosphonate, dialkyl pentaerythritol diphosphite and dialkyl bisphenol A diphosphite; a phenolic derivative, among others, a hindered phenol compound; a sulfur-containing compound such as thioether-based, dithioate-based, mercaptobenzimidazole-based, thiocarbanilide-based and thiodipropionic acid ester-based compounds; and a tin-based compound such as tin malate and dibutyltin monoxide.

Specific examples of the hindered phenol compound include Irganox 1010 (trade name, produced by BASF Japan Ltd.), Irganox 1520 (trade name, produced by BASF Japan, Ltd.), and Irganox 245 (trade name, produced by BASF Japan, Ltd.).

The phosphorus compound includes PEP-36, PEP-24G, HP-10 (trade names, all produced by ADEKA Corporation), Irgafos 168 (trade name, produced by BASF Japan, Ltd.), etc.

Specific examples of the sulfur-containing compound include a thioether compound such as dilauryl thiopropionate (DLTP) and distearyl thiopropionate (DSTP). Examples of the light stabilizer include benzotriazole-based and benzophenone-based compounds, and specifically, "TINUVIN 622LD", "TINUVIN 765" (both produced by Ciba Specialty Chemicals), "SANOL LS-2626", "SANOL LS-765" (both produced by Sankyo Co., Ltd.), etc. can be used.

Examples of the ultraviolet absorber include "TINUVIN 328" and "TINUVIN 234" (both produced by Ciba Specialty Chemicals).

Examples of the coloring agent include a dye such as direct dye, acid dye, basic dye and metal complex dye; an inorganic pigment such as carbon black, titanium oxide, zinc oxide, iron oxide and mica; and an organic pigment such as coupling azo-based, condensed azo-based, anthraquinone-based, thioindigo-based, dioxazone-based and phthalocyanine-based pigments.

Examples of the inorganic filler include short glass fiber, carbon fiber, alumina, talc, graphite, melamine, and white clay.

Examples of the flame retardant include an organic compound containing phosphorus and halogen, an organic compound containing bromine or chlorine, and additive and reactive flame retardants such as ammonium polyphosphate, aluminum hydroxide and antimony oxide.

One of these additives may be used alone, or two or more thereof may be used in any combination in an arbitrary ratio.

The lower limit of the amount of such an additive added is, in terms of weight ratio to polyurethane, preferably 0.01 wt %, more preferably 0.05 wt %, still more preferably 0.1 wt %, and the upper limit is preferably 10 wt %, more preferably 5 wt %, still more preferably 1 wt %. If the amount of the additive added is too small, the addition effect cannot be sufficiently obtained, and if the amount added is too large, the additive may precipitate in the polyurethane or cause turbidity.

<II-3-12. Polyurethane Film·Polyurethane Sheet>

In the case of producing a film by using the polyurethane of the present invention, the lower limit of the film thickness is preferably 10 μm, more preferably 20 μm, still more preferably 30 μm, and the upper limit is preferably 1,000 μm, more preferably 500 μm, still more preferably 100 μm.

If the film thickness is too large, removal of the solvent tends to be not easy, and if the film thickness is too small, there is a tendency that a pinhole is formed or film blocking is readily caused, making the handling difficult.

<II-3-13. Molecular Weight>

The molecular weight of the polyurethane of the present invention is appropriately adjusted according to usage and is not particularly limited, but the polystyrene-reduced weight average molecular weight (Mw) as measured by GPC is preferably from 50,000 to 500,000, more preferably from 100,000 to 300,000. If Mw is less than the lower limit above, sufficient strength or hardness may not be obtained, and if it exceeds the upper limit above, the handling property such as processability tends to be impaired.

<II-3-14. Chemical Resistance>

In the polyurethane of the present invention, when evaluated, for example, by the method described later in the paragraph of Examples, the change ratio (%) of the weight of a polyurethane specimen after immersion in a chemical solution to the weight of the polyurethane specimen before immersion in the chemical solution is preferably 30% or less, more preferably 25% or less, still more preferably 20% or less, yet still more preferably 15% or less, and most preferably 10% or less.

If this weight change ratio exceeds the upper limit above, desired chemical resistance may not be obtained.

<II-3-15. Oleic Acid Resistance>

In the polyurethane of the present invention, when evaluated, for example, by the method described later in the paragraph of Examples, the change ratio (%) of the weight of a polyurethane specimen after immersion in oleic acid to the weight of the polyurethane specimen before immersion in the oleic acid is preferably 60% or less, more preferably 50% or less, still more preferably 45% or less, yet still more preferably 40% or less, and most preferably 35% or less.

If this weight change ratio exceeds the upper limit above, adequate oleic acid resistance may not be obtained.

<II-3-16. Ethanol Resistance>

In the polyurethane of the present invention, when evaluated, for example, by the method of immersing a polyurethane specimen in ethanol at room temperature for 1 week, the change ratio (%) of the weight of the polyurethane specimen after immersion in ethanol to the weight of the polyurethane specimen before immersion in the ethanol is preferably 25% or less, more preferably 20% or less, still more preferably 18% or less, yet still more preferably 16% or less, and most preferably 14% or less.

If this change ratio exceeds the upper limit above, adequate ethanol resistance may not be obtained.

<II-3-17. Tensile Elongation at Break>

In the polyurethane of the present invention, the lower limit of the tensile elongation at break as measured on a strip sample having a width of 10 mm, a length of 100 mm and a thickness of approximately from 50 to 100 μm under the conditions of a chuck-to-chuck distance of 50 mm, a tensile speed of 500 mm/min, a temperature of 23° C. and a relative humidity of 50% is preferably 50%, more preferably 100%, still more preferably 150%, and the upper limit is preferably 900%, more preferably 850%, sill more preferably 800%. If the tensile elongation at break is less than the lower limit above, the handling property such as processability tends to be impaired, and if it exceeds the upper limit above, sufficient chemical resistance may not be obtained.

<II-3-18. Young's Modulus>

In a polyurethane having a polystyrene-reduced weight average molecular weight (Mw) of 140,000 to 210,000 as measured by GPC (hereinafter, sometimes referred to as "specific polyurethane"), which is produced by the one-step method by using the polycarbonate diol of the present invention, H12MDI and IPDA and setting the HS content % to a range of 15 to 30 wt %, the Young's modulus at 23° C. measured by the same method as in the above-described measurement of tensile elongation at break is preferably 0.02 or more, more preferably 0.04 or more, still more preferably 0.06 or more, and is preferably 2 or less, more preferably 1 or less, still more preferably 0.5 or less. If the Young's modulus is too low, the chemical resistance may be insufficient, and if the Young's modulus is too high, the flexibility may be inadequate or the handling property such as processability may be impaired. Furthermore, the Young's modulus of the specific polyurethane measured by the same method as in the above-described measurement of tensile elongation at break except for changing the temperature to −10° C. is preferably 0.01 or more, more preferably 0.02 or more, still more preferably 0.03 or more, yet still more preferably 0.05 or more, and is preferably 2 or less, more preferably 1 or less, still more preferably 0.5 or less, yet still more preferably 0.3 or less. If the Young's modulus at −10° C. is less than the lower limit above, the chemical resistance may be insufficient, and if the Young's modulus at −10° C. exceeds the upper limit above, the flexibility at low temperatures may be inadequate or the handling property such as processability may be impaired.

Here, the Young's modulus is a stress value at an elongation of 1% appearing as a gradient from the stress value at the initial elongation and is specifically measured by the method described later in the paragraph of Examples.

Incidentally, the HS (hard segment) content % can be calculated according to the following formula:

HS Content (wt %)=[weight of polyisocyanate charged (g)+weight of chain extender charged (g)+hardness adjusting agent (g)]÷[weight of polyisocyanate charged (g)+weight of polycarbonate diol charged (g)+weight of another polyol charged (g)+weight of chain extender charged (g)+hardness adjusting agent (g)]

In the formula above, each member is the numerical value of the raw material used at the time of polyurethane production.

<II-3-19. 100% Modulus>

In the polyurethane of the present invention, when the polyurethane is obtained by the two-step method of reacting 2 equivalents of 4,4'-dicyclohexylmethane diisocyanate with the polycarbonate diol of the present invention and furthermore, performing a chain extension reaction with isophoronediamine, the lower limit of the 100% modulus as measured on a strip sample having a width of 10 mm, a length of 100 mm and a thickness of approximately from 50 to 100 μm under the conditions of a chuck-to-chuck distance of 50 mm, a tensile speed of 500 mm/min, a temperature of 23° C. and a relative humidity of 50% is preferably 0.1 MPa or more, more preferably 0.5 MPa or more, still more preferably 1 MPa or more, and the upper limit is preferably 20 MPa or less, more preferably 10 MPa or less, still more preferably 5 MPa or less. If the 100% modulus is less than the lower limit above, the chemical resistance may be inadequate, and if it exceeds the upper limit above, the flexibility may be insufficient or the handling property such as processability tends to be impaired. Furthermore, the 100% modulus of the specific polyurethane at −10° C. is preferably 0.5 or more, more preferably 1.0 or more, still more preferably 1.5 or more, yet still more preferably 2.0 or more, and is preferably 15 or less, more preferably 10 or less, still more preferably 7 or less, yet still more preferably 5 or less. If the 100% modulus at −10° C. is less than the lower limit above, the chemical resistance may be inadequate, and if the 100% modulus at −10° C. exceeds the upper limit above, the flexibility at low temperatures may be insufficient, or the handling property such as processability may be impaired.

<II-3-20. Elastic Recovery Performance>

In an environment at a temperature of 23° C. and a relative humidity of 50%, a strip polyurethane specimen having a width of 10 mm, a length of 100 mm and a thickness of approximately from 50 to 100 μm is stretched to 300% under the conditions of a chuck-to-chuck distance of 50 mm and a tensile speed of 500 mm/min and subsequently contracted to the original length at the same speed. By repeating this operation twice, the elastic recovery ratio at a temperature of 23° C. and a relative humidity of 50% of the polyurethane of the present invention is calculated.

The ratio of the stress at 150% elongation at the time of first contraction to the stress at 150% elongation at the time of first stretching is preferably closer to 1 and is preferably 0.1 or more, more preferably 0.11 or more, still more preferably 0.14 or more, and most preferably 0.15 or more.

In addition, the ratio of the stress at 150% elongation at the time of second stretching to the stress at 150% elongation at the time of first stretching is preferably closer to 1 and is preferably 0.5 or more, more preferably 0.6 or more, still more preferably 0.7 or more, and most preferably 0.8 or more.

Furthermore, the point at which a stress is generated at the time of second stretching is designated as % SET (permanent set), and this value is preferably closer to 0 and is preferably 70 or less, more preferably 60 or less, still more preferably 40 or less, and most preferably 20 or less.

In an environment at a temperature of −10° C., a strip polyurethane specimen having a width of 10 mm, a length of 100 mm and a thickness of approximately from 50 to 100 μm is stretched to 300% under the conditions of a chuck-to-chuck distance of 50 mm and a tensile speed of 500 mm/min and subsequently contracted to the original length at the same speed. By repeating this operation twice, the elastic recovery ratio at −10° C. of the polyurethane of the present invention is calculated. At this time, the ratio of the stress at 250% elongation at the time of first contraction to the stress at 250% elongation at the time of first stretching is preferably closer to 1 and is preferably 0.06 or more, more preferably 0.10 or more, still more preferably 0.12 or more, and most preferably 0.13 or more. In addition, the stress at 250% elongation at the time of second stretching relative to the stress at 250% elongation at the time of first stretching is preferably closer to 1 and is preferably 0.50 or more, more preferably 0.55 or more, still more preferably 0.60 or more. Furthermore, the point at which a stress is generated at the time of second stretching is designated as % SET (permanent set), and this value is preferably closer to 0 and is preferably 130% or less, more preferably 120% or less, still more preferably 110% or less, and most preferably 105% or less.

<II-3-21. Low-Temperature Characteristics>

The polyurethane of the present invention has good low-temperature characteristics, and the low-temperature characteristics as used in this application can be evaluated by the tensile elongation at break, the Young's modulus, and the 100% modulus, in a tensile test at a low temperature, e.g., −10° C. In addition, the low-temperature characteristics can be evaluated by the stress ratio or permanent set in a cycle test at a low temperature, e.g., −10° C. Specifically, the low-temperature characteristics are flexibility, elastic recovery performance, impact resistance, flex resistance and durability, at low temperatures.

<II-3-22. Heat Resistance>

In the polyurethane of the present invention, when a urethane film having a width of 100 mm, a length of 100 mm and a thickness of approximately from 50 to 100 μm is heated in a gear oven at a temperature of 120° C. for 400 hours, the lower limit of the weight average molecular weight (Mw) of the sample after heating, relative to the weight average molecular weight (Mw) before heating, is preferably 60% or more, more preferably 70% or more, still more preferably 80% or more, yet still more preferably 85% or more, and the upper limit is preferably 120% or less, more preferably 110% or less, still more preferably 105% or less.

<II-3-23. Glass Transition Temperature>

In a specific polyurethane having a polystyrene-reduced weight average molecular weight (Mw) of 140,000 to 210,000 as measured by GPC, which is produced by the one-step method by using the polycarbonate diol of the present invention, H12MDI and IPDA and setting the HS content % to a range of 15 to 30%, the lower limit of the glass transition temperature (Tg) is preferably −50° C., more preferably −45° C., still more preferably −40° C., and the upper limit is preferably 10° C., more preferably 0° C., still more preferably −10° C. If Tg is less than the lower limit above, the chemical resistance may be inadequate, and if it exceeds the upper limit above, the low-temperature characteristics may be insufficient.

<II-3-24. Usage>

The polyurethane of the present invention has excellent chemical resistance and good low-temperature characteristics and therefore, can be widely used for a foam, an elastomer, an elastic fiber, a coating material, a fiber, a pressure-sensitive adhesive, an adhesive, a floor material, a sealant, a medical material, an artificial leather, a synthetic leather, a coating agent, an aqueous polyurethane coating material, an active energy ray-curable resin composition, etc.

Specifically, the polyurethane of the present invention can be used for the same applications as the applications described above in the paragraph of <I-2-23. Usage>.

EXAMPLES

The present invention is described in greater detail below by referring to Examples and Comparative Examples, bus the present invention is not limited to these Examples as long as the gist thereof is observed.

The evaluation methods for respective physical values described below are as follows.

[Evaluation Method: Polycarbonate Diol]

<Quantitative Determination of Phenoxy Group Amount, Dihydroxy Compound Content and Phenol Content>

Polycarbonate diol was dissolved in CDCl$_3$, and 400 MHz $^1$H-NMR (AL-400, manufactured by JEOL Ltd.) was measured, whereby a phenoxy group, a dihydroxy compound and phenol ere identified based on signal positions of respective components and the content of each component was calculated from the integral value. At this time, the detection limit is 100 ppm for the weight of phenol relative to the weight of the entire sample and 0.1 wt % for a dihydroxy compound such as compound represented by formula (A) and compound represented by formula (B). The proportion of phenoxy group is calculated from the ratio between an integral value for one proton portion of phenoxy group and an integral value for one proton portion of the entire terminal, and the detection limit for phenoxy group is 0.05% relative to the entire terminal.

<Hydroxyl Value>

The hydroxyl value of the polycarbonate diol was measured by the method using an acetylation reagent in conformity with JIS K1557-1 (2007).

<Measurement of APHA Value>

The APHA value was measured by the comparison with a standard solution prepared by putting polycarbonate diol in a colorimetric tube, in conformity with JIS K0071-1 (1998). Color Standard Solution 1000° (1 mgPt/mL) (produced by Kishida Chemical Co., Ltd.) was used as the reagent.

<Measurement of Melt Viscosity>

Polycarbonate diol was heated at 80° C. and thereby melted and thereafter, the melt viscosity was measured at 80° C. by using a E-type viscometer (DV-II+Pro, manufactured by BROOKFIELD, cone: CPE-52).

<Measurement of Glass Transition Temperature (Tg), Melting Peak Temperature and Melting Heat Quantity>

About 10 mg of polycarbonate diol was sealed in an aluminum pan, and an operation of raising and lowering the temperature from 30° C. to 150° C. at a rate of 20° C./min, from 150° C. to −120° C. at a rate of 40° C./min, and from −120° C. to 120° C. at a rate of 20° C./min was performed in a nitrogen atmosphere by using EXSTAR DSC6200 (manufactured by Seiko Instrument, Inc.). The glass transition temperature (Tg) was obtained from the inflection point at the time of second temperature rise, and the melting peak temperature and melting heat quantity were determined from the melting peak.

<Molar Fraction of Dihydroxy Compound after Hydrolysis>

About 0.5 g of polycarbonate diol was precisely weighed, put in a 100-mL conical flask and dissolved by adding 5 mL of tetrahydrofuran. Thereafter, 45 mL of methanol and 5 mL of an aqueous 25 wt % sodium hydroxide solution was added. A condenser was set in a 100 mL conical flack, and hydrolysis was performed under heating for 30 minutes in a water bath at 75 to 80° C. After allowing to cool at room temperature, sodium hydroxide was neutralized by adding 5 mL of 6N hydrochloric acid to make the pH be 7. The entire amount was transferred to a 100-mL measuring flask, and the washing obtained by washing the inside of the conical flask twice with an appropriate amount of methanol was also transferred to the 100-mL measuring flask. An appropriate amount of methanol was added to make 100 mL, and the solution was mixed in the measuring flask. The supernatant was sampled, filtered through a filter, and analyzed by gas chromatography (GC). As for the concentration of each dihydroxy compound, a calibration curve was previously prepared from each known dihydroxy compound as a standard substance, and wt % was calculated from the area ratio obtained by the gas chromatography (GC).

(Analysis Conditions)

Apparatus: Agilent 6850 (manufactured by Agilent Technologies Japan Ltd.)

Column: Agilent J&W GC column DB-WAX, inner diameter: 0.25 mm, length: 60 m, film pressure: 0.25 mm Detector: Hydrogen flame ionization detector (FID)

Programmed temperature rise: 150° C. (2 minutes), from 150° C. to 280° C. (10° C./min, 9 minutes), 240° C. (10 minutes)

The molar fraction of the dihydroxy compound was calculated from wt % obtained by gas chromatography above and the molecular weight of each dihydroxy compound.

[Evaluation Method: Polyurethane]

<Measurement of Isocyanate Group Concentration>

After diluting 20 mL of a di-n-butylamine/toluene (weight ratio: 2/25) mixed solution with 90 mL of acetone, the resulting solution was titrated with an aqueous 0.5 N hydrochloric acid solution, and the amount of the aqueous hydrochloric acid solution required for neutralization was measured and taken as a blank value. Subsequently, from 1 to 2 g of the reaction solution was extracted, 20 mL of a di-n-butylamine/toluene mixed solution was added thereto, followed by stirring at room temperature for 30 minutes, the resulting solution was diluted with 90 mL of acetone, similarly to the blank measurement, and titrated with an aqueous 0.5 N hydrochloric acid solution, the amount of the aqueous hydrochloric acid solution required for neutralization was measured, and the amount of the remaining amine was quantitatively determined. From the volume of the aqueous hydrochloric acid solution required for neutralization, the isocyanate group concentration was determined according to the following formula:

Isocyanate group concentration (wt %)=$A$*42.02/$D$

A: the isocyanate group (mol) contained in the sample used for this measurement, $$A=(B-C)\times 0.5/1,000\times f$$

B: amount (mL) of aqueous 0.5 N hydrochloric acid solution required in blank measurement, C: amount (mL) of aqueous 0.5 N hydrochloric acid solution required in this measurement, D: sample (g) used in this measurement, and f: titer of aqueous hydrochloric acid solution.

<Measurement of Solution Viscosity>

A polyurethane was dissolved in dimethylformamide to obtain a solution (concentration: 30 wt %), and the solution viscosity of the resulting polyurethane solution was measured at 25° C. by means of VISCOMETER TV-22 (manufactured by Toki Sangyo Co., Ltd.) provided with a rotor of 3°×R14.

<Measurement of Molecular Weight>

As for the molecular weight of polyurethane, a dimethylacetamide solution was prepared to afford a polyurethane concentration of 0.14 wt %, and the number average molecular weight (Mn) and weight average molecular weight (Mw), in terms of standard polystyrene, were measured using a GPC apparatus [manufactured by Tosoh Corporation, product name: "HLC-8220" (column: Tskgel-GMH-XL×2)].

<Evaluation Method of Oleic Acid Resistance>

A polyurethane solution was coated on a fluororesin sheet (fluorine tape NITOFLON 900, produced by Nitto Denko Corp., thickness: 0.1 mm) by a 9.5-mil applicator, dried at 60° C. for 1 hour and subsequently at 100° C. for 0.5 hours, further dried at 100° C. for 0.5 hours in a vacuum state and at 80° C. for 15 hours, and then left standing still at a constant temperature and a constant humidity of 23° C. and 55% RH for 12 hours or more, and a specimen of 3 cm×3 cm was cut out from the obtained film, charged into a glass vial having a volume of 250 ml and containing 50 ml of a test solvent, and left standing still in a constant temperature bath at 80° C. in a nitrogen atmosphere for 1 week or 16 hours. After the test, the front and back of the specimen was lightly wiped with a paper wiper and by performing a weight measurement, the percentage of weight increase from before test was calculated. A weight change ratio closer to 0% indicates that the oleic acid resistance is better.

<Evaluation Method of Ethanol Resistance of Polyurethane>

A urethane film was prepared by the same method as described in <Evaluation Method of Oleic Acid Resistance> above, the urethane film was cut out into a specimen of 3 cm×3 cm. After measuring the weight of the specimen by a precision balance, the specimen was charged into a glass-made petri dish having an inner diameter of 10 cmφ and containing 50 ml of a test solvent and immersed in the solvent at room temperature of about 23° C. for 1 hour. After the test, the specimen was taken out and lightly wiped with a paper wiper and by performing a weight measurement, the percentage of weight increase from before test was calculated.

<Measurement Method of Glass Transition Temperature (Tg)>

About 5 mg of a polyurethane film piece prepared in the same manner as in the evaluation of oleic acid resistance was sealed in an aluminum pan, and an operation of raising and lowering the temperature from −100° C. to 250° C., from 250° C. to −100° C., and from −100° C. to 250° C., at a rate of 10° C./min, was performed in a nitrogen atmosphere by using EXSTAR DSC6200 (manufactured by Seiko Instrument, Inc.). The inflection point at the time of second temperature rise was taken as the glass transition temperature (Tg).

<Room-Temperature Tensile Test Method>

In conformity with JIS K6301 (2010), a polyurethane specimen in a strip shape having a width of 10 mm, a length of 100 mm and a thickness of about 50 μm was subjected to a tensile test by using a tensile tester [manufactured by Orientec, Co. Ltd., product name: "Tensilon UTM-III-100"] under the conditions of a chuck-to-chuck distance of 50 mm, a tensile speed of 500 mm/min and a temperature of 23° C. (relative humidity: 55%), and the stress when the specimen was elongated by 100% was measured. The Young's modulus was defined as a gradient of the stress value at the initial elongation, and specifically, a stress value at an elongation of 1% was employed.

<Low-Temperature Tensile Test Method>

In conformity with JIS K6301 (2010), a polyurethane specimen in a strip shape having a width of 10 mm, a length of 100 mm and a thickness of about 50 μm was tested by using a tensile tester [manufactured by Shimadzu Corporation, product name: "Autograph AG-X 5 kN"]. More specifically, the film was placed with a chuck-to-chuck distance of 50 mm in a constant temperature bath [manufactured by Shimadzu Corporation, product name: "THERMOSTATIC CHAMBER TCR2W-200T"] set to −10° C., then left standing still at −10° C. for 3 minutes, and subsequently subjected to a tensile test at a tensile speed of 500 mm/min. The stress when the specimen was elongated by 100% was measured. The Young's modulus was defined as a gradient of the stress value at the initial elongation, and specifically, a stress value at an elongation of 1% was employed.

<Low-Temperature Cycle Test Method of Polyurethane>

In conformity with JIS K6301 (2010), a polyurethane specimen in a strip shape having a width of 10 mm, a length of 100 mm and a thickness of about 90 μm was tested by using a tensile tester [manufactured by Shimadzu Corporation, product name: "Autograph AG-X 5 kN", Load Cell 100N]. More specifically, the film was placed with a chuck-to-chuck distance of 50 mm in a constant temperature bath [manufactured by Shimadzu Corporation, product name: "THERMOSTATIC CHAMBER TCR2W-200T"] set to −10° C. and left standing still at −10° C. for 3 minutes, and subsequently, an operation of stretching the film to 300% at a tensile speed of 500 mm/min and then contracting it to the original length at the same speed, was repeated twice. The ratio of the stress at 250% elongation at the time of first contraction to the stress at 250% elongation at the time of first stretching (hereinafter, sometimes referred to as "ratio 1") was determined. In addition, the stress at 250% elongation at the time of second stretching relative to the stress at 250% elongation at the time of first stretching (hereinafter, sometimes referred to as "ratio 2") was determined.

<Evaluation of Heat Resistance>

A polyurethane film prepared in the same manner as in the evaluation of oleic acid resistance was formed into a strip shape having a width of 100 mm, a length of 100 mm and a thickness of approximately 50 μm and heated in a gear oven at a temperature of 120° C. for 400 hours, and the weight average molecular weight (Mw) of the sample after heating was measured by the method described in <Measurement of Molecular Weight>.

<Raw Material Used>

The raw materials used for the production of polycarbonate diol in this Example are as follows.

1,4-Butanediol (hereinafter, sometimes simply referred to as 1,4BD): produced by Mitsubishi Chemical Corporation 1,5-Pentanediol (hereinafter, sometimes simply referred to as 1,5PD): produced by Tokyo Chemical Industry Co., Ltd.

1,3-Propanediol (hereinafter, sometimes simply referred to as 1,3PDO): produced by Wako Pure Chemical Industries, Ltd. or DuPont Kabushiki Kaisha 1,6-Hexanediol (hereinafter, sometimes simply referred to as 1,6HD): produced by BASF 1,10-Decanediol (hereinafter, sometimes simply referred to as 1,10DD): produced by Hokoku Corporation 1,9-Nonanediol (hereinafter, sometimes simply referred to as 1,9ND): produced by Tokyo Chemical Industry Co., Ltd.

1,12-Dodecanediol (hereinafter, sometimes simply referred to as 1,12DDD): produced by Wako Pure Chemical Industries, Ltd.

2-Methyl-1,3-propanediol (hereinafter, sometimes simply referred to as 2M1,3PDO): produced by Tokyo Chemical Industry Co., Ltd.

3-Methyl-1,5-pentanediol (hereinafter, sometimes simply referred to as 3M1,5PD): produced by Wako Pure Chemical Industries, Ltd.

Diphenyl carbonate (hereinafter, sometimes simply referred to as DPC): produced by Mitsubishi Chemical Corporation Ethylene carbonate (hereinafter, sometimes simply referred to as EC): produced by Mitsubishi Chemical Corporation Magnesium acetate tetrahydrate: produced by Wako Pure Chemical Industries, Ltd.

Lead(II) acetate trihydrate: produced by Wako Pure Chemical Industries, Ltd.

Lead(IV) acetate: produced by Nacalai Tesque, Inc.

Example 1-1

<Production and Evaluation of Polycarbonate Diol>

Into a 5-L glass separable flask equipped with a stirrer, a distillation trap and a pressure adjusting device, 1,4-butanediol (1,4BD): 768.5 g, 1,10-decanediol (1,10DD): 768.5 g, diphenyl carbonate: 2,563.0 g, and an aqueous magnesium acetate tetrahydrate solution: 6.6 mL (concentration: 8.4 g/L, magnesium acetate tetrahydrate: 55 mg) were charged as raw materials. After purging with nitrogen gas, the contents were heated and dissolved under stirring by raising the internal temperature to 160° C. Thereafter, the pressure was reduced to 24 kPa over 2 minutes, and the reaction was allowed to proceed for 90 minutes while removing phenol outside the system. The reaction was continued by reducing the pressure to 9.3 kPa over 90 minutes and further to 0.7 kPa over 30 minutes, and then, the reaction was allowed to proceed for 60 minutes by raising the temperature to 170° C. while removing phenol and unreacted dihydroxy compounds outside the system, whereby a polycarbonate diol-containing composition was obtained.

The polycarbonate diol-containing composition obtained was fed to a thin-film distillation apparatus at a flow rate of 20 g/min, and thin-film distillation (temperature: from 180 to 190° C., pressure: from 40 to 67 Pa) was performed. As the thin-film distillation apparatus, Molecular Distillation Apparatus Model MS-300, manufactured by Sibata Scientific Technology Ltd., equipped with an internal condenser having a diameter of 50 mm, a height of 200 mm and an area of 0.0314 m² and a jacket, was used. The same applies also to the following Examples and Comparative Examples.

The properties of the polycarbonate diol obtained by thin-film distillation and the evaluation results of physical properties are shown in Table 1.

<Production and Evaluation of Polyurethane>

The specific polyurethane was produced by the following operation using the polycarbonate diol obtained by the method above.

(Prepolymer (PP) Forming Reaction)

Into a separable flask provided with a thermocouple and a cooling tube, 90.57 g of the above-described polycarbonate diol previously heated to 80° C. was charged. After immersing the flask in an oil bath at 60° C., 22.69 g of 4,4'-dicyclohexylmethane diisocyanate (hereinafter H12MDI, produced by Tokyo Chemical Industry Co., Ltd. and 0.332 g of triisooctyl phosphite (hereinafter TiOP, produced by Tokyo Chemical Industry Co., Ltd.) as a reaction retarder were added, and the temperature was raised to 80° C. over about 1 hour while stirring the contents in the flask at 60 rpm in a nitrogen atmosphere. After raising the temperature to 80° C., 9.3 mg (81.9 wt ppm relative to the total weight of polycarbonate diol and isocyanate) of NEOSTANN U-830 (hereinafter referred to as U-830, produced by Nitto Kasei Co., Ltd.) was added, and when heat generation was settled, the temperature of the oil bath was raised to 100° C., followed by stirring for about another 2 hours. The concentration of the isocyanate group was analyzed, and it was confirmed that the theoretical amount of isocyanate group was consumed.

(Chain Extension Reaction)

After diluting 106.62 g of the obtained prepolymer (PP) with 11.46 g of dehydrated toluene (produced by Wako Pure Chemical Industries, Ltd.), 237.36 g of dehydrated N,N-dimethylformamide (hereinafter DMF, produced by Wako Pure Chemical Industries, Ltd.) was added. The flask was immersed in an oil bath at 55° C., and the prepolymer was dissolved under stirring at about 200 rpm. The concentration of the isocyanate group in the prepolymer solution was analyzed. Thereafter, the flask was immersed in an oil bath set to 35° C., and 6.06 g of isophoronediamine (hereinafter IPDA, produced by Tokyo Chemical Industry Co., Ltd.), which is the necessary amount calculated from the remaining isocyanate, was added in parts under stirring at 150 rpm. After stirring for about 1 hour, 0.623 g of morpholine (produced by Tokyo Chemical Industry Co., Ltd.) as a terminal stopper was added, and the system was further stirred for 1 hour to obtain a polyurethane solution having a viscosity of 125 Pa·s and a weight average molecular weight of 151,000. The properties of this polyurethane and the evaluation results of physical properties are shown in Table 3.

Examples 1-2 to 1-13

<Production and Evaluation of Polycarbonate Diol>

Polycarbonate diol-containing compositions were obtained by performing the reaction by using entirely the same conditions and method as in the production of polycarbonate diol of Example 1-1 except that the kind and charged amount of the PCD polymerization raw material were changed to the kind and charged amount of raw material shown in Table 1.

Each of the obtained polycarbonate diol-containing compositions was subjected to thin-film distillation by the same method as in Example 1-1. The properties of polycarbonate diol obtained by thin-film distillation and the evaluation results of physical properties are shown in Table 1.

<Production and Evaluation of Polyurethane>

Polyurethane solutions were obtained by performing the reaction by using entirely the same conditions and method as in the production of polyurethane of Example 1-1 except that the kind of polycarbonate diol (PCD) used and the amount of each raw material charged were changed to PCD and charged amount shown in Table 3. The properties of the polyurethane obtained and the evaluation results of physical properties are shown in Table 3.

Comparative Examples 1-1 and 1-5

<Production and Evaluation of Polycarbonate Diol>

Polycarbonate diol-containing compositions were obtained by performing the reaction by using entirely the same conditions and method as in the production of polycarbonate diol of Example 1-1 except that the kind and charged amount of the PCD polymerization raw material were changed to the kind and charged amount of raw material shown in Table 2.

Each of the obtained polycarbonate diol-containing compositions was subjected to thin-film distillation by the same method as in Example 1-1.

The properties of polycarbonate diol obtained by thin-film distillation and the evaluation results of physical properties are shown in Table 2.

<Production and Evaluation of Polyurethane>

Polyurethane solutions were obtained by performing the reaction by using entirely the same conditions and method as in the production of polyurethane of Example 1-1 except that the amounts of polycarbonate diol (PCD) used and each raw material charged were changed to the charged amounts shown in Table 3. The properties of the polyurethane obtained and the evaluation results of physical properties are shown in Table 3.

Comparative Examples 1-2 to 1-4 and 1-6

<Evaluation of Polycarbonate Diol>

Polycarbonate diols shown below were used, respectively. The properties of each polycarbonate diol and the evaluation results of physical properties are shown in Table 2.

Comparative Example 1-2

Polycarbonate diol produced using 1,6HD as a raw material ("Duranol (registered trademark)" produced by Asahi Kasei Chemicals Corporation, grade: T-6002)

Comparative Example 1-3

Polycarbonate diol produced using 1,4BD and 1,6HD as raw materials ("Duranol (registered trademark)" produced by Asahi Kasei Chemicals Corporation, grade: T-4672)

Comparative Example 1-4

Polycarbonate diol produced using 1,5PD and 1,6HD as raw materials ("Duranol (registered trademark)" produced by Asahi Kasei Chemicals Corporation, grade: T-5652)

Comparative Example 1-6

Polycarbonate diol using 1,9ND and 2M1,8OD as raw materials (trade name: Kuraray Polyol C-2065N, produced by Kuraray Co., Ltd.)

<Production and Evaluation of Polyurethane>

Polyurethane production was performed using the polycarbonate diol above as PCD that is a production raw material of polyurethane.

Polyurethane solutions were obtained by performing the reaction by using entirely the same conditions and method as in the production of polyurethane of Example 1-1 except that the polycarbonate diol used as a raw material and the amount of raw material charged were changed to the kind and respective charged amounts of raw materials shown in Table 3. The properties of the polyurethane obtained and the evaluation results of physical properties are shown in Table 3.

Comparative Example 1-7

<Production and Evaluation of Polycarbonate Diol>

A polycarbonate diol-containing composition was obtained by performing the reaction by using entirely the same method as in the production of polycarbonate diol of Example 1-1 except that the raw material and the charged amount of raw material were changed to the raw material (1,6HD and 3M1,5PD) and the charged amount of raw material shown in Table 2.

The polycarbonate diol-containing composition obtained was subjected to thin-film distillation by the same method as in Example 1-1.

The properties of polycarbonate diol obtained by thin-film distillation and the evaluation results of physical properties are shown in Table 2.

<Production and Evaluation of Polyurethane>

The polycarbonate diol obtained by the method above and the polycarbonate diol (trade name: Kuraray Polyol C-2065N, produced by Kuraray Co., Ltd.) used in Comparative Example 1-6 were mixed in a ratio of 75:25 by weight and used as a raw material (PCD) for the production of a polyurethane.

A polyurethane solution was obtained by performing the reaction by using entirely the same conditions and method as in the production of polyurethane of Example 1-1 except that the raw material (PCD) obtained by the mixing above was used and the amount of raw material charged was changed to the charged amount shown in Table 3. The properties of the polyurethane obtained and the evaluation results of physical properties are shown in Table 3.

In "Stress at −10° C.·100% Elongation" of Table 3, the value of Examples is small as compared with that of Comparative Examples, revealing good flexibility at low temperatures. In addition, since the values in "80° C. Oleic Acid Resistance, Weight Change Ratio" and "Room Temperature Ethanol Resistance, Weight Change Ratio" are small, it is understood that the chemical resistance is good. Furthermore, since the value in "Change Ratio of Polystyrene-Reduced Weight Average Molecular Weight After Heat Resistance Test" is small, it is understood that the heat resistance is good, and Examples reveal that these physical properties are good. Accordingly, compared with the conventional polycarbonate diol, the polycarbonate diol of the present invention is proved to be a polycarbonate diol as a raw material of a polyurethane excellent in the physical property balance among chemical resistance, low-temperature characteristics and heat resistance.

Examples 2-1 to 2-6

<Production and Evaluation of Polycarbonate Diol>

Polycarbonate diol-containing compositions were obtained by performing the reaction by using entirely the same conditions and method as in the production of polycarbonate diol of Example 1-1 except that the kind and charged amount of the PCD polymerization raw material were changed to the kind and charged amount of raw material shown in Table 4.

Each of the obtained polycarbonate diol-containing compositions was subjected to thin-film distillation by the same method as in Example 1-1. The properties of polycarbonate diol obtained by thin-film distillation and the evaluation results of physical properties are shown in Table 4.

<Production and Evaluation of Polyurethane>

Polyurethane solutions were obtained by performing the reaction by using entirely the same conditions and method as in the production of polyurethane of Example 1-1 except that the kind of polycarbonate diol (PCD) used and the amount of each raw material charged were changed to the kind and the charged amount shown in Table 6. The properties of the polyurethane obtained and the physical properties are shown in Table 6.

Comparative Examples 2-1 and 2-2

<Production and Evaluation of Polycarbonate Diol>

Polycarbonate diol-containing compositions were obtained by performing the reaction by using entirely the same conditions and method as in the production of polycarbonate diol of Example 1-1 except that the kind and charged amount of the PCD polymerization raw material were changed to the raw material and the charged amount of raw material shown in Table 5.

Each of the obtained polycarbonate diol-containing compositions was subjected to thin-film distillation by the same method as in Example 1-1.

The properties of polycarbonate diol obtained by thin-film distillation and the evaluation results of physical properties are shown in Table 5.

<Production and Evaluation of Polyurethane>

Polyurethane solutions were obtained by performing the reaction by using entirely the same conditions and method as in the production of polyurethane of Example 1-1 except that the amounts of polycarbonate diol (PCD) used and each raw material charged were changed to the charged amounts shown in Table 6. The properties of the polyurethane obtained and the evaluation results of physical properties are shown in Table 6.

In "Stress at −10° C.·100% Elongation" of Table 6, the value of Examples is small as compared with that of Comparative Examples, revealing good flexibility at low temperatures. In addition, since the values in "80° C. Oleic Acid Resistance, Weight Change Ratio" and "Room Temperature Ethanol Resistance, Weight Change Ratio" are small, it is understood that the chemical resistance is good. Furthermore, it is seen from "Ratio 1, Ratio 2" that the low-temperature characteristics are good. Accordingly, compared with the conventional polycarbonate diol, the polycarbonate diol of the present invention is proved to be a polycarbonate diol as a raw material of a polyurethane excellent in the physical property balance between chemical resistance and low-temperature characteristics.

Abbreviations in Tables 1 and 2 and Tables 4 and 5 have the following meanings.

1,4BD: 1,4-Butanediol
1,5PD: 1,5-Pentanediol
1,3PDO: 1,3-Propanediol
1,6HD: 1,6-Hexanediol
1,10DD: 1,10-Decanediol
1,9ND: 1,9-Nonanediol
1,12DDD: 1,12-Dodecanediol
2M1,3PDO: 2-Methyl-1,3-propanediol
2M1,8OD: 2-Methyl-1,8-octanediol
3M1,5PD: 3-Methyl-1,5-pentanediol
DPC: Diphenyl carbonate

TABLE 1

| | | Example 1-1 | Example 1-2 | Example 1-3 | Example 1-4 | Example 1-5 | Example 1-6 | Example 1-7 |
|---|---|---|---|---|---|---|---|---|
| Charged amount of PCD polymerization raw material | 1,4BD [g] | 768.5 | 879.5 | 993.8 | 1120.2 | 1211.9 | 1272.8 | 975.8 |
| | 1,5PD [g] | — | — | — | — | — | — | — |
| | 1,3PDO [g] | — | — | — | — | — | — | — |
| | 1,6HD [g] | — | — | — | −0 | — | — | — |
| | 1,10DD [g] | 768.5 | 597.6 | 421.9 | 277.4 | 133.8 | 40.0 | 414.2 |
| | 1,9ND [g] | — | — | — | — | — | — | — |
| | 1,12DDD [g] | — | — | — | — | — | — | — |
| | 2M1,3PDO [g] | — | — | — | — | — | — | — |
| | 3M1,5PD [g] | — | — | — | — | — | — | — |
| | DPC [g] | 2563.0 | 2622.8 | 2684.4 | 2802.5 | 2854.4 | 2887.2 | 2709.9 |
| | Aqueous catalyst solution [mL] | 6.6 | 6.7 | 6.9 | 7.2 | 7.3 | 7.3 | 6.7 |
| Outer appearance | | white solid | white solid | white solid | white solid | white solid | white solid | white solid |
| Structural unit (kind) | Compound of formula (A) | 1,4BD | 1,4BD | 1,4BD | 1,4BD | 1,4BD | 1,4BD | 1,4BD |
| | Compound of formula (B) | 1,10DD | 1,10DD | 1,10DD | 1,10DD | 1,10DD | 1,10DD | 1,10DD |
| Ratio (A:B) of structural unit derived from compound of formula (A) and structural unit derived from compound of formula (B) [molar ratio] | | 64:36 | 71:29 | 80:20 | 88:12 | 94.6 | 98:2 | 80:20 |
| Average carbon number of dihydroxy compound after hydrolysis | | 6.2 | 5.7 | 5.2 | 4.7 | 4.4 | 4.1 | 5.1 |
| Hydroxyl value [mg-KOH/g] | | 53.1 | 51 | 52.1 | 51.5 | 52 | 55.3 | 37.4 |
| Phenoxy group terminal | | not detected | not detected | not detected | not detected | not detected | not detected | not detected |
| APHA | | 30 | 30 | 30 | 40 | 30 | 30 | 30 |
| Melt viscosity [mPa · s] | | 1960 | 2250 | 2590 | 2920 | 3550 | 3980 | 7670 |
| DSC | Glass transition temperature [° C.] | not detected | −48 | −47 | −47 | −45 | −42 | −46 |

TABLE 1-continued

|  |  |  |  |  |  |  |  |
|---|---|---|---|---|---|---|---|
|  | Melting peak temperature [° C.] | 26 | 32 | 37 | 46 | 54 | 59 | 39 |
|  | Melting heat quantity [J/g] | 23.4 | 13.8 | 7.32 | 4.13 | 3.6 | 2.5 | 2.08 |
| Molecular weight and molecular weight distribution | Mn | 3446 | 3395 | 3341 | 3303 | 3275 | 3243 | 4863 |
|  | Mw | 7192 | 7029 | 6539 | 7226 | 7003 | 6740 | 9780 |
|  | Mw/Mn | 2.09 | 2.07 | 1.96 | 2.19 | 2.14 | 2.08 | 2.01 |

|  |  | Example 1-8 | Example 1-9 | Example 1-10 | Example 1-11 | Example 1-12 | Example 1-13 |
|---|---|---|---|---|---|---|---|
| Charged amount of PCD polymerization raw material | 1,4BD [g] | 1057.7 | 1028.1 | 984.9 | — | — | — |
|  | 1,5PD [g] | — | — | — | — | — | 1305.7 |
|  | 1,3PDO [g] | — | — | — | 756.0 | 558.5 | — |
|  | 1,6HD [g] | — | — | — | — | — | — |
|  | 1,10DD [g] | — | — | — | 608.4 | 548.2 | 115.0 |
|  | 1,9ND [g] | 385.2 | — | — | — | — | — |
|  | 1,12DDD [g] | — | 375.7 | 390.2 | — | — | — |
|  | 2M1,3PDO [g] | — | — | — | — | — | — |
|  | 3M1,5PD [g] | — | — | — | — | — | — |
|  | DPC [g] | 2757.1 | 2596.2 | 2624.8 | 2635.6 | 2143.3 | 2579.3 |
|  | Aqueous catalyst solution [mL] | 7.2 | 6.8 | 6.6 | 6.9 | 5.4 | 6.7 |
| Outer appearance |  | white solid | white solid | white solid | transparent viscous liquid | transparent viscous liquid | white solid |
| Structural unit (kind) | Compound of formula (A) | 1,4BD | 1,4BD | 1,4BD | 1,3PDO | 1,3PDO | 1,5 PD |
|  | Compound of formula (B) | 1,9ND | 1,12DDD | 1,12DDD | 1,10DD | 1,10DD | 1,10DD |
| Ratio (A:B) of structural unit derived from compound of formula (A) and structural unit derived from compound of formula (B) [molar ratio] |  | 82:18 | 84:16 | 84:16 | 72:28 | 67:33 | 94:6 |
| Average carbon number of dihydroxy compound after hydrolysis |  | 4.9 | 5.3 | 5.3 | 5.0 | 5.3 | 5.2 |
| Hydroxyl value [mg-KOH/g] |  | 52.7 | 53 | 37 | 54.5 | 37.1 | 53.7 |
| Phenoxy group terminal |  | not detected | not detected | not detected | not detected | not detected | not detected |
| APHA |  | 30 | 30 | 30 | 30 | 30 | 30 |
| Melt viscosity [mPa · s] |  | 2250 | 2650 | 7520 | 2660 | 6800 | 2290 |
| DSC | Glass transition temperature [° C.] | −45 | −48 | −49 | −46 | −46 | −50 |
|  | Melting peak temperature [° C.] | not detected | 42 | 41 | not detected | not detected | not detected |
|  | Melting heat quantity [J/g] | not detected | 35.8 | 42.3 | not detected | not detected | not detected |
| Molecular weight and molecular weight distribution | Mn | 3500 | 3495 | 4814 | 3354 | 5161 | 2999 |
|  | Mw | 6826 | 6728 | 10168 | 6860 | 10715 | 6251 |
|  | Mw/Mn | 1.95 | 1.93 | 2.11 | 2.05 | 2.08 | 2.08 |

TABLE 2

|  |  | Comparative Example 1-1 | Comparative Example 1-2 | Comparative Example 1-3 | Comparative Example 1-4 |
|---|---|---|---|---|---|
| Charged amount of PCD polymerization raw material | 1,4BD [g] | 1234.3 |  |  |  |
|  | 1,5PD [g] | — |  |  |  |
|  | 1,3PDO [g] | — |  |  |  |
|  | 1,6HD [g] | — |  |  |  |
|  | 1,10DD [g] | — |  |  |  |
|  | 1,9ND [g] | — |  |  |  |
|  | 1,12DDD [g] | — |  |  |  |
|  | 2M1,3PDO [g] | — |  |  |  |
|  | 3M1,5PD [g] | — |  |  |  |
|  | DPC [g] | 2765.7 |  |  |  |
|  | Aqueous catalyst solution [mL] | 7.0 |  |  |  |
| Outer appearance |  | white solid | white solid | transparent viscous liquid | transparent viscous liquid |
| Structural unit (kind) | Diol (1) | 1,4BD | 1,6HD | 1,4BD | 1,5PD |
|  | Diol (2) | — | — | 1,6HD | 1,6HD |

TABLE 2-continued

|  |  |  |  |  |  |
|---|---|---|---|---|---|
| Ratio ((1):(2)) of structural units in PCD when using two kinds of diols as PCD polymerization raw material | — | — | 70:30 | 50:50 |
| Average carbon number of dihydroxy compound after hydrolysis [molar ratio] | 4 | 6 | 4.6 | 5.5 |
| Hydroxyl value [mg-KOH/g] | 52.1 | 56.1 | 55 | 56.4 |
| Phenoxy group terminal | not detected | not detected | not detected | not detected |
| APHA | 50 | — | — | — |
| Melt viscosity [mPa · s] | 4160 | 1800 | 3760 | 2050 |
| DSC  Glass transition temperature [° C.] | −44 | −57 | −50.0 | −54 |
| Melting peak temperature [° C.] | 62 | 47 | not detected | not detected |
| Melting heat quantity [J/g] | 39.2 | 45 | not detected | not detected |
| Molecular weight and molecular weight distribution  Mn | 3195 | 3310 | 3521 | 3339 |
| Mw | 6319 | 7185 | 7108 | 7416 |
| Mw/Mn | 1.98 | 2.17 | 2.02 | 2.22 |

|  |  | Comparative Example 1-5 | Comparative Example 1-6 | Comparative Example 1-7 |  |
|---|---|---|---|---|---|
| Charged amount of PCD polymerization raw material | 1,4BD [g] | — | — | — |  |
|  | 1,5PD [g] | — | — | — |  |
|  | 1,3PDO [g] | — | — | — |  |
|  | 1,6HD [g] | 860.8 | — | 657.6 |  |
|  | 1,10DD [g] | 358.1 | — | — |  |
|  | 1,9ND [g] | — | — | — |  |
|  | 1,12DDD [g] | — | — | — |  |
|  | 2M1,3PDO [g] | — | — | — |  |
|  | 3M1,5PD [g] | — | — | 657.6 |  |
|  | DPC [g] | 1781.1 | — | 2184.9 |  |
|  | Aqueous catalyst solution [mL] | 4.8 | — | 5.7 |  |
| Outer appearance |  | white solid | transparent viscous liquid | transparent viscous liquid | transparent viscous liquid |
| Structural unit (kind) | Diol (1) | 1,6HD | 1,9ND | 1,6HD | 1,9ND |
|  | Diol (2) | 1,10DD | 2M1,8OD | 3M1,5PD | 2M1,8OD |
| Ratio ((1):(2)) of structural units in PCD when using two kinds of diols as PCD polymerization raw material |  | 77:28 | 65:35 | 50:50 | 65:35 |
| Average carbon number of dihydroxy compound after hydrolysis [molar ratio] |  | 6.8 | 9 | 6 | 9 |
| Hydroxyl value [mg-KOH/g] |  | 57.1 | 57.1 | 55.6 | 57.1 |
| Phenoxy group terminal |  | not detected | not detected | not detected | not detected |
| APHA |  | 40 | — | 30 | — |
| Melt viscosity [mPa · s] |  | 1250 | 1270 | 1850 | 1270 |
| DSC | Glass transition temperature [° C.] | −56 | −56 | −50 | −56 |
|  | Melting peak temperature [° C.] | 20 | 24 | not detected | 24 |
|  | Melting heat quantity [J/g] | 46 | 37 | not detected | 37 |
| Molecular weight and molecular weight distribution | Mn | 3254 | 3459 | 3250 | 3459 |
|  | Mw | 6460 | 7064 | 6686 | 7064 |
|  | Mw/Mn | 1.99 | 2.04 | 2.06 | 2.04 |

TABLE 3

|  |  | Example 1-1 | Example 1-2 | Example 1-3 | Example 1-4 | Example 1-5 | Example 1-6 | Example 1-7 |
|---|---|---|---|---|---|---|---|---|
| PP Forming reaction | PCD [g] | 90.57 | 91.0 | 82.11 | 90.3 | 90.55 | 91.00 | 90 |
|  | H12MDI [g] | 22.69 | 21.9 | 20.4 | 22.06 | 22.33 | 22.60 | 16.5 |
|  | TiOP [g] | 0.332 | 0.335 | 0.392 | 0.338 | 0.335 | 0.338 | 0.320 |
|  | U-830 [mg] | 9.3 | 7.2 | 9.1 | 9.3 | 6.7 | 7.3 | 5.0 |
| Chain extension reaction | PP [g] | 106.62 | 109.00 | 94.53 | 103.59 | 105.97 | 108.50 | 103.59 |
|  | IPDA [g] | 6.06 | 5.74 | 5.53 | 5.80 | 5.82 | 5.86 | 4.77 |
|  | Toluene [g] | 11.46 | 11.46 | 10.35 | 10.78 | 11.22 | 10.82 | 9.62 |
|  | DMF [g] | 237.36 | 234.90 | 213.00 | 230.93 | 235.46 | 233.75 | 231.86 |
|  | Morpholine [g] | 0.623 | 0.550 | 0.466 | 0.561 | 0.671 | 0.630 | 0.597 |
| Polyurethane solution | Melting viscosity [Pa · s/25° C.] | 142 | 130 | 125 | 122 | 146 | 135 | 181 |
|  | Polystyrene-reduced weight average molecular weight | 146000 | 149000 | 151000 | 153000 | 163000 | 152000 | 134000 |

TABLE 3-continued

|  |  | | | | | | | |
|---|---|---|---|---|---|---|---|---|
| Physical properties, etc. of polyurethane | Glass transition temperature [° C.] | −39 | −38 | −36 | −34 | −31 | −30 | −40 |
|  | Stress at 23° C. · 100% elongation [MPa] | 5.4 | 5.5 | 5.3 | 6.0 | 5.8 | 6.0 | 3.1 |
|  | Stress at −10° C. · 100% elongation [MPa] | 9.4 | 8.6 | 9.5 | 8.7 | 12.1 | 12.6 | 4.6 |
|  | 80° C. Oleic acid resistance, weight change ratio [%] | 80 | 49 | 34 | 36 | 31 | 28 | 35 |
|  | Room temperature ethanol resistance, weight change ratio [%] | 22 | 21 | 20 | 18 | 18 | 18 | 16 |
|  | Change ratio of polystyrene-reduced weight average molecular weight after heat resistance test [%] | 66 | — | 45 | — | 24 | — | — |

|  |  | Example 1-8 | Example 1-9 | Example 1-10 | Example 1-11 | Example 1-12 | Example 1-13 |
|---|---|---|---|---|---|---|---|
| PP Forming reaction | PCD [g] | 74.9 | 74.82 | 90.11 | 77.05 | 90.75 | 75 |
|  | H12MDI [g] | 18.65 | 18.82 | 15.73 | 19.92 | 15.97 | 19.06 |
|  | TiOP [g] | 0.279 | 0.285 | 0.317 | 0.291 | 0.321 | 0.280 |
|  | U-830 [mg] | 8.3 | 12.5 | 7.1 | 5.8 | 8.8 | 4.7 |
| Chain extension reaction | PP [g] | 86.25 | 93.64 | 96.86 | 91.62 | 99.34 | 91.29 |
|  | IPDA [g] | 4.86 | 5.11 | 4.08 | 5.09 | 4.22 | 5.41 |
|  | Toluene [g] | 9.27 | 0.00 | 10.32 | 10.17 | 10.30 | 0.00 |
|  | DMF [g] | 191.91 | 211.59 | 215.68 | 203.61 | 221.52 | 213.01 |
|  | Morpholine [g] | 0.516 | 0.461 | 0.393 | 0.496 | 0.454 | 0.395 |
| Polyurethane solution | Melting viscosity [Pa · s/25° C.] | 162 | 148 | 185 | 209 | 220 | 160 |
|  | Polystyrene-reduced weight average molecular weight | 153000 | 163000 | 173000 | 171000 | 182000 | 171000 |
| Physical properties, etc. of polyurethane | Glass transition temperature [° C.] | −34 | −36 | −38 | −37 | −40 | −34 |
|  | Stress at 23° C. · 100% elongation [MPa] | 5.4 | 5.7 | 3.4 | 6.0 | 3.6 | 5.5 |
|  | Stress at −10° C. · 100% elongation [MPa] | 11.7 | 11.4 | 4.4 | 12.3 | 5.0 | 11.3 |
|  | 80° C. Oleic acid resistance, weight change ratio [%] | 49 | 54 | 37 | 42 | 41 | 41 |
|  | Room temperature ethanol resistance, weight change ratio [%] | 19 | 21 | 17 | 21 | 21 | 22 |
|  | Change ratio of polystyrene-reduced weight average molecular weight after heat resistance test [%] | — | 24 | — | 17 | — | 85 |

|  |  | Comparative Example 1-1 | Comparative Example 1-2 | Comparative Example 1-3 | Comparative Example 1-4 | Comparative Example 1-5 | Comparative Example 1-6 | Comparative Example 1-7 |
|---|---|---|---|---|---|---|---|---|
| PP Forming reaction | PCD [g] | 94.02 | 94.07 | 90.01 | 90.47 | 75 | 75 | 91.1 |
|  | H12MDI [g] | 23.28 | 25.77 | 23.3 | 24.39 | 20.33 | 20.48 | 24.14 |
|  | TiOP [g] | 0.380 | 0.363 | 0.342 | 0.352 | 0.286 | 0.272 | 0.362 |
|  | U-830 [mg] | 12.4 | 5.5 | 4.7 | 5.6 | 4.7 | 7.3 | 7.8 |
| Chain extension reaction | PP [g] | 109.14 | 109.60 | 100.78 | 109.10 | 92.58 | 92.79 | 108.12 |
|  | IPDA [g] | 6.28 | 6.91 | 6.09 | 6.65 | 5.42 | 5.89 | 6.53 |
|  | Toluene [g] | 12.04 | 12.38 | 10.24 | 12.07 | 0.00 | 0.00 | 11.87 |
|  | DMF [g] | 242.75 | 243.01 | 224.58 | 242.49 | 216.03 | 216.51 | 240.58 |
|  | Morpholine [g] | 0.402 | 0.757 | 0.785 | 0.889 | 0.500 | 0.620 | 0.600 |
| Polyurethane solution | Melting viscosity [Pa · s/25° C.] | 189 | 203 | 162 | 130 | 144 | 171 | 152 |
|  | Polystyrene-reduced weight average molecular weight | 168000 | 142000 | 138000 | 144000 | 140000 | 146000 | 164000 |

TABLE 3-continued

| Physical properties, etc. of polyurethane | Glass transition temperature [° C.] | −28 | −41 | −34 | −40 | −45 | −48 | −40 |
|---|---|---|---|---|---|---|---|---|
| | Stress at 23° C. ·100% elongation [MPa] | 6.2 | 6.1 | 7.1 | 6.5 | 6.1 | 5.5 | 6.2 |
| | Stress at −10° C. ·100% elongation [MPa] | 13.4 | 14.4 | 13 | 12.6 | 11.2 | 10.8 | 11.7 |
| | 80° C. Oleic acid resistance, weight change ratio [%] | 26 | 61 | 32 | 63 | unmeasurable | unmeasurable | unmeasurable |
| | Room temperature ethanol resistance, weight change ratio [%] | 18 | 26 | 20 | 24 | 25 | 26 | 24 |
| | Change ratio of polystyrene-reduced weight average molecular weight after heat resistance test [%] | 30 | 55 | 129 | — | — | — | 45 |

TABLE 4

| | | Example 2-1 | Example 2-2 | Example 2-3 | Example 2-4 | Example 2-5 | Example 2-6 |
|---|---|---|---|---|---|---|---|
| Charged amount of PCD polymerization raw material | 1,4BD [g] | 975.8 | 984.9 | — | 1311.2 | 1214.3 | 611.3 |
| | 1,5PD [g] | — | — | — | — | — | — |
| | 1,3PDO [g] | — | — | 558.5 | — | — | — |
| | 1,6HD [g] | — | — | — | — | — | — |
| | 1,10DD [g] | 414.2 | — | 548.2 | — | — | — |
| | 1,9ND [g] | — | — | — | — | — | — |
| | 1,12DDD [g] | — | 390.2 | — | — | — | — |
| | 2M1,3PDO [g] | — | — | — | — | — | 611.3 |
| | 3M1,5PD [g] | — | — | — | — | — | — |
| | DPC [g] | 2709.9 | 2624.8 | 2143.3 | 2988.8 | 2785.7 | 2777.5 |
| | Aqueous catalyst solution [mL] | 6.7 | 6.6 | 5.4 | 7.4 | 6.9 | 6.9 |
| | Outer appearance | white solid | white solid | transparent viscous liquid | white solid | white solid | white solid |
| Structural unit (kind) | Diol (1) | 1,4BD | 1,4BD | 1,3PDO | 1,4BD | 1,4BD | 1,4BD/2M1,3PDO |
| | Diol (2) | 1,10DD | 1,12DDD | 1,10DD | — | — | — |
| Ratio ((1):(2)) of structural units in PCD when using two kinds of diols as PCD polymerization raw material [molar ratio] | | 80:20 | 84:16 | 67:33 | — | — | (50:50) |
| Average carbon number of dihydroxy compound after hydrolysis | | 5.1 | 5.3 | 5.3 | 4.0 | 4.0 | 4.0 |
| | Hydroxyl value [mg-KOH/g] | 37.4 | 37 | 37.1 | 37.1 | 30.4 | 35.9 |
| | Phenoxy group terminal | not detected | not detected | not detected | not detected | not detected | not detected |
| | APHA | 30 | 30 | 30 | 30 | 30 | 30 |
| | Melt viscosity [mPa · s] | 7670 | 7520 | 6800 | 13200 | 23900 | 18200 |
| DSC | Glass transition temperature [° C.] | −46 | −49 | −46 | −42 | −40 | −31 |
| | Melting peak temperature [° C.] | 39 | 41 | not detected | 62 | 64 | not detected |
| | Melting heat quantity [J/g] | 2.08 | 42.3 | not detected | 77 | 68.9 | not detected |
| Molecular weight and molecular weight distribution | Mn | 4863 | 4814 | 5161 | 4015 | 5510 | 4293 |
| | Mw | 9780 | 10168 | 10715 | 8841 | 11536 | 8694 |
| | Mw/Mn | 2.01 | 2.11 | 2.08 | 2.20 | 2.09 | 2.03 |

TABLE 5

| | | Comparative Example 2-1 | Comparative Example 2-2 |
|---|---|---|---|
| Charged amount of PCD polymerization raw material | 1,4BD [g] | 1234.3 | — |
| | 1,5PD [g] | — | — |
| | 1,3PDO [g] | — | — |
| | 1,6HD [g] | — | 1197.8 |
| | 1,10DD [g] | — | — |
| | 1,9ND [g] | — | — |
| | 1,12DDD [g] | — | — |
| | 2M1,3PDO [g] | — | — |
| | 3M1,5PD [g] | — | — |
| | DPC [g] | 2765.7 | 2052.2 |
| | Aqueous catalyst solution [mL] | 7.0 | 5.2 |
| | Outer appearance | white solid | white solid |
| Structural unit (kind) | | 1,4BD | 1,6HD |
| Average carbon number of dihydroxy compound after hydrolysis | | 4 | 6 |

TABLE 5-continued

|  |  | Comparative Example 2-1 | Comparative Example 2-2 |
|---|---|---|---|
|  | Hydroxyl value [mg-KOH/g] | 52.1 | 37.6 |
|  | Phenoxy group terminal | not detected | not detected |
|  | APHA | 50 | 30 |
|  | Melt viscosity [mPa · s] | 4160 | 6400 |
| DSC | Glass transition temperature [° C.] | −44 | −51 |
|  | Melting peak temperature [° C.] | 62 | 53 |
|  | Melting heat quantity [J/g] | 39.2 | 40 |
| Molecular weight and molecular weight distribution | Mn | 3195 | 5004 |
|  | Mw | 6319 | 10881 |
|  | Mw/Mn | 1.98 | 2.17 |

TABLE 6

|  |  | Example 2-1 | Example 2-2 | Example 2-3 | Example 2-4 | Example 2-5 | Example 2-6 | Comparative Example 2-1 | Comparative Example 2-2 |
|---|---|---|---|---|---|---|---|---|---|
| PP Forming reaction | PCD [g] | 90 | 90.11 | 90.75 | 114.06 | 93.25 | 92.7 | 94.02 | 91.24 |
|  | H12MDI [g] | 16.5 | 15.73 | 15.97 | 20.21 | 13.3 | 15.81 | 23.28 | 16.22 |
|  | TiOP [g] | 0.320 | 0.317 | 0.321 | 0.402 | 0.313 | 0.312 | 0.380 | 0.323 |
|  | U-830 [mg] | 5.0 | 7.1 | 8.8 | 13.7 | 7.6 | 9.5 | 12.4 | 5.5 |
| Chain extension reaction | PP [g] | 103.59 | 96.86 | 99.34 | 117.22 | 96.96 | 100.11 | 109.14 | 100.23 |
|  | IPDA [g] | 4.77 | 4.08 | 4.22 | 5.04 | 3.23 | 4.05 | 6.28 | 4.18 |
|  | Toluene [g] | 9.62 | 10.32 | 10.30 | 12.17 | 10.62 | 10.69 | 12.04 | 10.70 |
|  | DMF [g] | 231.86 | 215.68 | 221.52 | 261.84 | 215.82 | 222.92 | 242.75 | 223.25 |
|  | Morpholine [g] | 0.597 | 0.393 | 0.454 | 0.343 | 0.401 | 0.355 | 0.402 | 0.480 |
| Polyurethane solution | Melting viscosity [Pa · s/25° C.] | 181 | 185 | 220 | 204 | 191 | 111 | 189 | 145 |
|  | Polystyrene-reduced weight average molecular weight | 134000 | 173000 | 182000 | 184000 | 190000 | 199000 | 168000 | 153000 |
| Physical properties, etc. of polyurethane | Glass transition temperature [° C.] | −40 | −38 | −40 | −31 | −32 | −24 | −28 | −42 |
|  | Stress at 23° C. ·100% elongation [MPa] | 3.1 | 3.4 | 3.6 | 3.9 | 3.3 | 3.9 | 6.2 | 3.2 |
|  | Stress at −10° C. ·100% elongation [MPa] | 4.6 | 4.4 | 5.0 | 6.4 | 4.1 | 12.3 | 13.4 | 5.8 |
|  | 80° C. Oleic acid resistance, weight change ratio [%] | 35 | 37 | 41 | 21 | 17 | 24 | 26 | 80 |
|  | Room temperature ethanol resistance, weight change ratio [%] | 16 | 17 | 21 | 14 | 14 | 17 | 18 | 20 |
|  | Ratio 1 | — | — | — | 0.13 | — | — | 0.06 | — |
|  | Ratio 2 | — | — | — | 0.61 | — | — | 0.49 | — |

While the invention has been described in detail and with reference to specific embodiments thereof, it will be apparent to one skilled in the art that various changes and modifications can be made therein without departing from the spirit and scope of the invention. This application is based on (Patent Application No. 2012-283163) filed on Dec. 26, 2012, Japanese Patent Application (Patent Application No. 2013-29212) filed on Feb. 18, 2013, Japanese Patent Application (Patent Application No. 2013-29213) filed on Feb. 18, 2013, Japanese Patent Application (Patent Application No. 2013-30250) filed on Feb. 19, 2013, Japanese Patent Application (Patent Application No. 2013-30251) filed on Feb. 19, 2013, Japanese Patent Application (Patent Application No. 2013-30252) filed on Feb. 19, 2013, Japanese Patent Application (Patent Application No. 2013-89345) filed on Apr. 22, 2013, and Japanese Patent Application (Patent Application No. 2013-89346) filed on Apr. 22, 2013, the contents of which are incorporated herein by way of reference.

The invention claimed is:

1. A polycarbonate diol having a hydroxyl value of 20 to 42 mg-KOH/g, wherein:
the glass transition temperature of said polycarbonate diol as measured by a differential scanning calorimeter is −30° C. or less;
an average carbon number of all dihydroxy compounds obtained by hydrolyzing said polycarbonate diol is from 3 to 5.5;
the polycarbonate diol does not contain a structural unit derived from 1,6-hexanediol; and
a ratio of weight average molecular weight/number average molecular weight (Mw/Mn) of said polycarbonate diol ranges from 1.5 to 3.0.

2. The polycarbonate diol as claimed in claim 1, wherein said dihydroxy compounds consist of an aliphatic dihydroxy compound having no substituent.

3. The polycarbonate diol as claimed in claim 1, wherein said dihydroxy compounds comprise at least one selected from the group consisting of 1,3-propanediol, 1,4-butanediol and 1,5-pentanediol.

4. The polycarbonate diol as claimed in claim 1, wherein the melting heat quantity of the polycarbonate diol at a melting peak measured by a differential scanning calorimeter is from 5.0 to 80 J/g.

5. The polycarbonate diol as claimed in claim 1, wherein said dihydroxy compounds comprise a plant-derived compound.

6. A method for producing the polycarbonate diol of claim 1, the method comprising transesterifying at least one dihydroxy compound having an average carbon number of 3 to 5.5 with a diaryl carbonate in the presence of a transesterification catalyst to produce the polycarbonate diol.

7. The method of claim 6, wherein the at least one dihydroxy compound comprises a plant-derived compound.

8. The method of claim 6, wherein said transesterification catalyst is a compound comprising at least one element selected from the group consisting of a Group 1 element in the long-period periodic table (excluding hydrogen) and a Group 2 element in the long-period periodic table.

9. A polyurethane, comprising the polycarbonate diol of claim 1.

10. The polycarbonate diol according to claim 1, comprising a structural unit derived from a compound represented by formula (A) and a structural unit derived from a compound represented by formula (B):

HO—R¹—OH (A)

HO—R²—OH (B)

wherein:
R$^1$ represents a divalent alkylene group comprising a main chain having a carbon number of 3 to 5; and
R$^2$ represents a divalent alkylene group comprising a main chain having a carbon number of 8 to 20.

11. The polycarbonate diol according to claim 1, wherein the average carbon number of the dihydroxy compounds obtained by the hydrolyzing of the polycarbonate diol is from 4.3 to 5.5.

12. The polycarbonate diol according to claim 1, wherein the average carbon number of the dihydroxy compounds obtained by the hydrolyzing of the polycarbonate diol is from 3 to 5.0.

13. The polycarbonate diol according to claim 1, wherein the ratio of weight average molecular weight/number average molecular weight (Mw/Mn) of said polycarbonate diol ranges from 1.7 to 3.0.

* * * * *